(12) United States Patent
Shimamura et al.

(10) Patent No.: US 8,415,049 B2
(45) Date of Patent: Apr. 9, 2013

(54) BIPOLAR BATTERY

(75) Inventors: Osamu Shimamura, Yokohama (JP); Kenji Hosaka, Yokosuka (JP); Kyoichi Watanabe, Yokohama (JP); Takaaki Abe, Yokohama (JP); Takuya Kinoshita, Yokosuka (JP); Hideaki Horie, Yokosuka (JP); Hajime Sato, Yokohama (JP); Ryouichi Senbokuya, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/240,379

(22) Filed: Sep. 22, 2011

(65) Prior Publication Data

US 2012/0005882 A1  Jan. 12, 2012

Related U.S. Application Data

(62) Division of application No. 11/721,072, filed as application No. PCT/JP2005/022696 on Dec. 9, 2005, now Pat. No. 8,076,021.

(30) Foreign Application Priority Data

Dec. 10, 2004 (JP) ................................. 2004-358500
Apr. 12, 2005 (JP) ................................. 2005-114495

(51) Int. Cl.
*H01M 2/14* (2006.01)

(52) U.S. Cl. ........ 429/129; 429/523; 429/139; 429/210; 429/247

(58) Field of Classification Search .................. 429/523, 429/139, 129, 210, 247
See application file for complete search history.

(56) References Cited

U.S. PATENT DOCUMENTS

| 7,163,765 | B2 | 1/2007 | Hosaka et al. |
| 2004/0091711 | A1 | 5/2004 | Mukasa et al. |

FOREIGN PATENT DOCUMENTS

| JP | 62-34761 | | 2/1987 |
| JP | 11-204136 | A | 7/1999 |
| JP | 2000-100471 | A | 4/2000 |
| JP | 2002-75455 | A | 3/2002 |
| JP | 2004-39358 | A | 2/2004 |
| JP | 2004-158343 | A | 6/2004 |
| JP | 2004-185813 | A | 7/2004 |
| JP | 2004-319210 | A | 11/2004 |

*Primary Examiner* — Jane Rhee
(74) *Attorney, Agent, or Firm* — Foley & Lardner LLP

(57) ABSTRACT

The present invention provides a bipolar battery made by using a polymer gel electrolyte or a liquid electrolyte in an electrolyte layer, which is highly reliable and prevents liquid junction (short circuit) caused by leak out of an electrolyte solution from the electrolyte part. The present invention provides a bipolar battery laminated, in series, with a plurality pieces of bipolar electrodes which is formed with a positive electrode on one surface of a collector, and a negative electrode on the other surface, so as to sandwich an electrolyte layer, characterized by being provided with a separator which retains the electrolyte later, and a seal resin which is formed and arranged at the outer circumference part of a part of the separator where the electrolyte is retained.

6 Claims, 18 Drawing Sheets

FIG.10
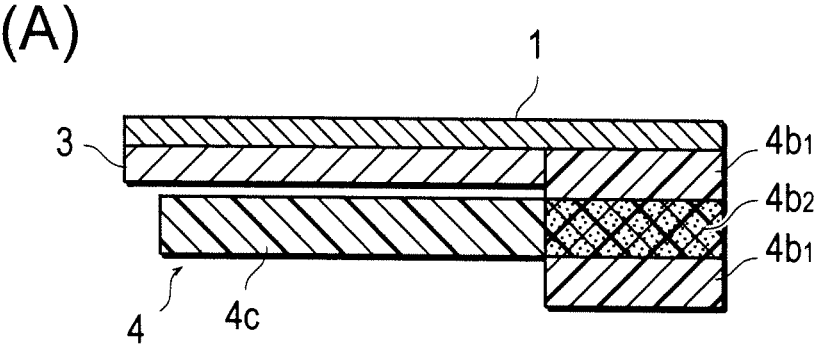
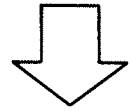
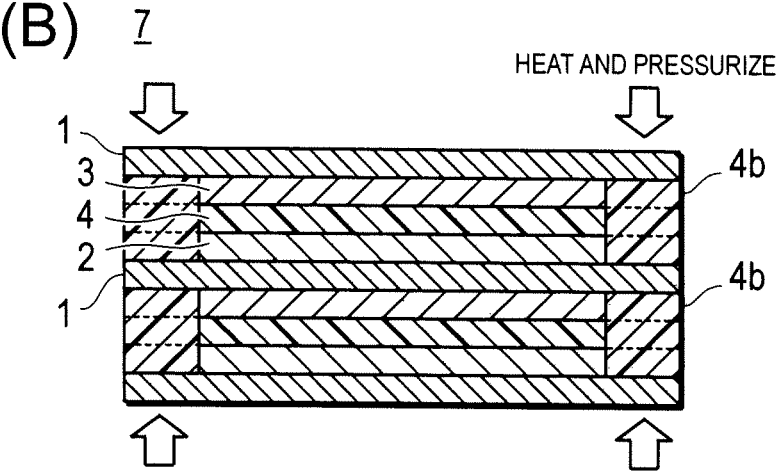

FIG.16
(A)
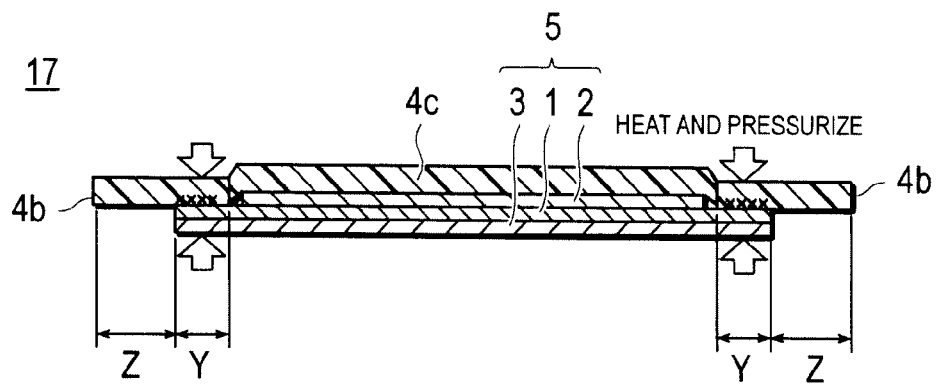
(B)
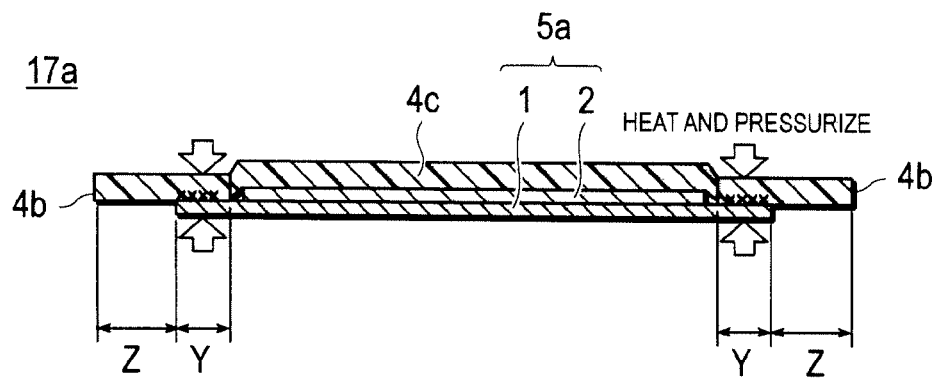
(C)
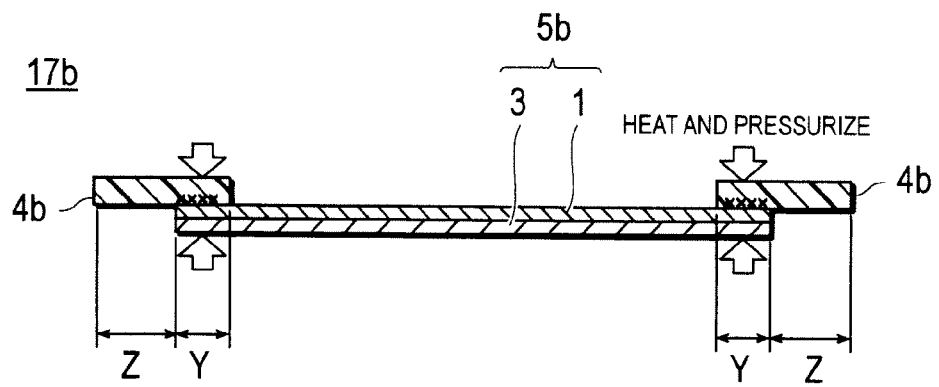

BIPOLAR BATTERY

CROSS REFERENCE TO RELATED APPLICATIONS

This application is a divisional of U.S. application Ser. No. 11/721,072, filed Jun. 7, 2007, which is the National Stage of Application No. PCT/JP2005/022696 filed Dec. 9, 2005, which is based upon and claims the benefit of priority from prior Japanese Application No. 2004-358500, filed Dec. 10, 2004 and Japanese Application No. 2005-114495, filed Apr. 12, 2005; the entire contents of all of which are incorporated herein by reference.

TECHNICAL FIELD

The present invention relates to a bipolar battery made by arranging a positive electrode and a negative electrode at the both sides of a collector, in more detail, relates to a bipolar battery made by using a polymer gel electrolyte more excellent in ion conductivity than a polymer solid electrolyte.

BACKGROUND ART

Recently, reduction of emission amount of carbon dioxide is strongly desired in view of environmental protection. In automotive industry, more expectations are focused on reduction of emission amount of carbon dioxide by introduction of an electric vehicle, a hybrid electric vehicle, a fuel cell vehicle, a hybrid fuel cell vehicle, or the like. Development of a secondary battery for motor drive, a key element for practical application thereof, is now intensively carrying out. As a secondary battery, a lithium ion secondary battery is noticed, which is capable of attaining high energy density and high output density. However, use of a plurality of secondary batteries by joining in series is required to be applied as a power source for motor drive for such various kinds of vehicles as described above, and to secure high output.

However, joining of batteries via joining members results in reduction of output caused by electric resistance at the joining members. In addition, batteries having joining members also have spatial disadvantage; namely, the joining members incur reduction of output density or energy density of the batteries.

As a method for solving this problem, a bipolar battery where a positive electrode and a negative electrode are arranged at the both sides of a collector has been developed.

Among these, a bipolar battery made by using a polymer solid electrolyte not containing a solution in an electrolyte layer has been proposed (see, for example, JP-A-2000-100471). According to this proposal, because of no containing of a solution (an electrolyte solution) in a battery, such a bipolar battery can be provided as having no risk of liquid leak out or gas generation, high reliability and in addition not requiring airtight seal in structural viewpoint. However, ion conductivity of a polymer solid electrolyte is lower as compared with a polymer gel electrolyte, and output density or energy density of a battery is not sufficient in usual use environment, and thus a practically applicable stage has not yet been attained up to now, and further improvement of ion conductivity is required.

On the other hand, a bipolar battery made by using a polymer electrolyte containing an electrolyte solution in an electrolyte layer has been proposed (see, for example, JP-A-2002-75455 and JP-A-1'-204136). Because use of a polymer electrolyte containing an electrolyte solution, namely a polymer gel electrolyte, provides excellent ion conductivity, as well as sufficient output density or energy density of a battery, this battery is expected as a bipolar battery closest to a practical application stage.

DISCLOSURE OF INVENTION

However, configuration of a bipolar battery using a polymer gel electrolyte in an electrolyte layer results in leak out of an electrolyte solution from an electrolyte part, which contacts an electrode or a electrolyte layer of other unit battery layer, and could result in liquid junction (short circuit).

Accordingly, it is an object of the present invention to provide a bipolar battery made by using an electrolyte in an electrolyte layer, which is highly reliable and prevents liquid junction (short circuit) caused by leak out of an electrolyte solution from the electrolyte part.

The present invention provides a bipolar battery laminated, in series, with a plurality pieces of bipolar electrodes which is formed with a positive electrode on one surface of a collector, and a negative electrode on the other surface, so as to sandwich an electrolyte layer, characterized by being provided with: a separator which retains the electrolyte later; and a seal resin which is formed and arranged at the outer circumference part of a part of the separator where the electrolyte is retained.

BRIEF DESCRIPTION OF THE DRAWINGS

FIG. 5(A) is an outline plan view showing a micro-porous membrane separator or a non-woven fabric separator corresponding to a substrate of an electrolyte layer before production. FIG. 5(B) is an outline plan view schematically showing a production process appearance of an electrolyte layer at a stage where a seal part is formed at the outer circumference part of the separator. FIG. 5(C) is an outline plan view schematically showing a completion appearance of the electrolyte layer by forming a gel electrolyte part at the vicinity of the center part corresponding to the inside of the separator seal part. FIG. 5(D) is an outline cross-sectional view along the D-D line in FIG. 5(C). FIG. 5(E) is an outline cross-sectional view showing other embodiment where a seal part different from the seal part in FIG. 5(D) is used.

FIG. 6(A) is an outline plan view showing a micro-porous membrane separator or a non-woven fabric separator corresponding to a substrate of an electrolyte layer before production. FIG. 6(B) is an outline plan view schematically showing a production process appearance of an electrolyte layer at a stage where a rubber-based seal part with a rectangle cross-section is formed at the outer circumference part of the separator. FIG. 6(C) is an outline plan view schematically showing a completion appearance of the electrolyte layer by forming a gel electrolyte part at the vicinity of the center part corresponding to the inside of the rubber-based seal part with a rectangle cross-section, formed in FIG. 6(B). FIG. 6 (D) is an outline cross-sectional view along the D-D line in FIG. 6(C). FIG. 6(E) is an outline plan view schematically showing a production process appearance of an electrolyte layer at a stage where a rubber-based seal part with a semicircular or elliptical cross-section is formed at the outer circumference part of the separator. FIG. 6 (F) is an outline plan view schematically showing a completion appearance of the electrolyte layer by forming a gel electrolyte part at the vicinity of the center part corresponding to the inside of the rubber-based seal part with a semicircular or elliptical cross-section, formed in FIG. 6(E). FIG. 6(G) is an outline cross-sectional view along the G-G line in FIG. 6(F).

FIG. 7(A) is an outline cross-sectional view schematically showing a laminated appearance of an electrolyte layer arranged with a rubber-based seal part having a rectangle cross-section, formed at the separator, and a bipolar electrode. FIG. 7(B) is an outline cross-sectional view showing an air-tightly sealed appearance with a collector, after lamination of the electrolyte layer, which is arranged with a rubber-based seal part having a rectangle cross-section, at the separator, and the bipolar electrode so as to form a battery-layered product, by pressurization of the whole surfaces of the battery-layered product from the top and the bottom sides so as to deform the seal part by pressurization. FIG. 7(C) is an outline cross-sectional view schematically showing a laminated appearance of the electrolyte layer, which is arranged with a rubber-based seal part having a rectangle or elliptical cross-section, at the separator, and the bipolar electrode. FIG. 7(D) is an outline cross-sectional view showing an air-tightly sealed appearance with a collector, after lamination of the electrolyte layer, which is arranged with a rubber-based seal part having a semicircular or elliptical cross-section, at the separator, and the bipolar electrode, so as to form a battery-layered product, by pressurization of the whole surfaces of the laminated body from the top and the bottom sides so as to deform the seal part by pressurization.

FIG. 8(A) is an outline cross-sectional view showing an air-tightly sealed appearance with a collector, after lamination of the electrolyte layer, which is arranged with a rubber-based seal part having a rectangle cross-section, at the separator, and the bipolar electrode so as to encapsulate into a jacket material and to form a battery, by pressurization of the battery from the top and the bottom sides of the battery using a pushing member from the top and the bottom sides of the battery so as to deform the seal part by pressurization. FIG. 8(B) is an outline cross-sectional view showing an air-tightly sealed appearance with a collector, after lamination of the electrolyte layer, which is arranged with a rubber-based seal part having a semicircular or elliptical cross-section, at the separator, and the bipolar electrode so as to encapsulate into a jacket material and to form a battery, by pressurization of the battery from the top and the bottom sides of the battery using a pushing member from the top and the bottom sides of the battery so as to deform the seal part by pressurization.

FIG. 9(A) is an outline plan view showing a microporous membrane separator or a non-woven fabric separator corresponding to a substrate of an electrolyte layer before production. FIG. 9(B) is an outline plan view schematically showing a production process appearance of an electrolyte layer at a stage where a heat fusion resin-based seal part with a rectangle cross-section is formed at the outer circumference part of the separator. FIG. 9(C) is an outline plan view schematically showing a completion appearance of the electrolyte layer by forming a gel electrolyte part at the vicinity of the center part corresponding to the inside of the heat fusion resin-based seal part with a rectangle cross-section, formed in FIG. 9(B). FIG. 9 (D) is an outline cross-sectional view along the D-D line in FIG. 9(C).

FIG. 10 is an outline cross-sectional view schematically showing a sealing process by heat fusion of a heat fusion resin-based seal part of a separator, used in a bipolar battery of the present invention. FIG. 10(A) is an outline cross-sectional view schematically showing a laminated appearance of the electrolyte layer, which is arranged with a heat fusion resin-based seal part having a rectangle cross-section, at the separator, and the bipolar electrode. FIG. 10(B) is an outline cross-sectional view showing an air-tightly sealed appearance, after lamination of the electrolyte layer, which is arranged with a heat fusion resin-based seal part having a rectangle cross-section, at the separator, and the bipolar electrode so as to form a battery-layered product, by heating and pressurization of the seal part from the top and the bottom sides of the of the laminated body so as to make heat fusion of the seal member with the collector.

FIG. 11(A) is an outline cross-sectional view schematically showing an air-tightly sealed appearance of the battery-layered product, by lamination of the electrolyte layer using a separator larger than the collector, and the bipolar electrode, so as to deform a rubber-based seal part of the electrolyte layer by pressurization. FIG. 11(B) is an outline cross-sectional view schematically showing an air-tightly sealed appearance of the battery-layered product, by lamination of the electrolyte layer using the separator larger than the collector, and the bipolar electrode, so as to make heat fusion of the heat fusion resin-based seal part of the electrolyte layer.

FIG. 12 (A) is an outline cross-sectional view showing an appearance of the battery-layered product, made by lamination of the electrolyte layer, which is made larger than the seal part of the separator arranged with the seal member, by using a strong electric tab as the electrode for taking out current, and the bipolar electrode, so as to deform the seal part by pressurization to air-tightly seal onto the collector. FIG. 12 (B) is an outline plan view of FIG. 12 (A).

FIG. 16 is an outline cross-sectional view schematically showing an appearance of one embodiment of a electrode-electrolyte layer seal member, made by preparation of the battery-layered product shown in FIG. 15, by sealing layer by layer. FIG. 16(A) is an outline cross-sectional view schematically showing an appearance of one embodiment of an electrode-electrolyte layer seal member made by using a bipolar electrode, which is used as an intermediate layer of the battery-layered product. FIG. 16(B) is an outline cross-sectional view schematically showing an appearance of one embodiment of an electrode-electrolyte layer seal member made by using an electrode arranged with a positive electrode only at one necessary surface of a collector, which is used as the most outer layer of the positive electrode side of the battery-layered product. FIG. 16(C) is an outline cross-sectional view schematically showing an appearance of one embodiment of an electrode-electrolyte layer seal member made by using an electrode arranged with a negative electrode only at one necessary surface of a collector, which is used as the most outer layer of the negative electrode side of the battery-layered product.

FIG. 19(A) is an outline plan view showing a micro-porous membrane separator or a non-woven fabric separator corresponding to a substrate of an electrolyte layer before production. FIG. 19(B) is an outline plan view schematically showing a production process appearance of an electrolyte layer at a stage where a thermosetting resin-based seal part with a rectangle cross-section is formed at the outer circumference part of the separator. FIG. 19(C) is an outline plan view schematically showing a completion appearance of the electrolyte layer by forming a gel electrolyte part at the vicinity of the center part corresponding to the inside of the thermosetting resin-based seal part with a rectangle cross-section, formed in FIG. 19(B). FIG. 19(D) is an outline cross-sectional view along the D-D line in FIG. 19 (C). FIG. 19(E) is an outline plan view schematically showing a production process appearance of the electrolyte layer at a stage where a thermosetting resin-based seal part with a semicircular or elliptical cross-section is formed at the outer circumference part of the separator. FIG. 19 (F) is an outline plan view schematically showing a completion appearance of the electrolyte layer by forming a gel electrolyte at the vicinity of the center part corresponding to the inside of the thermosetting resin-based seal part with a semicircular or elliptical cross-section, formed in FIG. 19(E). FIG. 19(G) is an outline cross-sectional view along the G-G line in FIG. 19(F).

FIG. 20(A) is an outline plan view schematically showing an appearance in forming and arranging of a thermosettable seal resin, at the four sides of the outer circumference part of the positive electrode and negative electrode sides of a bipolar electrode, which is made by forming the positive electrode at the vicinity of the center part of one surface of the collector, and the negative electrode at the vicinity of the center part of the other surface. FIG. 20(B) is an outline cross-sectional view along the B-B line in FIG. 20(A).

FIG. 22(A) is an outline plan view schematically showing appearance in forming and arranging of a thermosettable seal resin, at the four sides of the outer circumference part of the positive electrode side or the negative electrode side of a bipolar electrode, which is made by forming the positive electrode at the vicinity of the center part of one surface of the collector, and the negative electrode at the vicinity of the center part of the other surface. FIG. 22(B) is an outline cross-sectional view along the B-B line in FIG. 22(A).

BEST MODE FOR CARRYING OUT THE INVENTION

The embodiments of the present invention will be explained below.

A bipolar battery relevant to the present invention is one laminated, in series, with a plurality pieces of bipolar electrodes which is formed with a positive electrode on one surface of a collector, and a negative electrode on the other surface, so as to sandwich an electrolyte layer, characterized by being provided with a seal resin which is formed and arranged at the outer circumference part where the electrolyte (for example, a polymer gel electrolyte or a liquid electrolyte (electrolyte solution) and the like) of the separator is retained.

In the present invention, an electrolyte seal part (a part formed and arranged with an electrolyte seal resin) can easily be formed in producing a battery (in lamination of an electrode), thereby liquid junction (short circuit) caused by leak out of an electrolyte can be prevented. In addition, by configuring, in one piece, a seal part with a part retaining an electrolyte (for example, a polymer gel electrolyte or a liquid electrolyte (electrolyte solution) and the like), as an electrolyte layer, lamination of the part retaining the electrolyte, and the seal part can be executed at the same time, and can thus extremely simplify production processes of a battery. As a result, reduction of product cost can also be attained. Namely, to prevent self-discharge caused by liquid junction (short circuit) among unit battery layers, it is also considered that a new insulating layer is formed at the outer circumference between unit battery layers, so as to furnish sealing performance against an electrolyte solution. However, it makes configuration or production process of a bipolar battery complicated or troublesome. On the other hand, a bipolar battery of the present invention is capable of preventing liquid junction between unit battery layers, without mounting of a special member (an insulating layer or the like), and is capable of providing a compact bipolar battery excellent in ion conductivity and battery characteristics such as charge-discharge characteristics or the like. In addition, by furnishing, to the outer circumference part of a separator, function as a seal member also, overlapping in lamination can be eliminated, and further thinning is made possible, therefore, provides a highly reliable power source capable of maintaining excellent energy density and output density, and is useful in various industrial fields.

Figure 1:
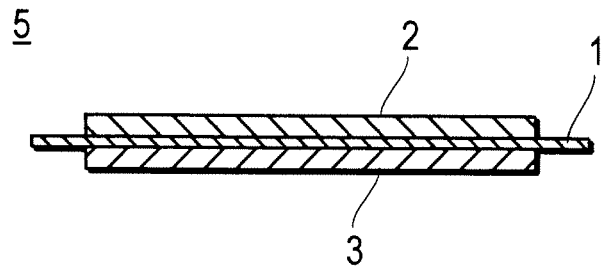
FIG. 1 is an outline cross-sectional view schematically showing a fundamental structure of a bipolar electrode configuring a bipolar battery of the present invention.
Figure 2:
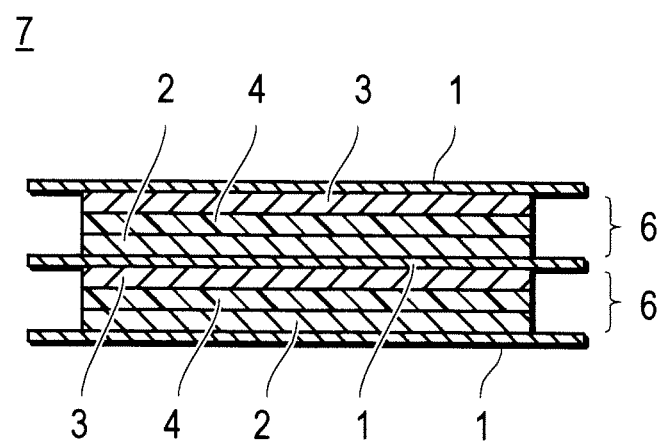
FIG. 2 is an outline cross-sectional view schematically showing a fundamental structure of a unit battery layer (unit cell) configuring a bipolar battery of the present invention.
Figure 3:
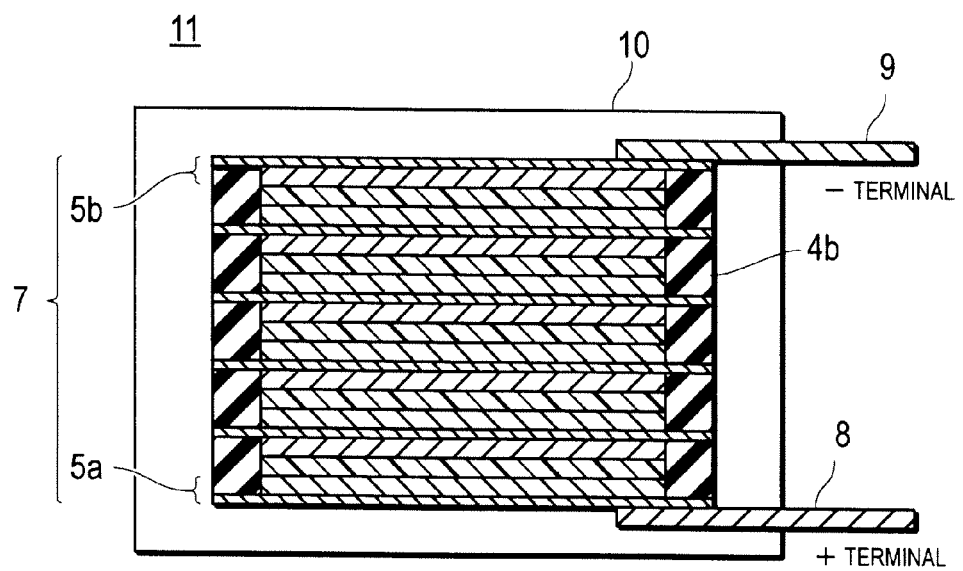
FIG. 3 is an outline cross-sectional view schematically showing a fundamental structure of a bipolar battery of the present invention.
Figure 4:
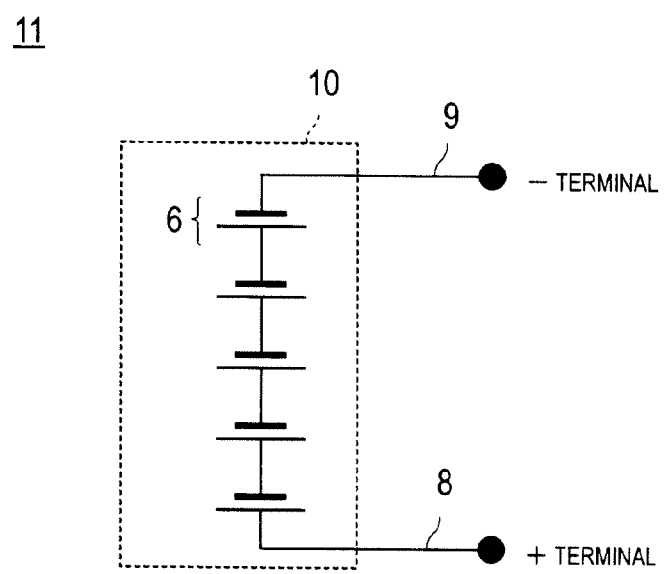
FIG. 4 is an outline drawing schematically showing a fundamental structure of a bipolar battery of the present invention.

FIGS. 1 to 4 briefly explain fundamental configuration of a bipolar battery of the present invention. FIG. 1 is an outline cross-sectional view schematically showing a structure of a bipolar electrode configuring a bipolar battery of the present invention; FIG. 2 is an outline cross-sectional view schematically showing a structure of a unit battery layer configuring a bipolar battery; FIG. 3 is an outline cross-sectional view schematically showing a total structure of a bipolar battery; and FIG. 4 is an outline drawing conceptually showing (by symbolization) that unit battery layers laminated in plurality in a bipolar battery are made by joining in series.

As shown in FIG. 1, in a bipolar battery of the present invention, as shown in FIGS. 1 to 4, the bipolar electrodes 5 made by mounting the positive electrode 2 at one surface of a piece of the collector 1, and the negative electrode 3 at the other surface is set so that the electrodes 2 and 3 of the adjacent bipolar electrode 5, which sandwiches the electrolyte layer 4 arranged with the seal part 4b, are opposing thereto. Namely, the bipolar battery 11 is one configured by the battery-layered product (battery element part) 7, having a structure laminated with a plurality pieces of the bipolar batteries 5, having the positive electrode 2 mounted at one surface of the collector 1, and the negative electrode 3 at the other surface, via the electrolyte layer 4. In addition, the electrodes (electrodes for taking out current) 5a and 5b at the top layer and the bottom layer of the battery-layered product 7 may have a structure formed with an electrode (the positive electrode 2 or the negative electrode 3) on only one surface necessary to the collector 1 (see FIG. 3). The electrodes 5a and 5b for taking out current are also considered to be a kind of a bipolar electrode. In addition, in the bipolar battery 11, onto the collector 1 or a strong electric tab (see FIG. 12) of the electrodes at the top and bottom layers, the positive electrode lead 8 and the negative electrode lead 9 are connected, respectively.

Number of lamination times of bipolar electrodes may be adjusted in response to voltage desired. In the case where sufficient output is secured, even by thinning a sheet-like battery as much as possible, number of lamination times of bipolar batteries may be reduced.

In addition, in the bipolar battery 11, to prevent impact and environmental deterioration from exterior in service, such a structure is preferable that the part of the battery-layered product 7 is encapsulated under reduced pressure into the battery jacket material 10, and the electrode leads 8 and 9 are taken outside of the battery jacket material 10 (see FIGS. 3 and 4). In view of weight reduction, such configuration is preferable that the battery-layered product 7 is stored and encapsulated under reduced pressure (airtight seal), by using a polymer-metal composite laminate film as the battery jacket material 10, so as to join a part of or a whole of the outer circumference part thereof by heat fusion, and thereby the electrode leads 8 and 9 are taken outside of the battery jacket material 10. Fundamental structure of this bipolar battery 11, as shown in FIG. 4, may be referred to as configuration where a plurality of laminated unit battery layers (unit cells) 6 are joined in series. Note that a bipolar battery of the present invention is used as a bipolar lithium ion secondary battery, where charge-discharge is mediated by movement of lithium ions. It should be noted that application of other kinds of batteries should not be inhibited as long as effect such as improvement of battery characteristics or the like can be obtained.

Figure 14:
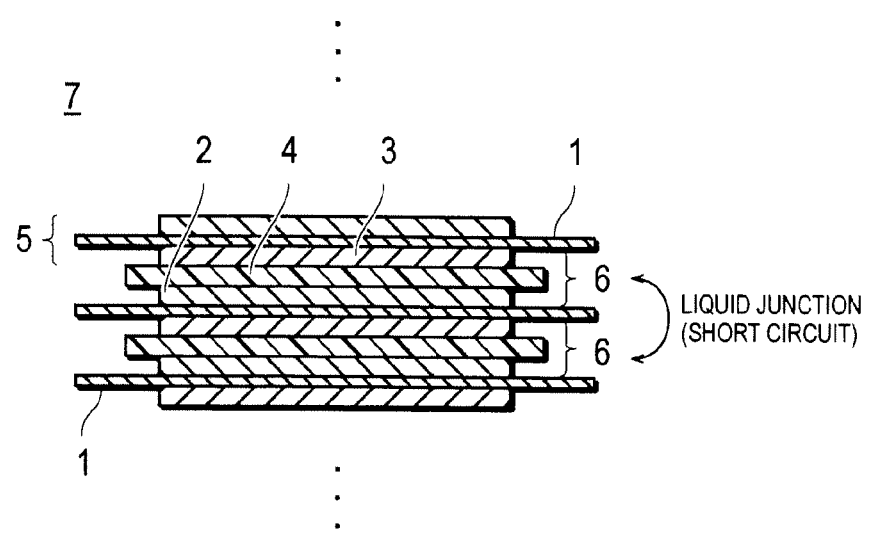
FIG. 14 is an outline cross-sectional view schematically showing a fundamental structure of a bipolar battery using a conventional polymer gel electrolyte layer.

In a bipolar battery using a conventional polymer gel electrolyte layer, as shown in FIG. 14, the bipolar electrode 5 is formed by forming the positive electrode 2 on one surface of the collector 1, and the negative electrode 3 on the surface at the other side, and by laminating thereof so as to sandwich the electrolyte layer 4. Therefore, there was a leaking out risk of an electrolyte solution, which is contained in a polymer gel electrolyte configuring the electrolyte layer 4, which then contacts an electrolyte layer of other unit battery layer 6, and could result in liquid junction (short circuit). In a bipolar battery of the present invention, as will be explained below using a drawing, a conventional problem was solved by forming an electrolyte layer arranged with a seal member at a separator. Namely, movement of an electrolyte solution contained in a part retaining an electrolyte (for example, a polymer gel electrolyte or a liquid electrolyte (an electrolyte solution) or the like) of an electrolyte layer (further in the case where a polymer gel electrolyte or a liquid electrolyte is retained by also an electrode, the polymer gel electrolyte or the liquid electrolyte is included as well) is restricted by the seal part 4 at the outer circumference part thereof, by which leak out exterior can effectively be prevented. Therefore, a bipolar battery having high safety and high quality can be provided, having no internal short circuit (liquid junction) caused by contact with electrodes or electrolyte layers of other unit battery layers. Here, FIGS. 5(A) to 5(E) are outline plan views and outline cross-sectional views stepwise showing production process appearances of an electrolyte layer (examples using polymer gel electrolyte layers are shown) arranged with a seal member at a separator, used in a bipolar battery of the present invention. Furthermore, in drawings other than FIG. 5 to be explained below, examples of using a polymer gel electrolyte layer as an electrolyte layer, similarly as in FIG. 5, will be shown. However, in the present invention, as described above, an electrolyte retained by a separator is not necessarily a polymer gel electrolyte, and a liquid electrolyte (an electrolyte solution) may also be used, in consideration of low cost and high output. Further, a solid electrolyte may be used.

Figure 5:
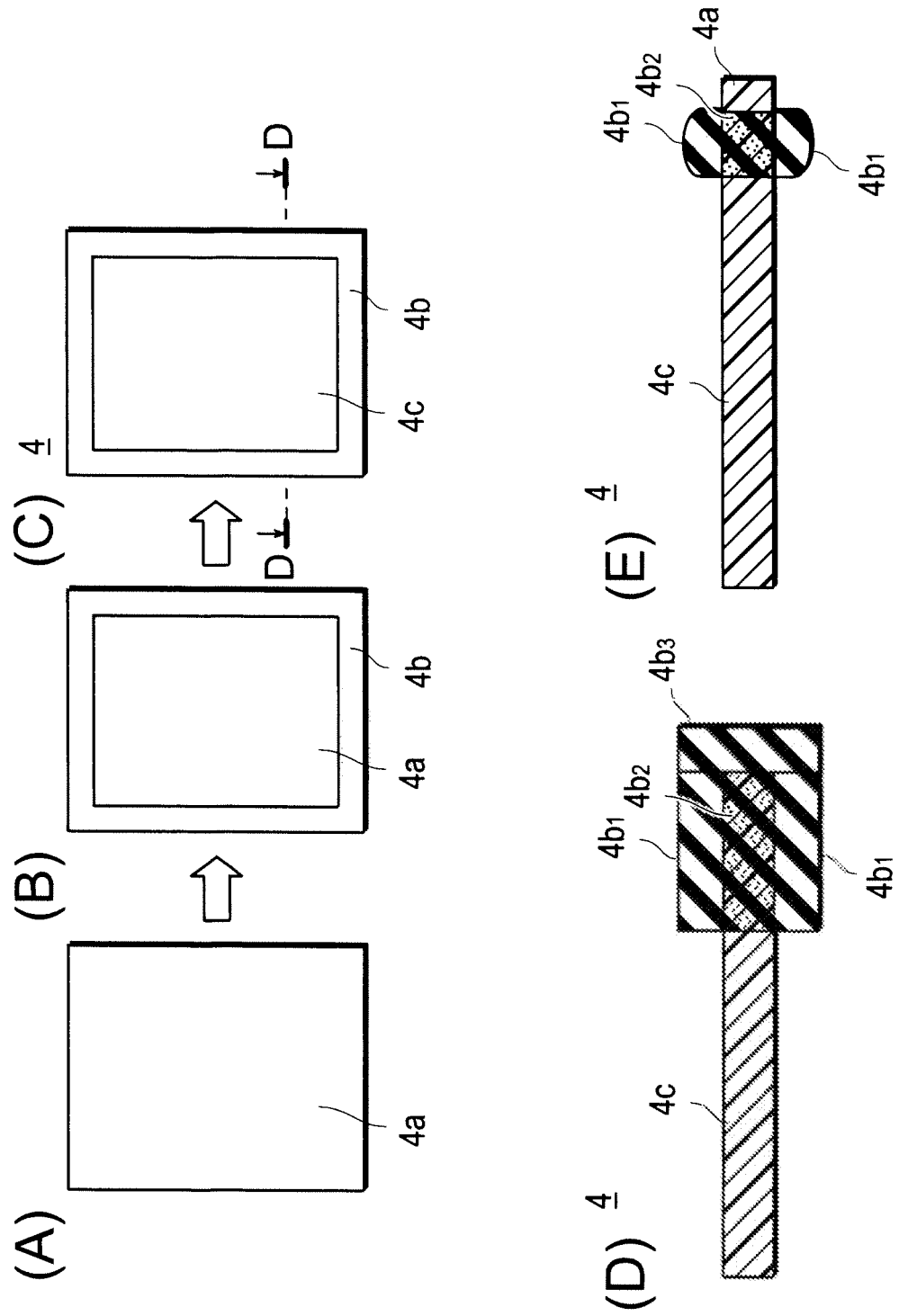
FIG. 5 is an outline plan view and an outline cross-sectional view stepwise showing production process appearances of an electrolyte layer arranged with a seal member at a separator, used in a bipolar battery of the present invention.

As shown in FIG. 5, in the polymer gel electrolyte layer 4 arranged with a seal member at a separator of the present invention, firstly, the non-woven fabric separator or the micro-porous membrane separator 4a, having corresponding size in using as the electrolyte layer, is prepared as a substrate (see FIG. 5(A)). Then, the seal part 4b is formed and arranged by forming and arranging the seal resin (solution) into a desired shape, by a suitable method for such as filling, injecting a solution or applying or impregnating at the outer circumference part of this separator $4a$, using a suitable mold with a rectangle or a semicircular shape or the like (see, FIG. 5(B)). Thickness (height) of the seal part $4b$, formed on the both surfaces of the separator $4a$, is required to be higher than thickness of the positive electrode or the negative electrode; in this way, sealing between each of unit battery layers 6 can be executed, by adhering (sealing) onto the collector 1 of the bipolar electrode 5 by pressurization or heating, by deformation under pressure or heat fusion of the seal part $4b$ of the electrolyte layer 4, after lamination of the bipolar electrode 5 and the electrolyte layer 4 (see, FIG. 7 or the like).

Then, a part for retaining a polymer gel electrolyte is formed by a suitable method such as for physical cross-linking by application or impregnating or the like of a raw material slurry for a gel electrolyte (a pre-gel solution) at the inside (the vicinity of the center part) enclosed by the seal part $4b$ of the separator $4a$ as a substrate, and further for chemical cross-linking or the like by polymerization (see FIGS. 5(C) to 5(E)). In this way, the electrolyte layer 4 can be produced, which has a structure where a polymer gel electrolyte is retained at the vicinity of the center part of the separator $4a$, and a seal resin as the seal part $4b$ is formed and arranged at the outer circumference of the member (the gel electrolyte part $4c$) which retains the gel electrolyte of the separator $4a$.

Configuration of forming and arranging a seal resin (arrangement configuration of a seal part) to the both surfaces of a separator is not especially limited, as long as effectively expressing sealing effect between unit battery layers inside a bipolar battery. For example, a rectangle cross-section shown in FIG. 5(D), a semicircular or eclipse cross-section shown in FIG. 5 (E) and the like are exemplified, however, not limited thereto.

In addition, a seal member (seal part) obtainable by forming and arrangement of the above seal resin desirably passes through the separator or covers all of the outer circumference of the side surfaces of the separator; because of being capable of more securely prevent leak out of an electrolyte solution from the gel electrolyte part $4c$ of the separator. In particular, in the case where a non-woven fabric-based separator is used as the separator, it is required that (1) a seal resin is formed without clearance by impregnating inside the separator and arrange so that the seal member (the seal part $4b_2$) passes through the separator (see FIGS. 5(D) and 5(E)), or (2) the seal member (the seal part $4b_2$) is required to be arranged so as to cover as wide as whole outer circumference (outer side) of the side surface of the separator (see FIG. 5(D)); because of necessity to prevent leak out of an electrolyte solution from the side surface of the separator through the inside of the separator from the gel electrolyte part $4c$ of the electrolyte layer 4. It is also because in the non-woven fabric-based separator, leak out of an electrolyte solution through the inside of the separator more likely generates from the side surface of the separator to the outside, as compared with a micro-porous membrane separator. Note that, in a micro-porous membrane separator, pores are formed only in the lamination direction, which makes movement of an electrolyte solution difficult in the direction perpendicular to a lamination direction, that is, in the side surface direction, therefore, the seal part $4b_1$ may be enough to be arranged at both the upper and lower surfaces of the separator, however, similarly as in a non-woven fabric-based separator, the seal part $4b_2$ or the seal part $4b_3$ may be arranged. Which one is adopted may be determined by intended use or total configuration of a battery. For example, in the case where gas may generate inside a battery, electrode peeling or deterioration of battery performance caused by gas can be prevented by arrangement of the seal part $4b_1$ so as to discharge to the exterior, gas generated inside the unit battery layer through the inside of the separator. On the other hand, in the case where such an electrode is adopted that was subjected to gas generation prevention processing in advance, sealing effect may further be enhanced by arrangement of the seal part $4b_2$ or the seal part $4b_3$ in addition to the seal part $4b_1$.

Thickness of a part (the gel electrolyte part $4c$) of the above electrolyte layer, which retains a gel electrolyte, is not especially limited. To obtain a compact bipolar battery, it is preferable to make the thickness as thin as possible in a range to secure function as an electrolyte layer. From such a viewpoint, thickness of a polymer gel electrolyte layer of the present invention is about 5 to 200 μm.

Thickness of this gel electrolyte part $4c$ may be equivalent to that of the separator $4a$ (see FIGS. 5 (D) and 5 (E)), or may be formed thicker than that of the separator $4a$. In the case of setting thicker than thickness of the separator $4a$, the thickness may be increased by repeating, several times, operation of application or impregnation of a pre-gel solution and curing by polymerization, or predetermined thickness may be attained by one time operation using a suitable tool for thickness controller or the like, however, should not especially be limited.

As the above seal resin, a rubber-based resin suitably adhered (sealed) with a collector by deformation under pressurization, or a heat fusion resin such as an olefin-based resin suitable to adhere with a collector by heat fusion by heating and pressurization or the like may suitably be utilized. In addition to these, various types of resins having alkali resistance and sealing property may be used, as long as being capable of effectively exerting the effect of the present invention.

In the present invention, use of a rubber-based resin as an embodiment of the above seal resin is desirable; because sealing of an electrolyte (to prevent leak out of an electrolyte solution) is possible by deformation under pressurization of a rubber member (a rubber-based seal member) obtained by forming a rubber-based resin at around the outer circumference part of the separator. In particular, in an embodiment using a rubber-based resin, liquid junction (short circuit) caused by leak out of an electrolyte can be prevented by utilization of elasticity of a rubber-based seal member. In addition, it is advantageous in view of simplification of a battery production process because of no requirement of a heat fusion processing. Furthermore, because elasticity of a rubber-based seal member is utilized, sealing effect can be maintained by easily twisting or deforming a rubber-based seal member also, following twisting and deformation of the battery, even in such environment as fine twisting or repeated deformation of a battery is repeated, caused by vibration or impact.

The above rubber-based resin is not especially limited, as long as exerting excellent sealing effect for an electrolyte (prevention of solution leak out) as the above seal member of a bipolar battery, even in any service environment of a bipolar battery, however, preferably includes a rubber-based resin selected from the group consisting of silicone-based rubber, fluorocarbon-based rubber, olefin-based rubber, and nitrile-based rubber; because these rubber-based resins are capable of exerting the particularly excellent effect. Furthermore, these rubber-based resins are excellent in sealing performance (liquid-tightness), alkali resistance, chemical resistance, durability, weatherability, heat resistance or the like, and are capable of maintaining these excellent performances and quality for a long time, without deterioration even in service environment. Therefore, it is because they are capable of effectively preventing leak out of an electrolyte solution from a polymer gel electrolyte, and preventing, for a long time, liquid junction (short circuit) caused by leak out of an electrolyte solution. However, the rubber-based resin is not limited thereto.

Figure 6:
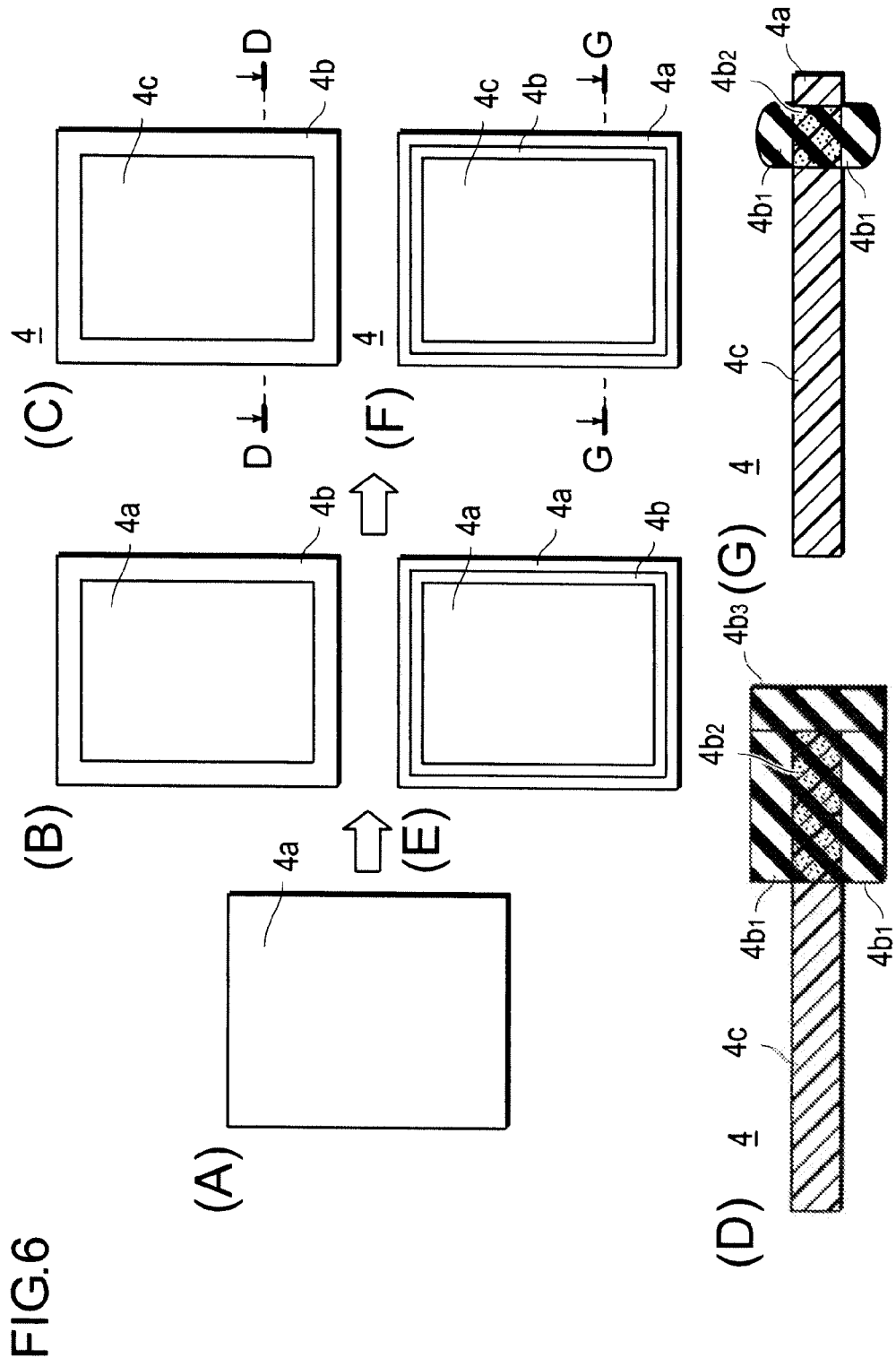
FIG. 6 is an outline plan view and an outline cross-sectional view stepwise showing production process appearances of an electrolyte layer arranged with a rubber-based seal member at a separator, used in a bipolar battery of the present invention.

FIGS. 6(A) to 6(G) are outline plan views and outline cross-sectional views stepwise showing production process appearances of a polymer gel electrolyte layer arranged with a rubber-based seal member at a separator, used in a bipolar battery of the present invention. In FIG. 6, because of being similar as explained in FIG. 5, except that the seal part 4b is formed using the rubber-based resin, as the seal resin explained in FIG. 5, explanation here is omitted. Note that FIGS. 6(E) to 6(G) show production process appearances of a polymer gel electrolyte layer having a semicircular or eclipse cross-section, the same as in FIG. 5(E), as configuration of forming and arranging of a seal resin (arrangement configuration of the seal part) at the both surfaces of the separator. Also in these cases, the seal part 4b is formed and arranged by forming a solution of the rubber-based resin (seal resin) into a desired shape at the outer circumference part of the separator 4a, by a suitable method for such as filling, injecting a solution or applying or impregnating, using a suitable mold with a semicircular or semi-eclipse shape cross-section or the like (see, FIG. 6(E)). Thickness (height) of the seal part 4b formed at the both sides of the separator 4a is required to be formed higher than thickness of an electrode (a positive electrode or a negative electrode); in this way, sealing between each of unit battery layers 6 can be executed by adhering (sealing) the bipolar electrode 5 onto the collector 1, by pressurization so as to deform, under pressurization, the seal part 4b of the electrolyte layer 4, after lamination of the bipolar electrode 5 and the electrolyte layer 4 (see, FIGS. 7 and 8).

Then, the electrolyte part 4c is formed by a suitable method such as for physical cross-linking by application or impregnating or the like of a pre-gel solution at the inside (the vicinity of the center part) enclosed by the seal part 4b of the separator 4a, and further for chemical cross-linking or the like by polymerization (see FIGS. 6 (F) and 6 (G)). In this way, the electrolyte layer 4 can be produced, which has a structure where a polymer gel electrolyte is retained at the vicinity of the center part of the separator 4a, and a rubber-based seal resin as the seal part 4b is formed and arranged at the outer circumference part of the gel electrolyte part 4c of the same separator 4a.

FIGS. 7(A) to 7(D) are outline cross-sectional views schematically showing a sealing process appearance by pressurization of the above rubber-based seal member by lamination of a polymer gel electrolyte layer and a bipolar electrode.

Figure 7:
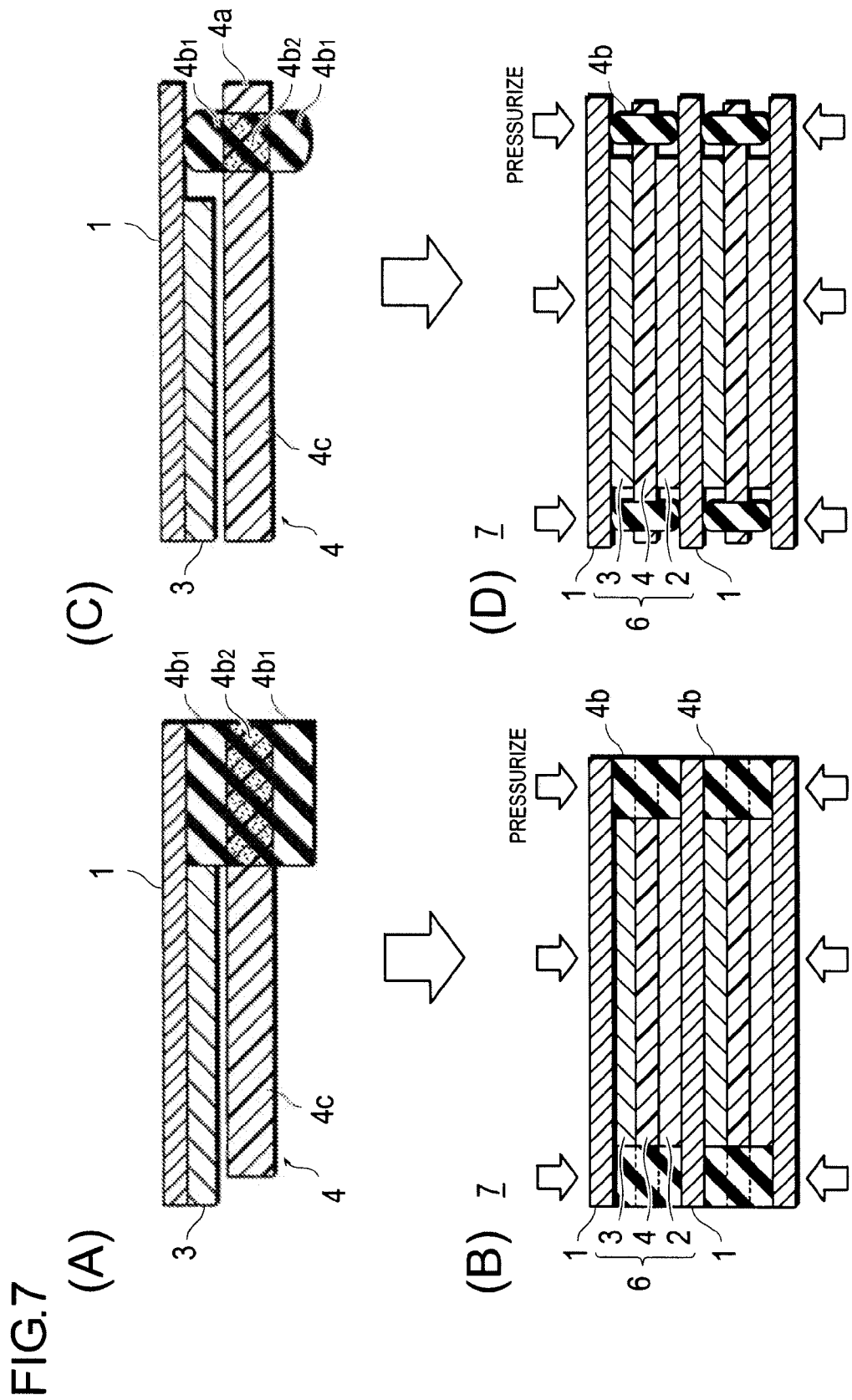
FIG. 7 is an outline plan view and an outline cross-sectional view schematically showing a sealing process by pressurization according to a typical embodiment of a rubber-based seal part of a separator, used in a bipolar battery of the present invention.

As shown in FIGS. 7(A) and 7 (C), the polymer gel electrolyte layer 4 and the bipolar electrode 5 are laminated. In this case, thickness (height) of the seal part 4b having a rectangle or semicircular cross-section, formed at the both surfaces of the separator 4a is made so as to be thicker than that of a positive electrode or a negative electrode. Therefore, it is necessary that, as shown in FIGS. 7(B) and 7 (D), adhering (sealing) onto the collector 1 of the bipolar electrode 5 is executed by pressurization of the battery-layered product 7 from upper and lower sides of the battery-layered product 7, so as to deform, under pressurization, the seal part 4b of the electrolyte layer 4, after lamination of the bipolar electrode 5 and the electrolyte layer 4. In the present embodiment, heat is further added during pressurization so as to firmly join (adhere or fusion) to the collector 1 by heat fusion in a state of deformation under pressurization of the seal member. In this way, it is not necessary to maintain the battery-layered product 7 always in a pressurized state from exterior, and thus excellent in view of no requirement of a member for pressurization.

In addition, adhering onto the collector 1 of bipolar electrode 5 may be executed by lamination of the bipolar electrode 5 and the electrolyte layer 4 in plurality to assemble the battery-layered product 7, and by pressurization of the battery from upper and lower sides of the battery so as to deform, under pressurization, the seal part 4b of the electrolyte layer 4. For example, as shown in FIGS. 8(A) and 8(B), the sealing may be executed by sandwiching a battery using a member for pushing the battery from upper and lower sides thereof, for example, the steel plate (a pinch and hold plate) 12 with a thickness of about 3 mm from upper and lower sides of the battery, and then by tightening up and retaining the steel plate 12 with the bolt 13a and the nut 13b. In this way also, adhering (sealing) of bipolar electrode 5 onto the collector 1 can be executed by pressurization of the battery from upper and lower sides of the battery so as to deform, under pressurization, the seal part 4b of the electrolyte layer 4, and thus sealing between each of the unit battery layers 6 can be executed.

Figure 8:
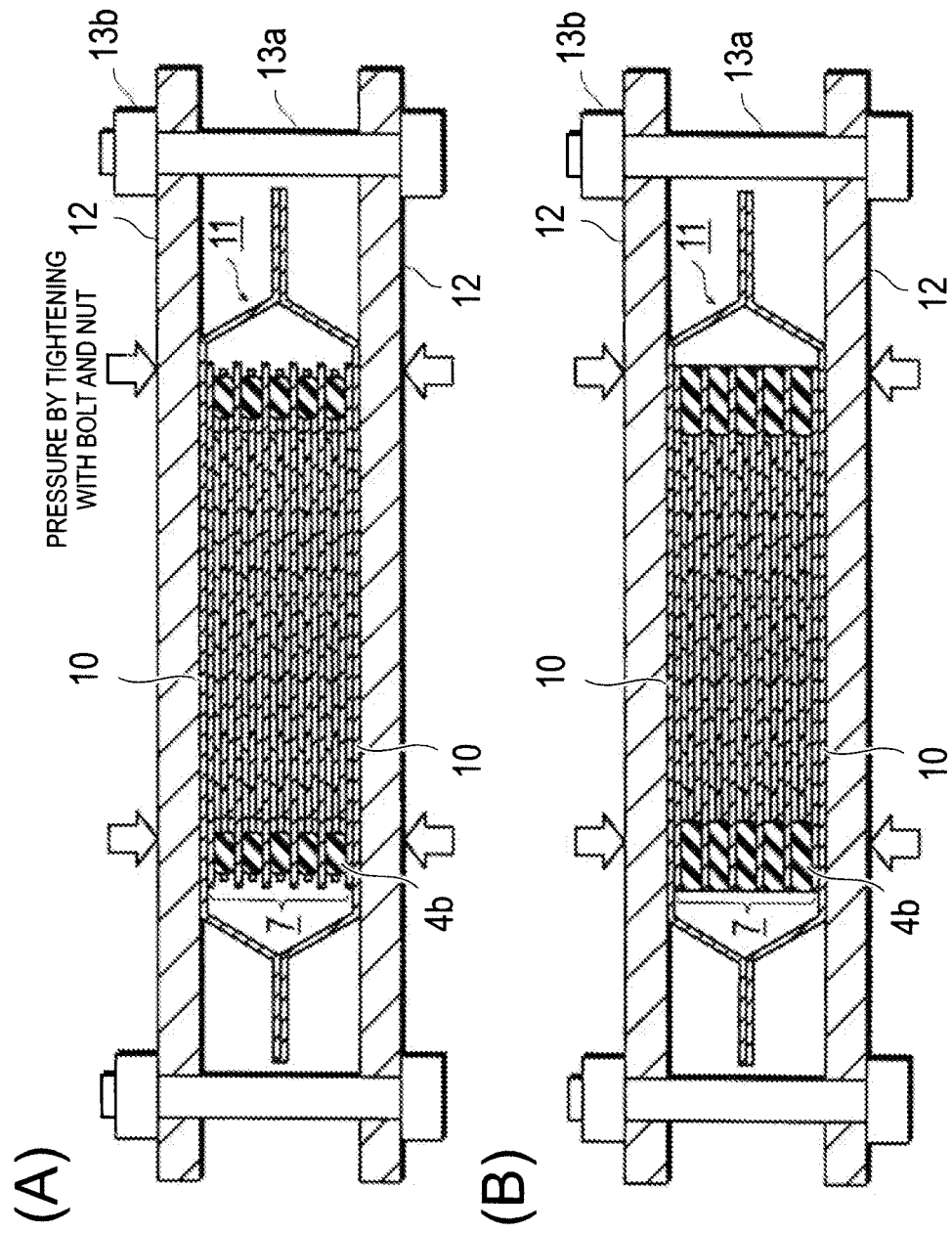
FIG. 8 is an outline cross-sectional view schematically showing a sealing process by pressurization according to another typical embodiment of a rubber-based seal part of a separator, used in a bipolar battery of the present invention.

In any of embodiments of FIG. 7 and FIG. 8, position to be pressurized may be only a place where the seal member is arranged, or whole of the battery-layered product 7 or the battery, including a place where the seal member is arranged.

In the present invention, as the other one embodiment of the above seal resin, in addition to a rubber-based resin, a heat fusion resin may be used; because seal of an electrolyte (prevention of leak out of a solution) can be attained by heat fusion of the resultant heat fusion resin member (heat fusion resin-based seal member) by forming a heat fusion resin at the outer circumference part of a separator, and a collector. In particular, because liquid junction (short circuit) caused by leak out of an electrolyte solution can be prevented by seal under heat fusion with a collector, liquid junction can be prevented as long as only adhesion by heat fusion is sufficient, even when pressurization is insufficient in heat fusion.

A heat fusion resin other than the above rubber-based resin is not especially limited as long as exerting excellent sealing effect (prevention of leak out of a solution) as the above seal member, under any service environment of a bipolar battery; preferably includes a resin selected from the group consisting of silicone, epoxy, polyurethane, polybutadiene, olefin-based resin (polypropylene, polyethylene or the like) and paraffin wax; because these resins are capable of exerting the particularly excellent effect, and furthermore, because these resins are excellent in sealing performance (liquid-tightness), alkali resistance, chemical resistance, durability, weatherability, heat resistance or the like, and are capable of maintaining these excellent performance and quality for a long time without deterioration, even under service environment. Therefore, it is because they are capable of effectively preventing leak out of an electrolyte solution from a polymer gel electrolyte, and preventing, for a long time, liquid junction (short circuit) caused by leak out of an electrolyte solution. However, such a resin is not limited thereto, and more preferably includes a resin with improved adhesion with a collector, for example, a modified polypropylene.

FIGS. 9(A) to 9(D) are outline plan views and outline cross-sectional views stepwise showing production process appearances of a polymer gel electrolyte layer arranged with a heat fusion resin-based seal member at a separator, used in a bipolar battery of the present invention. In FIG. 9, explanation is similar as in FIG. 5, except that the seal part 4b is formed using the heat fusion resin, as a seal resin explained in FIG. 5.

Figure 9:
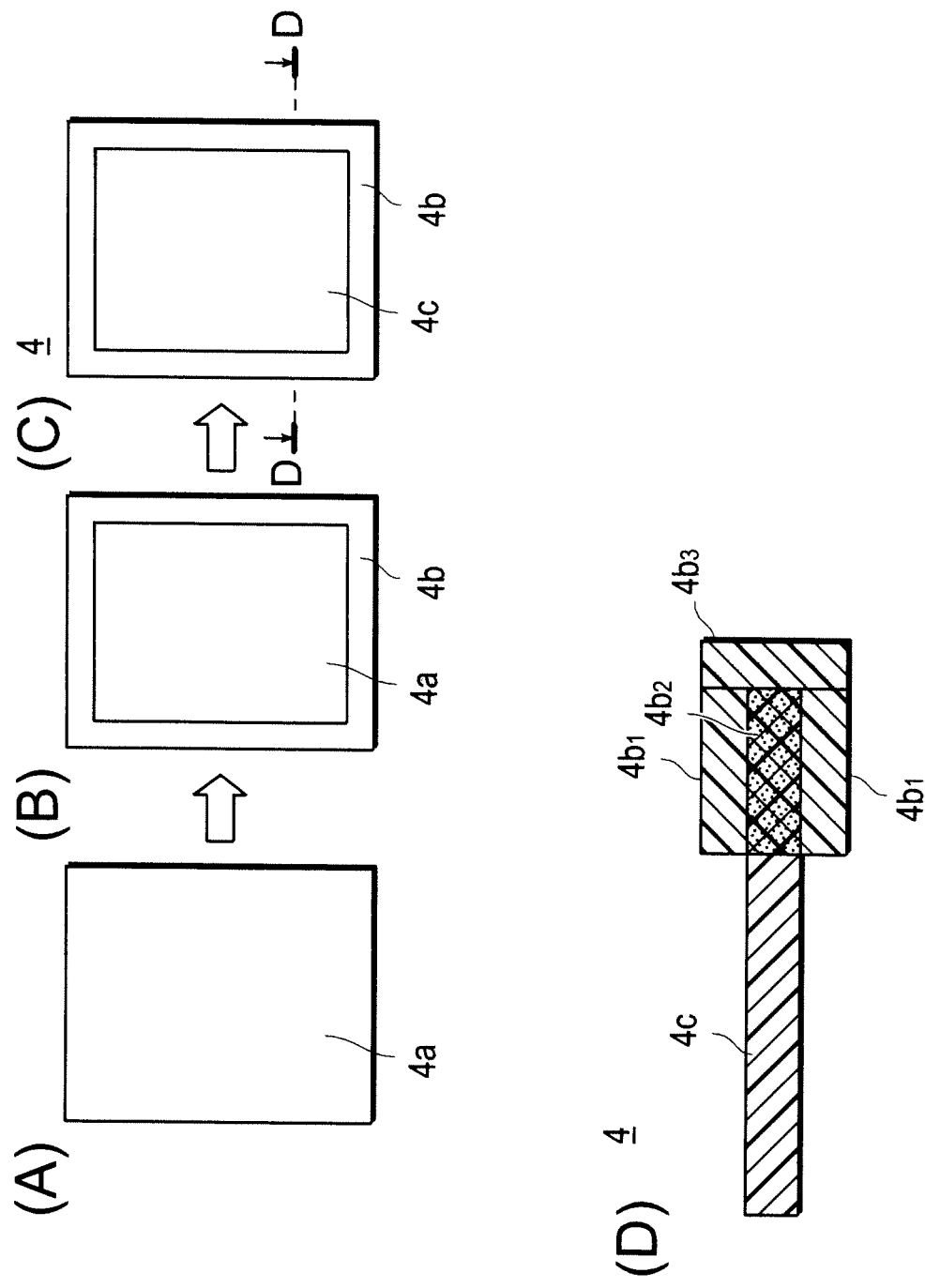
FIG. 9 is an outline plan view and an outline cross-sectional view stepwise showing production process appearances of an electrolyte layer arranged with a heat fusion resin-based seal member at a separator, used in a bipolar battery of the present invention.

As shown in FIG. 9, in the polymer gel electrolyte layer 4 arranged with a heat fusion resin-based seal member at a separator, firstly, the non-woven fabric separator or the microporous membrane separator 4a having corresponding size used in the electrolyte layer is prepared (see, FIG. 9(A)). Then, the seal part 4b is formed and arranged by forming and arranging a heat fusion resin (solution), as a seal resin, into a desired shape, at the outer circumference part of this separator 4a, by a suitable method such as for filling, injecting a solution or application or impregnating, using a suitable mold with a rectangle shape or the like (see, FIG. 5(B)). In the present embodiment also, similarly as in FIGS. 6(E) to 6(G), the seal part 4b having a semi-circular or semi-eclipse shape cross-section is applicable. In view of securing wider adhesion area with a collector, by heat fusion, and enhancing sealing effect, the seal part 4b having a rectangle cross-section shown in FIG. 9 is desirable. Note that, in the stage for forming the seal part 4b using the above heat fusion resin, forming may be carried out under any of conditions not causing heat fusion of the heat fusion resin, or causing heat fusion. Thickness (height) of the seal part 4b formed at the both sides of the separator 4a is required to be formed thicker than that of an electrode (a positive electrode or a negative electrode); in this way, sealing between each of unit battery layers 6 can be executed by adhering onto the collector 1 of the bipolar electrode 5 by heat fusion of the seal part 4b of the electrolyte layer 4 by heating and pressurization, after lamination of the bipolar electrode 5 and the electrolyte layer 4 (see, FIGS. 10(A) and 10(B)). In an alternative way, sealing between each of the unit battery layers 6 may also be executed more securely, by repeating an operation for adhering the bipolar electrode 5 to the collector 1, by heat fusion of the seal part 4b of the electrolyte layer 4, by heating and pressurization, in lamination of the bipolar electrode 5 and the electrolyte layer 4, layer by layer (or by 2 or 3 layers).

Then, the gel electrolyte part 4c is formed by a suitable method such as for physical cross-linking by application or impregnating or the like of a pre-gel solution, at the inside (the vicinity of the center part) enclosed by the seal part 4b of the separator 4a, and further for chemical cross-linking or the like by polymerization (see FIGS. 9(C) and 9(D)). In this way, the electrolyte layer 4 can be produced, which has a structure where a polymer gel electrolyte is retained at the vicinity of the center part of the separator 4a, and a heat fusion resin for sealing as the seal part 4b is formed and arranged at the outer circumference part of the gel electrolyte part 4c of the same separator 4a.

FIGS. 10(A) and 10(B) are outline cross-sectional views schematically showing a sealing process by heating and pressurization (heat fusion) of the above heat fusion resin-based seal member, by lamination of a polymer gel electrolyte and a bipolar electrode.

As shown in FIG. 10(A), the polymer gel electrolyte layer 4 and the bipolar electrode 5 are laminated. In this case, thickness (height) of the seal part 4b formed at the both surfaces of the separator 4a is formed so as to be thicker than that of an electrode (the positive electrode 2 or the negative electrode 3). Therefore, it is necessary that, as shown in FIG. 10(b), adhering of bipolar electrode 5 onto the collector 1 is executed by heating and pressurization of the seal part 4b of the electrolyte layer 4, by heating and pressurization of the battery-layered product 7 from the upper and lower sides of the battery-layered product 7, after lamination of the bipolar electrode 5 and the electrolyte layer 4. In the heating and pressurization, heating the seal member under pressurization for heat fusion, so as to firmly join (adhere or fusion) to the collector 1, is desirable. In this way, it is not necessary to maintain the seal part always in a pressurized state, by pressurization of a battery, as shown in FIG. 8, which is thus excellent in view of no requirement of the members 12 and 13 and the like, for pressurization. Note that temperature in heating may be higher than heat fusion temperature of the heat fusion resin, and may be any level in a range not to adversely affect other battery members, and may be determined as appropriate depending on kind of the heat fusion resin. For example, for modified polypropylene or the like, about 200° C. is suitable, however, not limited thereto.

Also in the above embodiment using a heat-fusion resin-based seal member, position to be heated and pressurized may be only a place where the seal member is arranged, as shown in FIG. 10(B), or whole of the battery-layered product 7 or the battery, including a place where the seal member is arranged. Furthermore, in consideration of effect by heating on battery members other than the seal member, the position to be heated and pressurized is desirably only a place where the seal member is arranged, and as for the battery-layered product 7 or battery members other than a member where the seal member is arranged, carrying out only pressurization is desirable; this is similarly adopted also in a sealing configuration by pressurization of a rubber-based seal part as shown in FIG. 7.

It is desirable that ceramic such as silica or the like or an inorganic oxide is dispersed in a seal member. Dispersion of these materials is capable of adsorbing water, which is penetrated into a resin, and provides expectation of prevention of water penetration for a long period.

Size of the separator is not especially limited as long as being the size capable of effectively expressing separator function. For example, as shown in FIG. 7(B), FIGS. 8(A) and 8(B) and FIG. 10(B), the size nearly the same as that of a collector formed with a positive electrode and a negative electrode may be utilized.

Figure 11:
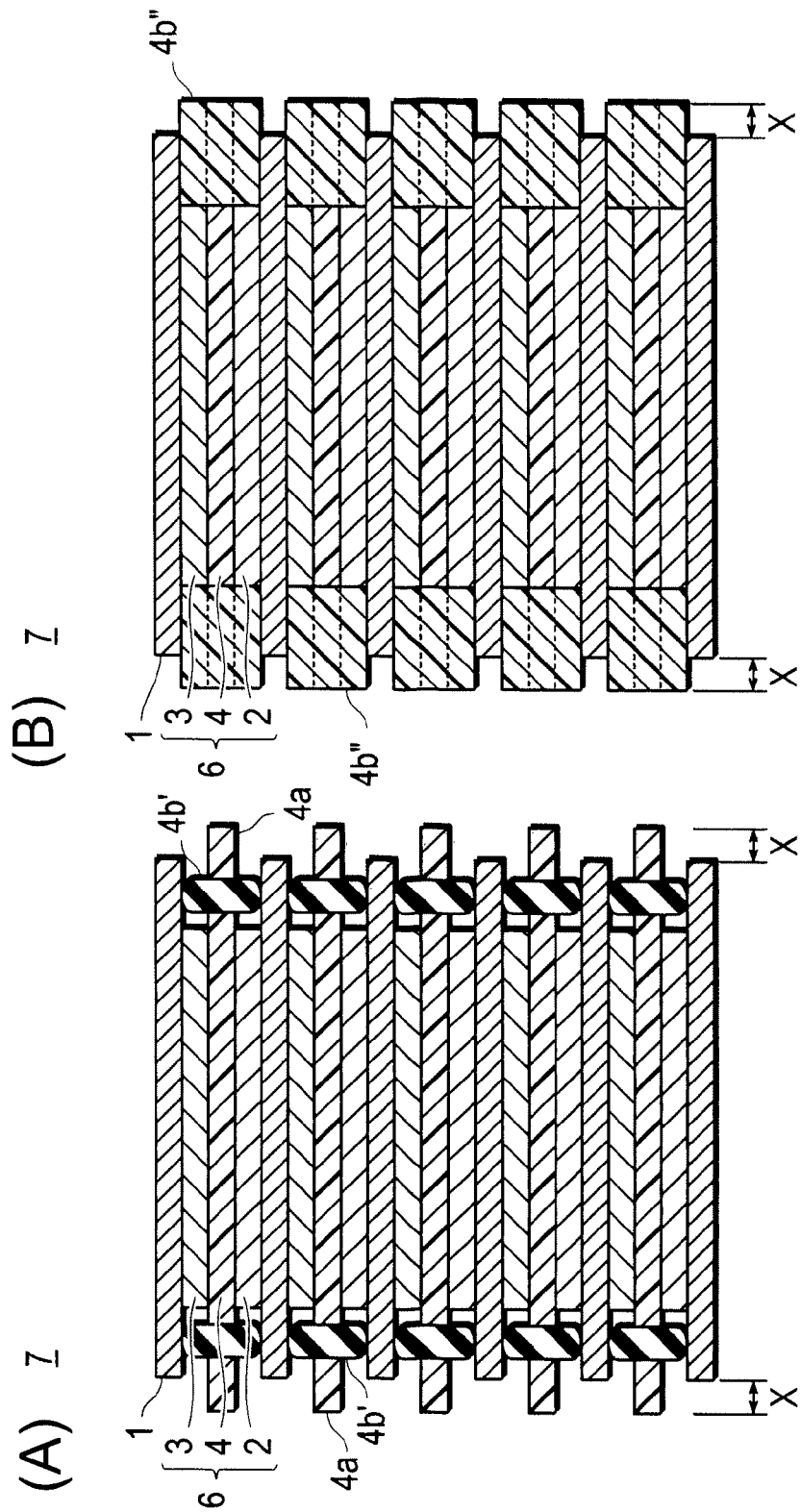
FIG. 11 is an outline cross-sectional view schematically showing an appearance of a battery-layered product formed by using a separator, corresponding to a substrate of an electrolyte layer used in a bipolar battery of the present invention, so as to be larger than a collector.

Furthermore, a suitable embodiment of the separator size will be explained using drawings. FIG. 11(A) is an outline cross-sectional view schematically showing an appearance of the battery-layered product, made by lamination of a polymer gel electrolyte layer and a bipolar electrode, and by pressurization of the above rubber-based seal member so as to be adhered (sealed). FIG. 11(B) is an outline cross-sectional view schematically showing an appearance of one embodiment of the battery-layered product, by lamination of a polymer gel electrolyte layer and a bipolar electrode, and by heating and pressurization (heat fusion) of a heat fusion resin-based seal member so as to be adhered (sealed).

As shown in FIGS. 11(A) and 11(B), the separator which holds the above polymer gel electrolyte layer, and formed and arranged with a seal resin at the outer circumference part of the member of the same separator, which retains a polymer gel electrolyte, is desirably has size larger than that of the collector 1 formed with the positive electrode 2 and the negative electrode 3. In the case where contact between adjacent collectors themselves is possible by pressurization in carrying out sealing by a rubber-based seal member, or by pressurization in heat fusion by a heat fusion resin-based seal member, the addition of a suitable insulating member is necessary. However, interior short circuit caused by contact can be prevented by making a separator larger than a collector, without the addition of other insulating member.

In the case where a separator is made larger than a collector, the size of the separator (corresponds to length "X" shown in FIGS. 11(A) and 11(B)) is desirably made larger by about 1 mm to 10 mm, preferably 3 mm to 5 mm, than the outer circumference border part (peripheral part) of the collector 1; because, in this way, contact between adjacent collectors themselves can effectively be prevented. The size of the separator specified above (length X), as shown in FIGS. 11(A) and 11(B), is effective in an embodiment where separators adjacent in the lamination direction are not subjected to contacting themselves.

In FIG. 11(A), the rubber-based seal part 4b' is arranged in an adhered state between the collectors 1 at the outer circumference part of a part formed with the positive electrode 2 and the negative electrode 3, so as to effectively function sealing effect by elasticity of a rubber-based seal member. Furthermore, at the outer circumference part of the rubber-based seal part 4b', a polymer gel electrolyte is not retained, and the separator 4a with insulating property has a structure of being extended outside the collector 1, because of being larger than the collector 1. In this way, internal short circuit, caused by contact between adjacent collectors 1 themselves, can be prevented, even when load (external force) is added so as to adhere the outer circumference border parts themselves of adjacent collectors 1, in encapsulating the battery-layered product 7 by the battery jacket material 10, under reduced pressure.

Similarly also in FIG. 11(B), the heat fusion resin-based seal part 4b" is arranged in adhered state between the collectors 1 at the outer circumference part of a part formed with the positive electrode 2 and the negative electrode 3, so as to effectively function sealing effect by heat fusion of a heat fusion resin-based seal member. Furthermore, the heat fusion resin-based seal part 4b" has a structure of being extended outside the collector 1 because heat fusion resin-based seal part 4b" is larger than the collector 1. In this way also, internal short circuit caused by contact between adjacent collectors 1 themselves can be prevented.

Figure 15:
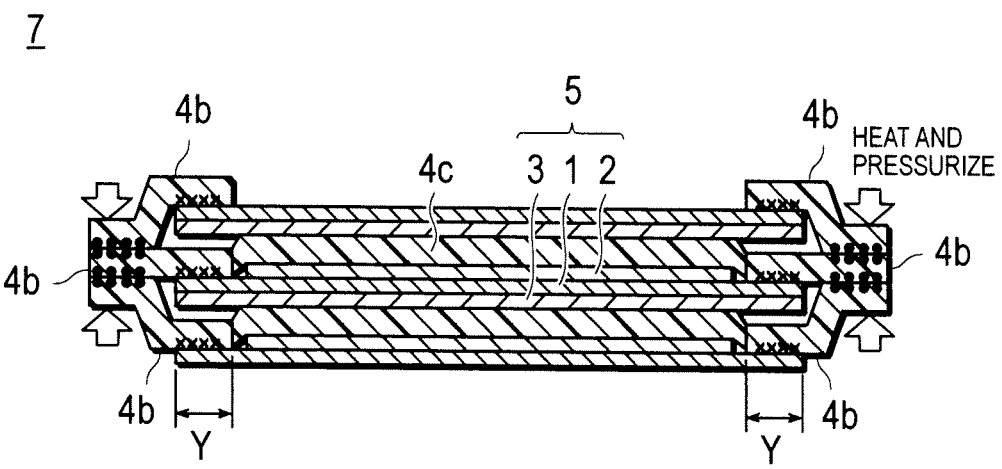
FIG. 15 is an outline cross-sectional view schematically showing an appearance of another embodiment of an battery-layered product made by lamination of a polymer gel electrolyte layer and a bipolar electrode, and adhering (sealing) the heat fusion resin-based seal member by heating and pressurization (heat fusion).
Figure 18:
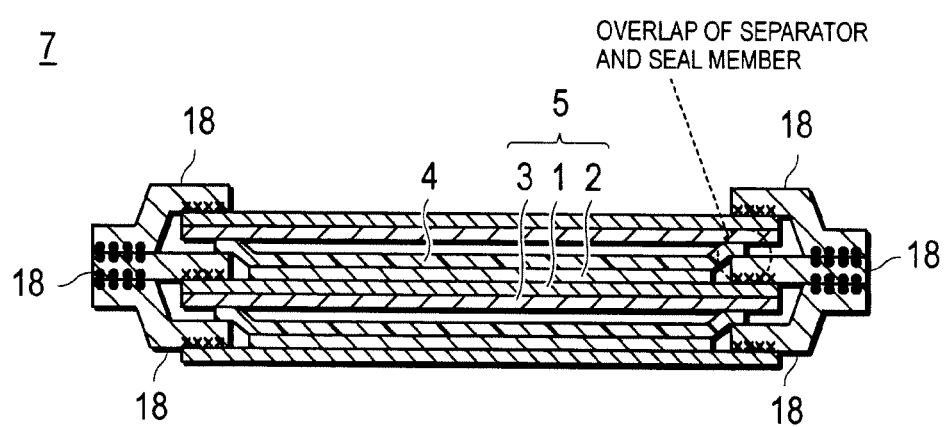
FIG. 18 is an outline cross-sectional view schematically showing an appearance of a battery-layered product made by separately mounting, in a separator, a polymer gel electrolyte layer, where a polymer gel electrolyte is retained, and a seal member (a reference example).

Furthermore, a suitable other embodiment of the separator size will be explained using drawings. FIG. 15 is an outline cross-sectional view schematically showing an appearance of other embodiment of an battery-layered product made by lamination of a polymer gel electrolyte layer and a bipolar electrode, and adhering (sealing) of a seal member formed with a seal resin by heating and pressurization (heat fusion). FIGS. 16(A) to 16(C) are outline cross-sectional views schematically showing appearances of other embodiments of an electrode-electrolyte layer seal member formed by lamination of the bipolar electrode (or the most outer layer electrode) and an electrolyte layer, layer by layer. FIG. 18 is an outline cross-sectional view (reference drawing) schematically showing an appearance of a battery-layered product made by separately mounting a polymer gel electrolyte layer and a seal member.

In the present invention, in the case where a separator is made larger than a collector, furthermore as shown in FIG. 15, a separator may be adhered to (sealed with) other separator (a seal resin part formed thereon; the seal part 4b), adjacent in the lamination direction at a part larger than the collector 1 of the separator (the electrolyte layer 4). In such a configuration, the seal part 4b, formed at the outer circumference part of the part 4c of a separator, which retains a polymer gel electrolyte, is designed to have a seal part of the following (A) and a seal part of the following (B). In this way, by furnishing the function as a seal member to the outer circumference part of the separator, overlap can be eliminated in lamination, similarly as in other embodiment, which is thus excellent in view of being capable of providing further thinning.

Here, the seal part of the (A) is a part adhered to and sealed with the collector 1, at the outer circumference part of apart formed with the positive electrode 2 (or the negative electrode 3) (sealed parts in FIGS. 15 and 16; see x mark). Length of the member, which is adhered to and sealed with the collector 1, that is a seal part of the "A" (length "Y" shown in FIGS. 16(A) to 16 (C)) is desirably determined as appropriate, so that suitable sealing function can be furnished to the seal part of the above (A). Furnishing to the seal part of the above (A) suitable sealing function is capable of effectively preventing contact between adjacent collectors themselves. Such requirement is desirably set also in other embodiment so as to satisfy the above range. To satisfy the above requirement, it is necessary that a collector has size capable of ensuring necessary area of the positive electrode 2 (or the negative electrode 3), and has width of the outer circumference part formed with the positive electrode 2 (or the negative electrode 3) so as to ensure the above length Y. Similarly, a separator may ensure the member 4c, which retains an electrolyte, corresponding to area of the above positive electrode 2 (or the negative electrode 3), and may form the seal part 4 at the outer circumference part. Note that the separator size may be set so as to satisfy requirement of length Z specified for a seal part of the following (B).

The seal part of the above (B) is a part adhered to and sealed with the seal part 4b formed at the different separator adjacent in the lamination direction, in a member larger than the collector 1 of a separator (the electrolyte layer 4) (sealed members in FIG. 15; see • mark). Size of the separator (length "Z" shown in FIGS. 16(A) to 16 (C)) is desirably larger, by predetermined value, than the outer circumference border part (peripheral part) of the collector 1, so that suitable sealing function can be furnished to the seal part of the above (B). Setting the separator size (length "Z" shown in FIGS. 16(A) to 16 (C)) larger than the outer circumference border part (peripheral part) of the collector 1 is capable of effectively preventing contact between adjacent collectors themselves, and at the same time, the seal part 4b, which is formed and arranged at the different separator adjacent in the lamination direction, at a part larger than the collector 1, is capable of more firmly been adhered (sealed). Note that seal part of such (B) may be adhered (sealed) layer by layer, or may be adhered (sealed) at one time from upper and lower sides of the seal part 4b, however, not especially limited thereto.

Furthermore, as shown in FIG. 18, separate mounting of the polymer gel electrolyte layer 4 and the seal member 18 for a rectangle mold has a problem of inhibiting of making a thin layer, caused by an overlapped part in lamination (see a part enclosed by a circle in FIG. 18); in addition, it is a cause of reducing cell flatness. On the other hand, in the present invention, not limiting to the present embodiment, because of structure where a seal resin (the seal part 4b) is formed in one piece at the outer circumference part of the member 4c of a separator, which retains a polymer gel electrolyte, the outer circumference part of the separator is capable of effectively functioning as a seal member; therefore, excellent in view of possibility for thinning, without overlapping between the electrolyte layer 4c (or a separator) and a seal member, as shown in FIG. 18, and without impairing cell flatness.

Such a configuration is desirably made layer by layer in the preparation stage of an battery-layered product (a battery element part) having a structure where a plurality of pieces of bipolar electrodes 5 are laminated via the electrolyte layer 4 where a polymer gel electrolyte is retained in a separator. In more detail, one of the electrolyte layers 4 is laminated at the positive electrode 2 side (or the negative electrode 3 side) of one bipolar electrode 5. Then, the electrode-electrolyte layer seal member 17 is formed, by heat sealing of a part of the seal part 4b formed at the outer circumference part of the electrolyte layer 4, layer by layer (see seal positions (x mark) in FIG. 16(A)) in the arrow head direction from upper and lower sides, onto a part of the collector 1 at the outer circumference border part where the positive electrode 2 (or the negative electrode 3) of the bipolar electrode 5 is not formed. Subsequently, as shown in FIG. 15, by lamination of a plurality of the resultant electrode-electrolyte layer seal members 17, and finally by sealing, under heating, the seal parts 4b themselves, in the arrow head direction, from upper and lower sides at the most outer circumference (see seal position (• mark) in FIG. 15), the battery-layered product 7 is obtained.

In this case, as the most outer layer of the battery-layered product 7, as shown in FIGS. 16(B) and 16 (C), use of the electrode-electrolyte layer seal members 17a and 17b is preferable, which is obtained by sealing the most outer layer electrodes 5a and 5b formed with an electrode only at one required surface of the collector 1, with the seal part 4b of the outer circumference part of the electrolyte layer 4. In these seal members 17a and 17b, in the electrode-electrolyte layer seal member 17a, which is used in the most outer layer of the positive electrode side shown in FIG. 16(B), the electrolyte layer 4 is laminated at the positive electrode side of the electrode 5a arranged with the positive electrode 2 on one surface of the collector 1. Then, by sealing (adhering) a part of the seal part 4b at the outer circumference part of the electrolyte layer 4 onto the collector 1 at the circumference border part of the positive electrode side not formed with the positive electrode 2 of the electrode 5a, by heating and pressurization from upper and lower sides, as shown by an arrow mark in the drawing, the electrode-electrolyte layer seal member 17a can be obtained. On the other hand, in the electrode-electrolyte layer seal member 17b, which is used in the most outer layer of the negative electrode shown in FIG. 16(C), the seal part 4b is laminated on the other surface, not formed with the negative electrode, of the electrode 5b arranged with the negative electrode 3 at only one surface of the collector 1. Then, by sealing (air-tightly adhering) the seal part 4b onto the collector 1 at the outer circumference of the other surface, not formed with the negative electrode, of the electrode 5b, by heating and pressurization from upper and lower sides, as shown by an arrow mark in the drawing, the electrode-electrolyte layer seal member 17b can be obtained. As this seal part 4b, one not having (removed) the member 4c, which retains a polymer gel electrolyte at the center part, among the electrolyte layers 4, may be used. This seal part 4b may be prepared by, for example, forming and arranging a seal resin at whole of the separator in a rectangle mold, however, not limited to any of such methods.

In addition, at the seal part 4b of the outer circumference part of the separator (the electrolyte layer 4) in FIG. 15, a seal resin (a heat fusion resin or adhesive or the like) may be soaked at the outer circumference part so as to fill holes of the separator, and also to furnish adhesiveness (heat fusion property), and the seal part 4b may be formed so as to be the same thickness as that of the separator. Alternatively, thickness of the seal part 4b may be formed thicker by such degree that there is no clearance between the outer circumference parts of the adjacent electrodes, after lamination of a plurality of layers.

Note that also in the present embodiment, like the embodiments shown by the above FIG. 10(B) or the like, the seal part of the above (A) of each of the seal parts 4b of these plurality of layers may be adhered (sealed) by heating and pressurization, from upper and lower sides, all at once, after a plurality of the layers are laminated; subsequently, at the most outer circumference part, seal parts themselves of the above (B) of each of the seal parts 4b may be adhered (sealed) by heating and pressurization, from upper and lower sides, all at once or the like, however, not especially limited thereto.

The case, where the seal part of the above (A) is sealed layer by layer, increases number of sealing times (number of heating times) compared with the case where sealing by heating of these plurality of layers is carried out all at once, after lamination of a plurality of layers, however, is excellent in view of being capable of surely adhering, layer by layer, a collector and a seal member of a separator; namely a method for sealing, layer by layer, is excellent in being capable of sealing all layers more uniformly and surely.

On the other hand, even in the case where, after laminating a plurality of the above seal parts (A), a plurality of these layers are subjected to heat sealing all at once, the heating operation may be terminated after confirming sufficient melting of the seal member at the center part of the plurality of these layers, and sealing by adhesion to a collector. Furthermore, to more uniformly and surely seal all of the layers after lamination of the plurality of layers, the following configuration of the seal member of a separator is desirable; namely, as is shown in FIG. 10(B), in the case where sealing is performed by heating and pressurization from the most outer layer at the both sides of the plurality of laminated layers, temperature gradient is formed from the most outer layer to the center part: therefore, even when a seal member at the most outer part is melted, a seal member at the center part could not sufficiently be melted. Therefore, designing is desirably performed using different seal resins so that melting points thereof are lower from the most outer layer side toward the center part, and thus melting is attained in nearly the same timing and uniformly from the most outer layer side toward the center part. In this case, the seal resins are required to be selected, as appropriate, so that seal property is not impaired in softening and melting of the seal resins in such high temperature environment, in consideration of increase in battery temperature in charge-discharge.

Note that, even in the present embodiment shown in FIG. 15, a structure and a production method of and for the electrolyte layer 4 is the same as explained above using FIG. 5, FIG. 6, FIG. 9 and the like. However, in the present embodiment, because the seal part 4b of the electrolyte layer 4 is provided with the above seal part (A) and the above seal part (B), the seal part 4b is not necessarily formed and arranged so as to have the constant thickness at both upper and lower surfaces of the separator. For example, (1) the seal part 4b may be formed and arranged so as to have the constant thickness only at any one of both upper and lower surfaces of the separator, or (2) a seal resin (for example, a heat fusion resin or adhesive or the like) may be penetrated at the outer circumference part of the separator, so that holes of the separator are filled with nearly the same thickness as that of the separator, and form and arrange the seal resin so as to furnish adhesiveness. In this way, by furnishing function as a seal member to the outer circumference part of the separator, further thinning is possible without overlapping in lamination.

Figure 17:
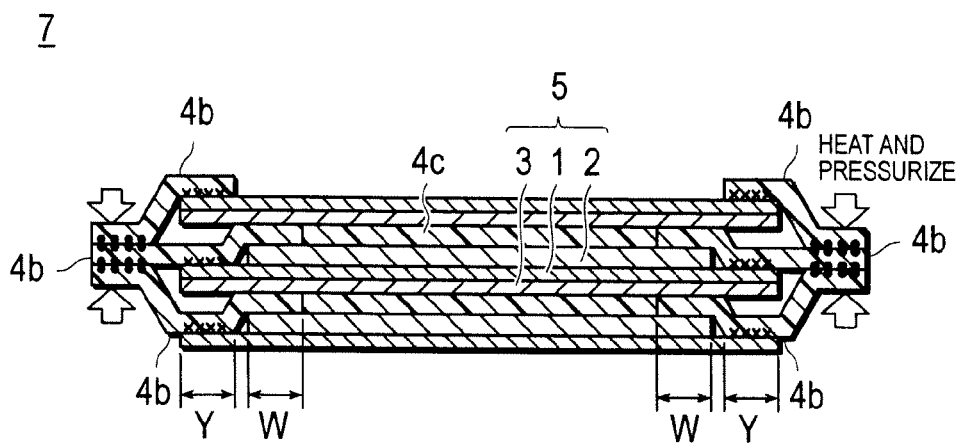
FIG. 17 is an outline cross-sectional view schematically showing an appearance of a battery-layered product made by laminating a polymer gel electrolyte layer and a bipolar electrode, and further by separately arranging an insulating layer at the outer circumference part of the bipolar electrode, so as to partially overlap with the separator.

Suitable further other embodiments of the separator size will be explained using drawings. FIG. 17 is an outline cross-sectional view schematically showing an appearance of an battery-layered product made by laminating a polymer gel electrolyte layer and a bipolar electrode, and further by separately arranging an insulating layer at the outer circumference part of the bipolar electrode so as to partially overlap with the separator. Note that, the seal part 4b at the outer circumference part of the separator (the electrolyte layer 4) in FIG. 17 shows an example where a seal resin (for example, a heat fusion resin or adhesive or the like) is penetrated at the outer circumference part, so that holes of the separator are filled, also to furnish adhesiveness (heat fusion property), and is formed in nearly the same thickness as that of the separator.

In the present invention, as shown in FIG. 17, a seal resin may be formed and arranged, so that area of the separator part 4c, where a polymer gel electrolyte is retained, is smaller than area of at least one of the electrodes (the positive electrode 2 or the negative electrode 3), preferably, than area of the positive electrode 2.

In such a configuration, in view of a structure, as shown in FIG. 17, the seal part 4b overlaps on the positive electrode 2 (or the negative electrode 3), which provides a merit of suppressing side reactions (such as dissolution of the collector 1 and the like) of a member not containing electrode active material, as well as effect of the present invention as described above. Note that, a part of overlap of the seal part 4b on the positive electrode 2 (or the negative electrode 3) generates a demerit of a little decrease in capacity, however, is allowed without any problem in many applications, as long as satisfying requirement on length, W, specified below. In particular, a little decrease in capacity may be allowed without any problem, in the case of automotive applications (for example, a power source for driving), and thus may be particularly useful technology.

Width (length "W" shown in FIG. 17) of the seal part 4b of the separator (the electrolyte layer 4) overlapping on the positive electrode 2 (or the negative electrode 3), is desirably determined as appropriate, so that suppression effect of the above side reactions (such as dissolution of the collector and the like) can effectively be exerted. Setting of such length W is capable of suppressing a demerit of a little decrease in capacity described above to the minimum, as well as exerting suppression effect of the above side reactions (such as dissolution of the collector and the like) in maximum. Note that, even in the present embodiment, length Y and length Z shown in FIGS. 16(A) to 16(C) are desirably set to satisfy the above specified range, so that suitable sealing function is obtained by providing the seal parts (A) and (B).

Namely, in a conventional bipolar battery, as shown in FIG. 14, the collectors 1 of the adjacent bipolar electrodes 5 themselves, at the part not formed with an electrode (the positive electrode 2 or the negative electrode 3), are arranged in an opposed way (also apart not via the separator presents); which provided a problem of generation of side reactions at the part of the collector 1, resulting in dissolution of the collector 1 during charge-discharge of a battery. Therefore, the problem is eliminated by forming the negative electrode 3 on the collector 1 having a large problem, namely at the negative electrode side which more likely generates side reactions, so as to be wider than the positive electrode 2 formed on the collector 1 at the positive electrode 2 side. Therefore, the collector 1 at the positive electrode side, at a part not formed with the positive electrode 2, has a structure apposed to the negative electrode (negative electrode active material layer) 3 formed widely in advance. This configuration for solving the above problem is effective also in the present invention, for example, as shown in FIGS. 15 to 17, and the same configuration can be adopted. Note that, such configuration is not especially shown except these drawings, however, also in other embodiments of the present invention, may be adopted as appropriate, if necessary.

However, the collector 1 at the positive electrode side, at a part not formed with the positive electrode 2, may sometimes show side reactions, even when the negative electrode 3 may be formed widely on the apposed collector 1 as above. Therefore, in the present embodiment, designing that an ion non-permeable seal layer (the seal part 4b of the separator) overlaps the positive electrode 2 (or the negative electrode 3) is capable of preventing opposing of the collectors 1 themselves at a part not formed with an electrode (the positive electrode 2 or the negative electrode 3), or the collector 1 at a part not formed with the positive electrode 2, with the negative electrode 3 formed widely. In this way, side reactions of both of the collectors 1, at a positive electrode side and an negative electrode side, can effectively be prevented, in particular, also a little side reaction at the positive electrode side collector 1 can effectively be prevented, which provides further longer life-time, and is capable of providing particularly useful technology in the case of using in an automotive application (for example, a power source for driving) where long term use is strongly required.

It should be noted that, in the present embodiment, as already explained, a seal resin is desirably formed and arranged, so that area of a part of the separator, where a polymer gel electrolyte is retained, is smaller than that of the positive electrode.

On the other hand, area of a negative electrode, on the contrary, may be larger than that of a part of the separator, where a polymer gel electrolyte is retained, or, as shown in FIG. 17, may be the same as that of the collector. However, like in other embodiments, in the case where adjacent collectors themselves are sealed by adhesion by the seal part 4b, an outer circumference part not formed with a negative electrode is desirably formed by amount of a part necessary in the sealing, for example, by length W, shown in FIG. 17.

In addition, in the embodiments shown in FIGS. 15 and 17, use of heat fusion resin-based seal part 4", as the seal part 4, is desirable.

In addition, as shown in FIG. 3, FIGS. 7(B) and 7(D), FIGS. 8(A) and 8(B), FIG. 10(B), and FIGS. 11(A) and 11(B), at the upper layer or lower layer of the collector 1 of the electrode for taking out current, namely the electrodes 5a and 5b at the top layer and the bottom layer of the battery-layered product 7, a strong electric tab suitable for taking out current may further be mounted, if necessary. As the strong electric tab suitable for taking out current, one having sufficient thickness relative to a collector is used, so as to be capable of taking out large current. Furthermore, size of the collector or the strong electric tab of the electrode for taking out current is not especially limited, as long as being capable of effectively exerting effect of collecting or taking out current. For example, as shown in FIGS. 3, 7(B), 8(B), and 10(B), one having nearly the same size as that of the outer circumference border part of the seal part of the separator arranged with the seal member may be used. In addition, as shown in FIG. 11(B), one having smaller size than that of the outer circumference border part of the seal part of the separator arranged with the seal member may be used. Furthermore, as shown in FIGS. 7(D), 8(A), and 11(A), one having larger size than that of the seal part of the separator arranged with the seal member may be used.

Figure 12:
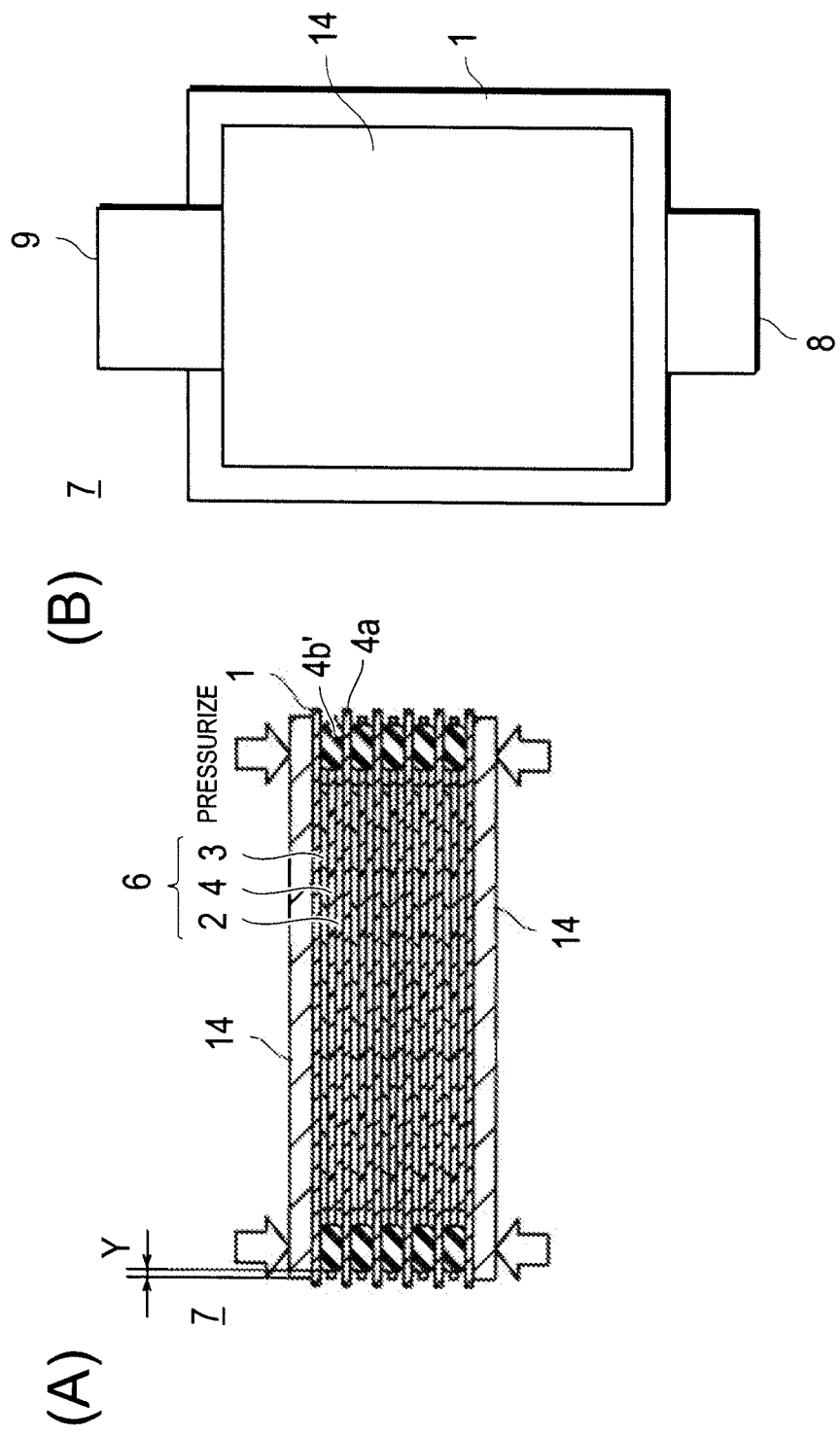
FIG. 12 is an outline cross-sectional view schematically showing an appearance of a battery-layered product formed by using an electrode for taking out current used in a bipolar battery of the present invention, so as to be larger than the seal part of a separator arranged at the seal member.

In particular, suitable embodiments of the size of the strong electric tab of an electrode for taking out current, in the case of arranging the above rubber-based seal member at the seal part, will be explained using drawings. FIG. 12(A) is an outline cross-sectional view schematically showing an appearance of the battery-layered product, made by lamination of the electrolyte layer and a bipolar electrode (including electrodes at the top layer and the bottom layer), by using one mounted with a strong electric tab suitable for taking out current at an electrode for taking out current, and by deforming a rubber-based seal member by pressurization to adhere onto the collector. FIG. 12 (B) is an outline plan view of FIG. 12(A).

FIG. 12 shows a structure using the strong electric tab 14 of an electrode for taking out current, larger than the seal part 4b' of the separator arranged with the seal member. In this way, by setting the strong electric tab 14 larger than the rubber-based seal part 4b' of the electrolyte layer (separator)

arranged with the rubber-based seal member, the rubber-based seal member can more securely be pressurized. Namely, in the case where the rubber-based seal part is deformed by pressurization to adhere onto the collector, the thin collector 1 may sometimes lack rigidity and be impossible to sufficiently pressurize the rubber-based seal part 4'. Therefore, by setting the strong electric tab having sufficient rigidity (having sufficient thickness to take out large current) larger than a part arranged with the seal member, of the separator arranged with the seal member, the rubber-based seal member can more securely be pressurized. As a result, liquid junction (short circuit) caused by leak out of an electrolyte solution can surely be prevented from a part of an electrolyte layer, which retains a polymer gel electrolyte (further in the case where an electrode retains a polymer gel electrolyte, such a part is included).

In the case where an electrode for taking out current (the strong electric tab 14) larger than the seal part 4b of the separator, arranged with the seal member, is used, size of the strong electric tab 14 (length "Y" shown in FIG. 12(A)) is desirably designed to be larger than the outer circumference border part of the seal part 4b by 1 to 5 mm; because, in this way, uniform pressure can be applied to the whole areas of the seal part 4b.

In addition, the separator 4a configuring the electrolyte layer 4 of the present invention is not especially limited; any of a micro-porous membrane separator or a non-woven fabric separator may be utilized.

As the above micro-porous membrane separator, for example, a porous sheet made of a polymer, which absorbs and retains the above electrolyte, (for example, a polyolefin-based micro-porous membrane separator or the like) may be used. The polyolefin-based micro-porous membrane separator, having chemically stable property against an organic solvent, has excellent effect of being capable of suppressing reactivity with the electrolyte (the electrolyte solution) to a low level.

As a material of the micro-porous membrane separator, for example, polyethylene (PE), polypropylene (PE), a laminated body having a three-layer structure of PP/PE/PP, or polyimide or the like is included.

Thickness of the above micro-porous membrane separator cannot unambiguously be specified, because of dependence on application fields; however, in a secondary battery for motor drive in an electric vehicle (EV) or a fuel cell vehicle or a hybrid vehicle thereof, in view of thinning of a battery, a single layer or multiple layers with a thickness of 1 to 60 μm is desirable. The thickness of the micro-porous membrane separator within such a range provides effect of prevention of short circuit caused by intrusion of fine particles into a separator, and of ensuring mechanical strength in the thickness direction and high output performance, because narrowing between electrodes is desirable for high output. In addition, in the case where a plurality of batteries are joined, because of increase in electrode area, use of a separator of a thick type among the above range is desirable to enhance reliability of a battery.

Diameter of the micro pores of the micro-porous membrane separator is desirably up to equal to or smaller than 1 μm (usually, a pore diameter of about several tens nm). The average diameter of the micro pores of the micro-porous membrane separator within such a range provides effect of enhancing reliability in an abnormal state, because of quickly melting of the micro-porous membrane separator by heat, and closing the micro pores, what is called "shut down phenomenon", resulting in improvement of heat resistance. Namely, quick generation of the "shut down phenomenon" to melt the separator and close the micro pores on increase in battery temperature by over charging (in an abnormal state) inhibits passing Li ions from a positive electrode (+) to a negative electrode (−) of a battery (electrode), and thus stops further charging. Therefore, over charging is inhibited and an over charge problem can be eliminated, resulting in not only improvement of heat resistance (safety) of a battery but also prevention of opening of a heat fusion member (seal part) of a battery jacket material. Here, average diameter of micro pores of a separator is calculated as average diameter by observation of the separator using a scanning electron microscope, and statistic processing of the photo by an image analyzer or the like.

Void rate of the micro-porous membrane separator is preferably 20 to 50%. The void rate of the micro-porous membrane separator within this range is capable of securing both output and reliability, because of prevention of output reduction caused by resistance of electrolyte (electrolyte solution), and prevention of short circuit caused by penetration of micro particles into voids (micro holes) of the separator. Here, "void rate of the micro-porous membrane separator" is value determined as volume ratio from density of a raw material resin, and density of a final product, that is a micro-porous membrane separator.

Immersion amount of an electrolyte into the micro-porous membrane separator may be such amount up to a range of retaining capability of the micro-porous membrane separator, however, immersion exceeding such range of retaining capability may be allowed; because a seal part is mounted at an electrolyte, which is capable of preventing leak out of an electrolyte solution from the electrolyte layer, and thus immersion is possible within a range of retaining capability of the electrolyte layer.

In addition, also the above non-woven fabric separator is not especially limited, as long as having separator function, and being capable of retaining a polymer gel electrolyte, and can be produced by fiber entanglement to make a sheet. In addition, a "spunbond" or the like obtainable by heat fusion of fibers themselves by heating may also be used; namely, a sheet-like substance prepared by arranging fibers in web (thin stuffing)-like or mat-like by a suitable method, and by adhering using suitable adhesive or fusion force of fibers themselves may be sufficient. The adhesive is not especially limited, as long as having sufficient heat resistance at temperature in production and use, and also stable without having reactivity or solubility with or in a polymer gel electrolyte, and conventionally known ones may be utilized. In addition, fibers to be used are not especially limited, and conventionally known ones, for example, cotton, rayon, acetate, nylon, polyester; polyolefin such as polypropylene and polyethylene; polyimide, aramid and the like may be used. These fibers may be used alone or by mixing depending on intended use (mechanical strength required to an electrolyte layer or the like).

In addition, bulk density of the non-woven fabric separator is not especially limited, as long as being capable of providing sufficient battery characteristics by a polymer gel electrolyte impregnated. Namely, it is because too high density of the non-woven fabric separator provides too high ratio of non-electrolyte material occupying in an electrolyte layer, which could impair ion conductivity or the like in the electrolyte layer.

Porosity of the non-woven fabric separator is preferably 30 to 70%. The porosity below 30% deteriorates retention performance of an electrolyte, while the porosity over 70% provides insufficient strength.

Furthermore, thickness of the non-woven fabric separator may be enough to be the same as that of a part of an electrolyte layer, which retains a polymer gel electrolyte, and preferably 5 to 20 μm, and particularly preferably 5 to 10 μm. The thickness below 5 μm increases short defect and deteriorates retention performance of an electrolyte, while the thickness over 20 μm results in increase in resistance.

In addition, in FIGS. 5 to 12, explanations were given using a separator with the same size as that of an electrolyte layer, for explanation convenience, however, in a practical production, the electrolyte layer continuously having seal parts on the separator may be formed by utilization of a roll-like separator, using various printing and application technologies or thin film formation technology. In addition, the electrolyte layer having a seal part may be formed in large quantity at one time by utilization of a much larger separator. In this way, in a practical production, various mass production technologies can be applied.

In addition, a polymer gel electrolyte used in the gel electrolyte part $4c$ configuring the electrolyte layer $4$ is not especially limited, and those used in a conventional polymer gel electrolyte layer can be utilized as appropriate. Here, "a polymer gel electrolyte layer" represents one where an electrolyte solution is retained in a polymer matrix; specifically, includes one where an electrolyte solution usually used in a lithium ion battery is included in ion conductive polymers (what is called solid polymer electrolytes), and further one where a similar electrolyte solution is retained in skeletons of lithium ion non-conductive polymers.

Note that, in the present invention, difference between all solid polymer electrolyte (simply may be referred to as polymer solid electrolyte) and a polymer gel electrolyte is as follows:

1) One where an electrolyte solution usually used in a lithium ion battery is contained in an all solid polymer electrolyte such as polyethylene oxide (PEO) is a polymer gel electrolyte.

2) One where a similar electrolyte solution is retained in skeletons of non-lithium ion conductive polymers such as polyvinylidene fluoride (PVDF) or the like is also a polymer gel electrolyte.

3) Ratio of a polymer (a host polymer or a polymer matrix) configuring a polymer gel electrolyte, and an electrolyte solution is very wide, and all of intermediate substances are referred to as a polymer gel electrolyte, ranging from 100% by mass of a polymer as an all solid polymer electrolyte, to 100% by mass of an electrolyte solution as a liquid electrolyte.

A polymer matrix of the above polymer gel electrolyte is not especially limited, and conventionally known one may be utilized, and preferably polyethylene oxide (PEO), polypropylene oxide (PPO), polyethylene glycol (PEG), polyacrylonitrile (PAN), polyvinylidene fluoride-hexafluoropropylene (PVdF-HFP), poly(methyl methacrylate) (PMMA), and a copolymer thereof is desirable. A solvent is desirably ethylene carbonate (EC), propylene carbonate (PC), γ-butyrolactone (GBL), dimethyl carbonate (DMC), diethyl carbonate (DEC), and mixtures thereof.

Among these, as an ion-conductive polymer, a known solid polymer electrolyte, like polyalkylene oxide-based polymers, for example, polyethylene oxide (PEO), polypropylene oxide (PPO), or a copolymer thereof is included. Polyalkylene oxide-based polymers such as PEO and PPO well dissolve a lithium salt such as $LiBF_4$, $LiPF_6$, $LiN(SO_2CF_3)_2$, $LiN(SO_2C_2F_5)_2$ or the like. In addition, by forming a cross-linked structure, excellent mechanical strength can be exerted.

As the above lithium ion non-conductive polymer, for example, polyvinylidene fluoride (PVDF), polyvinyl chloride (PVC), polyacrylonitrile (PAN), polymethyl methacrylate (PMMA) or the like may be used, however, not limited thereto. Note that, because PAN, PMMA and the like are those belonging to rather a group little having ion conductivity, they may rather be in the group of the above ion-conductive polymer. Here, they are exemplified as the lithium ion non-conductive polymer used as a polymer gel electrolyte.

An electrolyte solution contained in the above polymer gel electrolyte is not especially limited, and conventionally known one may be utilized; one usually used in a lithium ion battery is sufficient, and one containing a lithium salt (an electrolyte salt) and an organic solvent (a plasticizer) may be used. Specifically, for example, at least one kind of a lithium salt (an electrolyte salt) selected from an anion salt of an inorganic acid such as $LiPF_6$, $LiBF_4$, $LiClO_4$, $LiAsF_6$, $LiTaF_6$, $LiAlCl_4$, $Li_2B_{10}Cl_{10}$, LiTFSI, LiFSI, LiBETI, LiBOB or the like; and an anion salt of an organic acid such as $LiCF_3SO_3$, $Li(CF_3SO_2)_2N$, $Li(C_2F_5SO_2)_2N$ or the like is included; and one using an organic solvent (a plasticizer) such as an aprotic solvent obtained by mixing at least 1 kind or 2 or more kinds selected from cyclic carbonates such as propylene carbonate, ethylene carbonate and the like; chained carbonates such as dimethyl carbonate, methyl ethyl carbonate, diethyl carbonate and the like; ethers such as tetrahydrofuran, 2-methyltetrahydrofuran, 1,4-dioxane, 1,2-dimethoxyethane, 1,2-dibutoxyethane and the like; lactones like γ-butyrolactone and the like; nitriles like acetonitrile and the like; esters like methyl propionate and the like; amides like dimethylformamide and the like; methyl acetate, and methyl formate may be used, however not limited thereto.

Ratio of an electrolyte solution in a polymer gel electrolyte in the present invention is not especially limited, because it may be determined in response to intended use or the like. In view of ion-conductivity or the like, the ratio may suitably be adopted in a range of several % by mass to 98% by mass, however not limited to such a range. In the present invention, a polymer gel electrolyte having high content of an electrolyte solution, for example, a ratio of an electrolyte solution equal to or higher than 70% by mass, is particularly effective, because such a range is capable of exerting excellent battery characteristics such as having ion-conductivity close to that of a lithium ion secondary battery of a liquid electrolyte type, and is capable of maintaining high sealing performance and effectively preventing leak out of an electrolyte solution, by forming and arranging a seal resin at a separator, even when a large quantity of an electrolyte solution is contained.

In addition, in the present invention, amount of an electrolyte solution contained in a polymer gel electrolyte may be designed nearly uniform in gel electrolyte part, or may be lowered, in gradient manner, from the center part toward the outer circumference part. The former is preferable because of being capable of providing reactivity in wider range. The latter is preferable because of being capable of further enhancing sealing performance against an electrolyte solution, even in the case where such a seal part $4b_2$ or $4b_3$, among the seal part at the outer circumference, is not mounted that penetrates the separator or, penetrates or covers all circumferences of the side surface of the separator. In the case where the amount is lowered, in gradient manner, from the center part toward the outer circumference part, use of polyethylene oxide, polypropylene oxide and a copolymer thereof having lithium ion conductivity, as the above host polymer or polymer matrix is desirable.

Ratio between a gel electrolyte part at the vicinity of the center, and the seal part at the outer circumference part of the above electrolyte layer cannot unambiguously be determined because of dependence on a material of seal part. Furthermore, in the case where effect to prevent internal short circuit, caused by contact of adjacent collectors themselves, should be furnished in the seal part, the seal part is required to be large, and in such a view point, the ratio cannot unambiguously be determined. Therefore, width of the seal part may be determined in a range of 1 mm to 10 mm, as appropriate, in response to intended use such as adherence (sealing) property with the collector, or contact prevention effect of the collectors themselves.

In addition, in the present invention, as described above, an electrolyte to be retained in a separator is not necessarily a polymer gel electrolyte, and in consideration of low cost and high output, a liquid electrolyte (electrolyte solution) may be used. Furthermore, solid electrolyte may be used. As the liquid electrolyte (electrolyte solution), because the same electrolyte solution as explained in the polymer gel electrolyte may be used, explanation here is omitted. Similarly, as the solid electrolyte, because the same as all solid polymer electrolyte, as explained in the polymer gel electrolyte, may be used, explanation here is omitted.

As described above, explanation was mainly given on an electrolyte layer where a seal resin is formed and arranged at a part of a separator, at the outer circumference part, which retains an electrolyte, as a configuration element of a characteristic part of a bipolar battery relevant to the present invention. Other configuration elements of a bipolar battery of the present invention are not especially limited, and those used in conventionally known bipolar battery may widely be applicable.

A bipolar battery relevant to the present invention will be explained below by each of the configuration elements, however, the present invention should by no means be limited thereto.

[Collector]

A collector, which can be used in the present invention, is not especially limited, and conventionally known one may be utilized. For example, aluminum foil, stainless steel foil, a cladding material of nickel and aluminum, a cladding material of copper and aluminum, or a plated material of a combination substance of these metals or the like is preferably used. In addition, a collector covered with aluminum at the metal surface may be used. In addition, in some cases, a collector made by gluing 2 or more metal foils together may be used. In view of corrosion resistance, preparation easiness, economy or the like, use of stainless steel foil as a collector is preferable.

Furthermore, as a collector, which may be used in the present invention, in view of a production method, one obtained by thin film production technology such as spray application, into a film form with a desired shape may also be utilized. For example, such one is included that is formed by using aluminum, copper, titanium, nickel, stainless steel (SUS), an alloy thereof or the like as a main component, and by heating collector metal paste containing the main component, a binder (resin), and a solvent. These metal powders may be used alone or by mixing 2 or more kinds, or furthermore, one obtained by lamination, in a multi-layer, of metal powder of different kinds may be adopted by well utilization of features in production methods. In addition, as a collector in a bipolar battery, such one as has higher resistance value of a collector compared with that of a metal may be used to flow current only in the lamination direction. For example, a conductive polymer film containing a conductive polymer as a major component, or a conductive polymer film dispersed with conductive particles in a polymer material may also be utilized, and they are suitable in view of good adhesion performance with a seal member.

The above binder is not especially limited, and for example, a conventionally known binder resin such as an epoxy resin or the like may be used, and as well a conductive polymer material may also be used.

Thickness of a collector is not especially limited, however, usually about 1 to 100 μm.

[Positive Electrode (Positive Electrode Active Material Layer)]

A positive electrode contains a positive electrode active material; a conductivity promoter for enhancing electron conductivity, a lithium salt for enhancing ion conductivity, a binder, a polymer gel electrolyte or the like may be contained as well.

Among these, a positive electrode active material is not especially limited, and one usable in a solution type lithium ion secondary battery may be utilized as appropriate; because of being capable of configuring a battery excellent in capacity and output characteristics, a composite oxide between a transition metal and lithium (a lithium-transition metal composite oxide) is preferable. Specifically a Li—Co type composite oxide like $LiCoO_2$; a Li—Ni type composite oxide like $LiNiO_2$; a Li—Mn type composite oxide like spinel $LiMn_2O_4$; a Li—Fe type composite oxide like $LiFeO_2$ or the like is included. In addition, a phosphate compound or a sulfate compound of a transition metal and lithium, like $LiFePO_4$; a transition metal oxide or a sulfide such as $V_2O_5$, $MnO_2$, $TiS_2$, $MoS_2$, $MoO_3$; $PbO_2$, $AgO$, $NiOOH$ or the like may also be used.

As for particle diameter of a positive electrode active material, smaller size than particle diameter generally used in a solution (electrolyte solution) type lithium ion battery, and not a bipolar type, may preferably be used, to lower electrode resistance of a bipolar battery. Specifically, average particle diameter of positive electrode fine active material is 0.1 to 10 μm, preferably 0.1 to 5 μm.

As the conductivity promoter for enhancing the above electron conductivity, acetylene black, carbon black, graphite or the like is included, however, not limited thereto.

As the lithium salt for enhancing the above ion conductivity, for example, an anion salt of an inorganic acid such as $LiPF_6$, $LiBF_4$, $LiClO_4$, $LiAsF_6$, $LiTaF_6$, $LiAlCl_4$, $Li_2B_{10}Cl_{10}$ or the like; an anion salt of an organic acid such as $LiCF_3SO_3$, $Li(CF_3SO_2)_2N$, $Li(C_2F_5SO_2)_2N$ or the like; or a mixture thereof or the like may be used, however, not limited thereto.

As the above binder, polyvinylidene fluoride (PVDF) or the like may be used, however, not limited thereto.

The above polymer gel electrolyte is the same as explained in a polymer gel electrolyte used in the gel electrolyte part 4c of a polymer gel electrolyte layer, therefore explanation is omitted here.

Ratio of an electrolyte solution in a gel electrolyte contained in a positive electrode may be determined in response to intended use or the like, and is suitably utilized in a range of several % by mass to 98% by mass, however not limited to such a range. In the present invention, a gel electrolyte having high content of an electrolyte solution, for example a ratio of an electrolyte solution equal to or higher than 70% by mass, is particularly effective, because such a range is capable of exerting excellent battery characteristics such as having ion-conductivity close to that of a lithium ion secondary battery of a liquid electrolyte type, and is capable of maintaining high sealing performance and effectively preventing leak out of an electrolyte solution, by forming and arranging a seal resin at a separator, even when a large quantity of an electrolyte solution is used.

Formulation amount, in a positive electrode, of a positive electrode active material, a conductivity promoter, a binder, a polymer gel electrolyte (polymer matrix, electrolyte solution or the like) or the like should be determined in consideration of intended use of a battery (such as, to put importance on output, to put importance on energy or the like), or ion conductivity. For example, too low formulation amount of a polymer gel electrolyte, in a positive electrode, increases ion conduction resistance or ion diffusion resistance in the positive electrode, and results in reduction of battery performance. On the other hand, too high formulation amount of a polymer gel electrolyte, in a positive electrode, results in decrease in energy density of a battery. Therefore, in consideration of these factors, amount of a polymer gel electrolyte is determined so as to meet an object.

Thickness of a positive electrode is not especially limited, and should be determined, as described on the formulation amount, in consideration of intended use of a battery (for example, to put importance on output, to put importance on energy or the like), or ion conductivity. Thickness of a general positive electrode layer is about 10 to 500 μm.

[Negative Electrode (Negative Electrode Active Material Layer)]

A negative electrode contains a negative electrode active material; in addition, a conductivity promoter for enhancing electron conductivity, a lithium salt for enhancing ion conductivity, a binder, a polymer gel electrolyte (polymer matrix, electrolyte solution or the like) or the like may be contained.

Components other than kinds of a negative electrode active material are fundamentally the same as described in the item of [Positive electrode (Positive electrode active material layer)], therefore explanation thereof is omitted here.

A negative electrode active material is not especially limited, and one usable in a solution type lithium ion secondary battery may be utilized as appropriate; specifically, carbon, a metal oxide, a lithium-metal composite oxide or the like may be used, and preferably carbon or a lithium-transition metal composite oxide may be used; because use thereof is capable of configuring a battery excellent incapacity, output characteristics (for example, providing high battery voltage). Note that, as a lithium-transition metal composite oxide, for example, lithium-titanium complex oxide or the like may be used; as carbon, for example, plumbago, graphite, acetylene black, carbon black or the like may be used. Further, as a metal oxide, for example, a transition-metal oxide like titanium oxide or the like may be used.

[Electrolyte Layer]

An electrolyte layer of the present invention is one where an electrolyte is retained in a separator, and a seal resin is formed and arranged at the outer circumference part of a part of the separator, which retains the electrolyte, as already explained.

In addition, the electrolyte may be contained, in addition to the electrolyte layer configuring a battery, also in a positive electrode and/or a negative electrode, as described above. Different electrolytes may be used depending on the electrolyte layer, the positive electrode and the negative electrode configuring a battery, or the same electrolyte may be used. In addition, different electrolytes may be used depending on each of (configuration members of) unit battery layers.

Thickness of a part of the electrolyte layer, which retains the electrolyte, is not especially limited, as long as being capable of effectively exerting desired electrolyte performance. However, to obtain a compact bipolar battery, to make the member as thin as possible is preferable, within a range of securing function as the electrolyte layer. Thickness of the member, which retains the electrolyte, is about 10 to 100 μm.

Thickness of a member (the seal part 4b), where a seal resin is formed and arranged at the outer circumference part of a member, which retains the electrolyte, is as explained above. Namely, the seal part formed at the both surfaces of a separator is formed thicker than an electrode (a positive electrode or a negative electrode) in a state of forming and arranging the seal part (a non-sealed state). Subsequently, the seal part is deformed by pressurization or heat fusion deformation by heating under pressure, so as to provide the same thickness as that of the electrode (a positive electrode or a negative electrode) to adhere interface between the electrode and the electrolyte layer without clearance. Note that, the seal part formed at the both surfaces of a separator may be formed thicker, by a range of 0 to 1 mm, than that of the electrode (a positive electrode or a negative electrode) in a state of forming and arranging the seal part (a non-sealed state). In detail, because a seal film provides little thickness change even by heat fusion, in such a heat fusion type material, any so thicker formation is not required except thicker only by about 0 to 10 μm. In the case of rubber-based sealing (pressurization type), sealing performance is secured by deformation of rubber, therefore a thickness of by about 50 μm to 1 mm higher than the electrode is required, however, not limited to such a range.

As for a shape of a part of the electrolyte layer, which retains an electrolyte, thickness thereof is not required to be always nearly the same, irrespective of a member kind, also in view of function and performance. In addition, a shape of a member (seal part 4b), where a seal resin is formed and arranged, is as already described, therefore, explanation here is omitted.

And now, in the case where a polymer gel electrolyte is used as the electrolyte of the electrolyte layer, the polymer matrix for a polymer gel electrolyte preferably used at present is a polyether-type polymer such as PEO and PPO, that is an ion-conductive polymer; therefore weak in oxidation resistance at the positive electrode under high temperature condition. Therefore, in the case of using a positive electrode agent having high redox potential, generally used in a solution type lithium ion secondary battery, capacity of a negative electrode is preferably smaller than that of the apposed positive electrode via a polymer gel electrolyte layer. Smaller capacity of a negative electrode than that of the apposed positive electrode is capable of preventing excess increase in positive electrode potential at the end of charging. Note that capacities of the positive electrode and the negative electrode can be determined from production condition, as theoretical capacity in producing the positive electrode and the negative electrode; they may be determined by direct measurement of capacity of a final product.

However, smaller capacity of the negative electrode compared with the apposed positive electrode provides too low negative electrode potential, and could impair durability of a battery, therefore caution is required in charge-discharge voltage. For example, caution should be paid so as to set average charge voltage of one cell (unit cell layer) to suitable value against redox potential of a positive electrode active material to be used, so as not to reduce durability.

[Insulating Layer]

An insulating layer is formed to prevent short-circuit generation caused by contact between collectors themselves, leak out of an electrolyte solution, a little non-uniformity of the terminal part of a laminated electrode or the like. In the present invention, because the same function can be furnished to a member where a seal resin is formed and arranged at the external circumference part of a separator (see FIG. 5 to FIG.

12), mounting of an insulating layer is not especially required, however, the insulating layer may be mounted in a supplemental object.

As the insulating layer, any one may be used as long as having insulating property, sealing property (air-tightness) against leak out of an electrolyte solution or moisture permeation from outside, heat resistance at battery operation temperature or the like, and for example, an epoxy resin, rubber, polyethylene, polypropylene or the like may be used, however, an epoxy resin is preferable in view of corrosion resistance, chemical resistance, preparation easiness (film formability), economy or the like.

[Strong Electric Tab]

A strong electric tab is as explained in FIG. 12, and is attached at a collector configuring an electrode of the most outer layer, if necessary. In use thereof, it is preferably as thin as possible, in view of having function as a terminal and thinning as well. However, because any of the laminated members, a positive electrode, a negative electrode, an electrolyte layer and a collector, is weak in mechanical strength, the tab desirably has sufficient strength so as to sandwich and support them from both sides, and further to more surely pressurize rubber-based seal member. Furthermore, in view of suppressing internal resistance of the strong electric tab, thickness of the strong electric tab is desirably about 0.1 to 2 mm usually.

As materials of the strong electric tab, those used in usual lithium ion secondary battery may be used. For example, aluminum, copper, titanium, nickel, stainless steel (SUS), an alloy thereof or the like may be used. In view of corrosion resistance, preparation easiness, economy or the like, use of aluminum is preferable.

As materials for a strong electric tab at the positive electrode side and a strong electric tab at the negative electrode side, for taking out current, the same material may be used, or different material may also be used. Furthermore, these strong electric tabs at the positive electrode side and at the negative electrode side may be those prepared by lamination of different materials in multi-layer.

The strong electric tabs at the positive electrode side and the negative electrode side may have the same size as that of the collector, however, as explained using FIGS. 12(A) and 12(B), use of those larger than that of the seal part 4b of the separator arranged with the seal member is desirable.

[Positive Electrode and Negative Electrode Leads]

As shown in FIG. 12(B), as for the positive electrode lead 8 and the negative electrode lead 9, known leads used in usual lithium ion secondary battery may be used. Also as materials of the positive electrode and negative electrode leads, those used in usual lithium ion secondary battery may be used. For example, aluminum, copper, titanium, nickel, stainless steel (SUS), an alloy thereof and the like may be used. In view of corrosion resistance, preparation easiness, economy or the like, use of aluminum is preferable.

[Battery Jacket Material (Battery Case)]

A bipolar battery is preferably accommodated in the battery jacket material (battery case) 10 as whole of a battery-layered product, as shown in FIGS. 8(A) and 8(B), to prevent external impact and environmental deterioration in use. As the battery jacket material, in view of weight reduction, a conventionally known battery jacket material such as a polymer-metal composite laminated film (simply referred to also as polymer-metal composite laminate film) such as an aluminum-laminated-package, where a metal is covered with a polymer insulator is preferable.

The above polymer-metal composite laminate film is not especially limited, and conventionally known one made by arrangement of a metal film between polymer films and laminated as a whole into a unified body may be used; specifically including, for example, one by arranging a jacket protecting layer (the most outer laminate layer) made of a polymer film, a metal film layer and a heat fusion layer (the most inner laminate layer) made of a polymer film, in this order, and laminating as a whole into a unified body. In detail, the polymer-metal composite laminate film used as the jacket material is one prepared by firstly forming heat resistant insulating resin films as polymer films, at the both surfaces of the metal film, and by lamination of a heat fusion insulating film on at least one surface side of the heat resistant insulating resin film. In such a laminated film, a heat fusion member is formed by fusion and joining of the heat fusion insulating film member by heat fusion using a suitable method. As the metal film, an aluminum film or the like is exemplified. In addition, as the insulating resin film, a polyethylene terephthalate film (a heat resistant insulating film), a nylon film (a heat resistant insulating film), a polyethylene film (a heat fusion insulating film), a polypropylene film (a heat fusion insulating film) or the like is exemplified. However, the jacket material of the present invention should not be limited thereto.

In such a polymer-metal composite laminate film, joining by heat fusion of a pair of or a (bag-like) sheet of a laminate film can easily and surely be carried out, by utilization of a heat fusion insulating film using ultrasonic welding or the like. In the present invention, by using such a polymer-metal composite laminate film, such a configuration is preferable that is prepared by storing and encapsulating a battery-layered product, by joining under heat fusion of a part or a whole part of the peripheral part thereof. Note that, to enhance long-term reliability of the battery at a maximum, metal films themselves, which are configuration elements of the polymer-metal composite laminate sheet, may directly be joined. Ultrasonic welding can be used to remove or destruct a heat fusion resin present between metal films and to join metal films themselves.

In the case of using the polymer-metal composite laminate film as the battery jacket material, the above positive electrode and the negative electrode leads may take an exposed structure outward of the battery jacket material by being sandwiched between the above heat fusion parts. In addition, use of the polymer-metal composite laminate film having excellent heat conductivity is preferable in view of efficiently conducting heat from an automotive heat source and quickly heating inside a battery up to battery operation temperature.

Then, in the present invention, a plurality of the bipolar batteries may be joined to configure a assembled battery. Namely, by joining at least 2 or more bipolar batteries of the present invention in series and/or parallel to configure a assembled battery, relatively low cost response is possible to request of battery capacity or output by each of the intended uses.

Specifically, for example, N sets of the bipolar batteries are joined in parallel, and M sets of the above bipolar batteries, thus arranged in N parallel rows, are further arranged in series, and accommodated in a assembled battery case made of a metal or a resin, to yield a assembled battery (wherein N and M are integers equal to or larger than 2). In this case, joining number of the bipolar batteries in series/parallel is determined in response to intended use. For example, the combination may be determined so as to be applicable to a power source for driving of a vehicle which requires high energy density and high output density, as a large capacity power source, for such as an electric vehicle (EV), a hybrid electric vehicle (HEV), a fuel cell vehicle, a hybrid fuel cell vehicle or the like. In addition, a positive electrode terminal and a negative electrode terminal for the assembled battery, and an electrode lead of each of the bipolar batteries may electrically be joined using a lead line or the like. In addition, in the case of joining bipolar batteries themselves in series/parallel, suitable joining members such as spacers or bus-bars may be used to electrically join. In this way, response to request on capacity or output by each of various vehicles becomes possible by combination of a fundamental bipolar battery, resulting in capability of easy designing selection of energy and output required. Therefore, design and production of different bipolar batteries by each of various vehicles are not necessary, which is this capable of mass production of bipolar batteries and cost reduction by mass production.

In addition, an assembled battery of the present invention should not be limited to those explained above, and conventionally known ones may be adopted as appropriate. For example, a assembled battery of the present invention may be one obtained by joining in parallel a bipolar battery of the present invention, and a battery where materials of the positive and negative electrodes are the same as the bipolar battery, and the bipolar batteries of necessary number of configuration units are joined in series, so as to have the same voltage.

As a battery having the same voltage by using the same materials of the above bipolar battery and positive and negative electrodes, and by joining the bipolar batteries of necessary number of configuration units in series, preferably, a non-bipolar type lithium ion secondary battery (a usual lithium ion secondary battery) is included. Namely, in batteries forming a assembled battery, a bipolar battery of the present invention, and a non-bipolar type lithium ion secondary battery or the like may be present as a mixed state. In this way, a combination of a bipolar battery, which puts importance on output, and a general lithium ion secondary battery, which puts importance on energy, is capable of providing a assembled battery having each of the weak points complimented, and also reducing weight and size of the assembled battery. Degree of combination ratio of each of a bipolar battery and a non-bipolar type lithium ion secondary battery is determined in response to safety performance and output performance required as the assembled battery.

In the assembled battery of the present invention, various measurement instruments or control apparatuses may be mounted in response to use applications, and for example, a connector for voltage measurement may be mounted for monitoring battery voltage or the like, however, not especially limited.

In addition, in the present invention, by joining at least 2 or more of the above assembled batteries in series, parallel or a composite joining of series and parallel to prepare a composite assembled battery, relatively low cost response is possible to request of battery capacity or output by each of the intended uses, without preparation of new assembled batteries. Namely, such a composite assembled battery is one prepared by joining at least 2 or more assembled batteries in series, parallel or a composite joining of series and parallel; and by producing a fundamental assembled battery, and combining these to prepare a composite assembled battery, specifications of assembled batteries can be adjusted. In this way, because of no necessity of producing a lot of assembled battery kinds with different specifications, cost of a composite assembled battery can be reduced. A composite assembled battery, prepared as described above by joining a plurality of assembled batteries in series and parallel, is capable of being repaired only by replacing the defect part, even when a part of a battery or a assembled battery gets out of order. Note that, the above assembled battery may include not only one configured only by bipolar batteries of the present invention but also one configured by bipolar batteries of the present invention and other non-bipolar type batteries.

Figure 13:
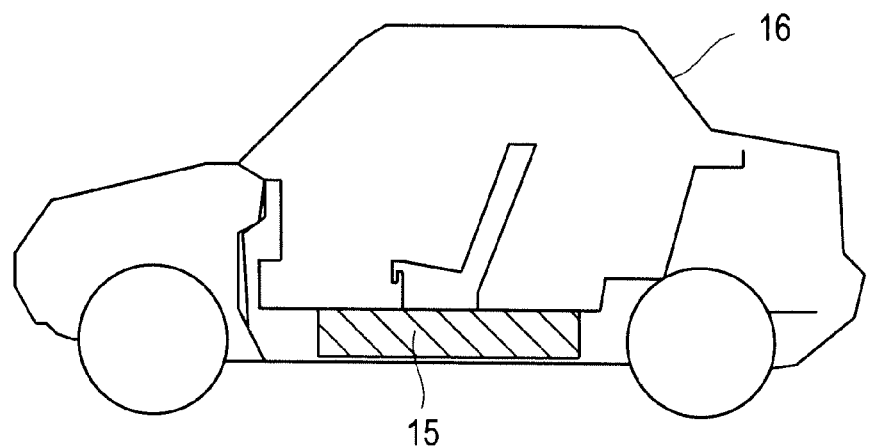
FIG. 13 is an outline view schematically showing a vehicle mounted with, as a power source for driving, a bipolar battery and/or an assembled battery relevant to the present invention.

In the present invention, a vehicle is provided mounted with the above bipolar battery and/or the assembled battery (including a composite assembled battery) as a power source for driving. The bipolar battery and/or the assembled battery of the present invention have various characteristics, as described above, and in particular, a compact battery; and is therefore, suitable as a power source for driving of, for example, an electric vehicle, a hybrid electric vehicle, a fuel cell vehicle, a hybrid fuel cell vehicle or the like, which requires particularly severe request on energy density and output density. For example, as shown in FIG. 13, mounting of the assembled battery 15 under a seat at the vehicle center part of an electric vehicle, or the hybrid electric vehicle 16 is convenient because of wide space is secured for vehicle interior and a trunk room. In the present invention, there should be no limitation thereto, and the assembled battery may be mounted at the under part of the rear trunk room, or, in the case where an engine is not mounted as in an electric vehicle, or an fuel-cell vehicle, at a part of a front vehicle side where an engine is not mounted. Note that, in the present invention, not only the assembled battery 15 but also a bipolar battery may be mounted depending on use application, or the assembled battery 15 and a bipolar battery may be combined and mounted. In addition, as a vehicle, which is capable of mounting a bipolar battery and/or a assembled battery of the present invention as a power source for driving, the above-described electric vehicle, hybrid electric vehicle, fuel cell vehicle, hybrid fuel cell vehicle are preferable, however, not limited thereto.

A production method for a bipolar battery of the present invention is not especially limited, and various conventionally known methods may be utilized as appropriate, which will be explained briefly below. Note that explanation of a production method will be given below on a production example using a polymer gel electrolyte as an electrolyte of an electrolyte layer, however, the present invention should not be limited thereto. Note that, a production method for a polymer gel electrolyte layer where a polymer gel electrolyte is retained in a separator, and a seal resin is formed and mounted at the outer circumference part of the member of the separator, which retains a polymer gel electrolyte, is as explained already using FIGS. 5 to 12, and FIGS. 15 to 18, therefore explanation here is omitted.

(1) Application of a Composition for a Positive Electrode

Firstly, a suitable collector is prepared. The composition for a positive electrode is usually obtained as slurry (a slurry for an positive electrode) and applied on one of the surfaces of the collector. An application method includes bar application, spray application, as well as a printing method by a screen-printing or ink jet printing system.

The slurry for a positive electrode is a solution containing the positive electrode active material. Other components include arbitrary, a conductivity promoter, a binder, a polymerization initiator, a raw material of a polymer gel electrolyte (a polymer raw material, an electrolyte solution or the like), a lithium salt or the like. Because of using a polymer gel electrolyte in a polymer electrolyte layer, containing of a conventionally known binder for joining micro particles of positive electrode active materials themselves, a conductivity promoter for enhancing electron conductivity, a solvent for slurry viscosity adjustment, such as N-methyl-2-pyrrolidone (NMP) or the like is enough, and a raw material of a polymer gel electrolyte or a lithium salt may not be contained.

A polymer raw material of a polymer gel electrolyte includes PEO, PPO, a copolymer thereof or the like, and it is preferable to have, in a molecule, a cross-linkable functional group (a carbon-carbon double bond or the like). Cross-linking of a polymer raw material using this cross-linkable functional group is capable of improving mechanical strength.

As for the positive electrode active materials, the conductivity promoter, the binder, the lithium salt, and the electrolyte solution, compounds described above may be used.

The polymerization initiator is required to be selected in response to a compound to be polymerized. For example, benzyl dimethyl ketal as a photopolymerization initiator, and azobisisobutyronitrile as a thermal polymerization initiator are included.

The solvent such as NMP may be selected in response to a kind of the slurry for the positive electrode.

The addition amount of the positive electrode active materials, the lithium salt, the conductivity promoter or the like may be adjusted in response to an object of a bipolar battery or the like, and may be added in the amount usually used. The addition amount of the polymerization initiator is determined in response to number of the cross-linkable functional groups contained in the polymer raw material; usually about 0.01 to 1% by mass relative to the polymer raw material.

(2) Formation of a Positive Electrode

The collector applied with the slurry for the positive electrode is dried, and a solvent contained is removed to form the positive electrode; at the same time, mechanical strength of a polymer gel electrolyte may be enhanced by carrying out a cross-linking reaction, if necessary, depending on the slurry for the positive electrode. In drying, a vacuum drier or the like may be used. Drying condition is determined in response to the slurry for the positive electrode applied, and not unambiguously specified, however, usually at 40 to 150° C. for 5 minutes to 20 hours.

(3) Application of a Composition for a Negative Electrode

On the surface at the opposite side of the surface where the positive electrode is formed, the composition for a negative electrode containing a positive electrode active material (a slurry for the negative electrode) is applied.

The slurry for a negative electrode is a solution containing the negative electrode active material. Other components include arbitrary, a conductivity promoter, a binder, a polymerization initiator, a raw material of a polymer gel electrolyte (a polymer raw material, an electrolyte solution or the like), a lithium salt or the like. Raw materials used and the addition amounts thereof are as explained already in the item of "(1) Application of a composition for a positive electrode", therefore explanation here is omitted.

(4) Formation of a Negative Electrode

The collector applied with the slurry for the negative electrode is dried, and a solvent contained is removed to form the negative electrode; at the same time, mechanical strength of a polymer gel electrolyte may be enhanced by carrying out a cross-linking reaction, depending on the slurry for the negative electrode. By this work, a bipolar electrode is completed. In drying, a vacuum drier or the like may be used. Drying condition is determined in response to the slurry for the negative electrode applied, and not unambiguously specified, however, usually at 40 to 150° C. for 5 minutes to 20 hours.

(5) Lamination of a Bipolar Electrode and an Electrolyte Layer

Separately, as an electrolyte layer to be laminated between the electrodes, the electrolyte layer is prepared, where a polymer gel electrolyte is retained in a separator, and a seal resin is formed and mounted at the outer circumference part of a part of the separator, which retains a polymer gel electrolyte.

The electrolyte layer may be prepared by a procedure explained using FIG. 5 (see also FIGS. 6 to 12).

After subjecting the bipolar electrode thus prepared to sufficient heating and drying under high vacuum, the bipolar electrodes and electrolyte layers are cut out into a plurality of pieces with a suitable size. The electrolyte layers are desirably set to be a little larger than the size of a collector of the bipolar electrodes (see FIG. 11). A predetermined number of the bipolar electrodes and electrolyte layers thus cut out are adhered together to prepare a battery-layered product. The number of lamination is determined in consideration of battery characteristics required to a bipolar battery. The bipolar electrodes formed with the electrode layer at one surface or both surfaces may directly be adhered. At the electrode layers at the most outer layer, each of the electrodes for taking out current is arranged. At the most outer layer of the positive electrode, an electrode for taking out current, formed with only the positive electrode on the collector, is arranged. At the most outer layer of the negative electrode, an electrode for taking out current, formed with only the negative electrode on the collector, is arranged. A stage for obtaining the bipolar battery by lamination of the bipolar electrode and the electrolyte layer is preferably carried out under inert atmosphere; for example, the bipolar battery may be prepared under argon atmosphere or nitrogen atmosphere.

Note that, in the case of using an electrolyte layer where a liquid electrolyte is retained in a separator, and a seal resin is formed and mounted at the outer circumference part of a part of the separator, which retains a liquid electrolyte, a bipolar battery may be prepared, for example, by the following procedure, however, not limited thereto. Firstly, an electrolyte layer is prepared where a seal resin is formed and mounted at the outer circumference part of a part of the separator, which retains a liquid electrolyte. At this stage, a liquid electrolyte solution is not retained in the separator. A member where a seal resin is not formed at the part of the outer circumference part is left so as to be capable of charging the electrolyte solution inside each of the electrolyte layers (parts which retain a liquid electrolyte). Then, a battery-layered product is prepared by adhering together a predetermined number of bipolar electrodes and electrolyte layers. After that, sealing performance is enhanced by sandwiching, from upper and lower sides, apart of the battery-layered product, which is formed and arranged with a seal resin, and by heat fusion of the seal resin by heating and pressurization. Next, from a part not formed and arranged with the seal resin, which was left at each of the electrolyte layers, the electrolyte solution is charged by a vacuum charging method or the like, similarly as in conventional method. After that, by filling a part not formed and arranged with the seal resin, which was left at a part of the outer circumference part, and by forming and arranging the seal resin (preferably by enhancing sealing property by heat fusion of the seal resin by heating and pressurization only the relevant part), a bipolar battery can be obtained. Alternatively, without leaving a part not formed and arranged with the seal resin at apart of the outer circumference part, a predetermined amount of the electrolyte solution may be retained at a part of the separator, which retains a liquid electrolyte, layer by layer in the step for lamination of the bipolar electrode and the electrolyte layer. Then, a bipolar battery may be prepared by mounting the bipolar electrode so as to enhance sealing performance by heat fusion of the seal resin by heating and pressurization of adjacent upper and lower bipolar electrodes themselves.

(6) Packaging (Completion of a Battery)

Finally, on the collector of the electrode for taking out current, at both of the most outer layers of the battery-layered product, a strong electric tab for the positive electrode, and a strong electric tab for the negative electrode are mounted, and further on the strong electric tab for the positive electrode, and the strong electric tab for the negative electrode, a positive electrode lead, and a negative electrode lead are joined (electrically joined) and taken out. In this case, the electrode for taking out current, in particular, the strong electric tab is desirably designed to be larger than the seal part of the separator arranged with the seal member (see FIG. 12(A)). A joining method for the positive electrode lead and the negative electrode lead is not especially limited, and ultrasonic welding, where joining temperature is low, or the like may suitably be utilized, however, not limited thereto, and conventionally known joining methods may be utilized as appropriate.

To prevent external impact and environmental deterioration, whole of the battery-layered product is encapsulated in a battery jacket material or a battery case to complete a bipolar battery. As a material of the battery jacket material (the battery case), a metal (aluminum, stainless steel, nickel, copper or the like), having the inner surface applied with an insulator such as a polypropylene film or the like is suitable.

EXAMPLES

The present invention will be explained in more detail with reference to Examples and Comparative Examples, however, technological scope of the present invention is by no means limited to the following Examples.

Example 1

An Example of a Micro-porous Membrane Separator Made of Polypropylene+a Rubber-based Seal Part)

A. Formation of an Electrode
1. A Positive Electrode

The following materials are mixed in predetermined ratios to prepare slurry for the positive electrode.

Firstly, materials composed of spinel, $LiMn_2O_4$ [85% by mass] having an average particle diameter of 2 µm, as a positive electrode active material, acetylene black [5% by mass] as a conductivity promoter, PVDF [10% by mass] as a binder, and NMP as a solvent for slurry viscosity adjustment were mixed in the above ratios to prepare the slurry for the positive electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the one surface of a SUS foil (a thickness of 20 µm), as the collector, the slurry for the positive electrode was applied, and subjected to drying in a vacuum oven at 120° C. for 10 minutes to form the positive electrode having a thickness after drying of 50 µm.

2. A Negative Electrode

The following materials are mixed in predetermined ratios to prepare slurry for the negative electrode.

Firstly, materials composed of $Li_4Ti_5O_{12}$ [85% by mass], as a negative electrode active material, acetylene black [5% by mass] as a conductivity promoter, PVDF [10% by mass] as a binder, and NMP as a solvent for slurry viscosity adjustment were mixed in the above ratios to prepare the slurry for the negative electrode. Note that $Li_4Ti_5O_{12}$ used as the negative electrode active material had an average secondary particle diameter of 10 µm, and a structure having a certain degree of necking of primary particles having a size of 0.2 to 0.5 µm. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the opposite surface of a SUS foil, formed with the positive electrode, the slurry for the negative electrode was applied, and subjected to drying in a vacuum oven at 120° C. for 10 minutes to form the negative electrode having a thickness after drying of 50 µm.

By formation of each of the positive electrode and the negative electrode on each of the both sides of the SUS foil, that is the collector, a bipolar electrode was formed (see FIG. 1).

B. Formation of a Seal Part

A micro-porous membrane separator made of polypropylene, with a thickness of 20 µm, was prepared (see FIG. 6(A)).

Then, at the four sides of the outer circumference part of the separator, at the position of 4.5 mm from the outer side (=center position of the seal. In addition, distance from the seal center to the separator end was set to 6 mm, and width of the seal member was set to 3 mm), silicone-based rubber (rubber-based seal resin) with a height of 60 µm was formed and arranged at the both surfaces of the separator to form a rubber-based seal part (see the seal part $4b_1$ in FIG. 6(E) and FIG. 6(G))

Note that the sealing step of the above rubber-based seal part (see reference codes $4b_1$ and $4b_2$ in FIG. 6(G)) will be explained at the formation step of a bipolar battery, because it was carried out after formation of a battery, by encapsulation using a jacket material in the formation step of a bipolar battery.

C. Formation of an Electrolyte Layer

The inside of the seal part of the micro-porous membrane separator, formed with the rubber-based seal part at the outer circumference part, was impregnated into a pre-gel solution, and subjected to thermal polymerization at 90° C. for 1 hour under inert gas atmosphere, so as to form a gel electrolyte part at the vicinity of the center part of the separator, and thus completed the electrolyte layer (see code $4c$ in FIGS. 6(F) and 6(G)). Thickness of the gel electrolyte part of the resultant electrolyte layer was 20 µm, the same as that of the micro-porous membrane separator.

Note that, as the above pre-gel solution, one composed of a polymer [5% by mass], an electrolyte solution+a lithium salt [95% by mass], and a polymerization initiator [0.1% by mass relative to the polymer], was used. Here, as the polymer, one composed of a copolymer of polyethylene oxide and polypropylene oxide (a copolymerization ratio of 5:1, and a weight average molecular weight of 8000) was used. As the above electrolyte solution, EC+DMC(EC:DMC(volume ratio)=1:3) was used. As the above lithium salt, 0.1 M $Li(C_2F_5SO_2)_2N$ was used. In addition, the amount of the lithium salt was set to be 1.0 M relative to the electrolyte solution. As the polymerization initiator, AIBN was used.

D. Formation of a Bipolar Battery

The above bipolar electrode and the electrolyte layer, where a polymer gel electrolyte was retained in the micro-porous membrane separator, and the rubber-based seal resin was formed and arranged at the outer circumference part of a part of the separator, which retained a polymer gel electrolyte, were laminated so that the positive electrode and the negative electrode sandwiched the electrolyte layer.

After lamination of 5 layers (equivalent to 5 sets of unit battery layers), a battery-layered product was encapsulated in a laminated package (one made of aluminum laminated with a polypropylene film; a battery jacket material) to form a bipolar battery (an intermediate product, having a rubber-based seal part in a non-sealed state).

Subsequently, sealing of the rubber-based seal part (see codes $4b_1$ and $4b_2$ in FIG. 6(G)) was carried out by arranging an iron plate with a thickness of 3 mm on the upper and lower surfaces of the bipolar battery, and by fixing the iron plate by bolts and nuts mounted at the four corners so as to air-tightly adhering the seal part to the collector by deformation under a pressure of 1 kg/cm² on the whole battery surface. By carrying out such sealing, the bipolar battery was completed (see FIG. 8(A)).

Example 2

An Example of a Micro-porous Membrane Separator Made of Polypropylene+a Heat Fusion Resin-based Seal Part)

A. Formation of an Electrode
1. A Positive Electrode

The following materials are mixed in predetermined ratios to prepare slurry for the positive electrode.

Firstly, materials composed of spinel, $LiMn_2O_4$ [85% by mass] having an average particle diameter of 2 µm, as a positive electrode active material, acetylene black [5% by mass] as a conductivity promoter, PVDF [10% by mass] as a binder, and NMP as a solvent for slurry viscosity adjustment were mixed in the above ratios to prepare the slurry for the positive electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the one surface of a SUS foil (a thickness of 20 µm), as the collector, the slurry for the positive electrode was applied, and subjected to drying in a vacuum oven at 120° C. for 10 minutes to form the positive electrode having a thickness after drying of 50 µm.
2. A Negative Electrode The following materials are mixed in predetermined ratios to prepare a slurry for the negative electrode.

Firstly, materials composed of $Li_4Ti_5O_{12}$ [85% by mass], as a negative electrode active material, acetylene black [5% by mass] as a conductivity promoter, PVDF [10% by mass] as a binder, and NMP as a solvent for slurry viscosity adjustment were mixed in the above ratios to prepare the slurry for the negative electrode. Note that $Li_4Ti_5O_{12}$ used as the negative electrode active material had an average secondary particle diameter of 10 µm, and a structure having a certain degree of necking of primary particles having a size of 0.2 to 0.5 µm. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the opposite surface of a SUS foil, formed with the positive electrode, the slurry for the negative electrode was applied, and subjected to drying in a vacuum oven at 120° C. for 10 minutes to form the negative electrode having a thickness after drying of 50 µm.

By formation of each of the positive electrode and the negative electrode on each of the both sides of the SUS foil, that is the collector, a bipolar electrode was formed (see FIG. 1).
B. Formation of a Seal Part A micro-porous membrane separator made of polypropylene with a thickness of 20 µm was prepared (see FIG. 9(A)).

Then, at the four sides of the outer circumference part of the separator, a heat fusion seal resin with a height (thickness) of 60 µm was formed and arranged on the both surfaces of the separator in a width of 10 mm from the outer side, to form a heat fusion resin-based seal part (see the seal part 4b in FIG. 9(B) and the seal part $4b_1$ in FIG. 9(D)). Note that polypropylene was used as the above heat fusion seal resin.

Note that the sealing step hereafter will be explained in this step for convenience, although it was carried out after formation of a battery-layered product in the formation step of a bipolar battery, to be described later.

After formation of a battery-layered product in the formation step of a bipolar battery, to be described later, by heating and pressurization of the heat fusion resin-based seal part of the separator at 200° C. from upper and lower sides of the battery-layered product, so as to heat fuse and adhere (seal) onto the collector, sealing of the seal part was carried out (see the arrow mark and code 4b in FIGS. 10(A) and 10(B)).
C. Formation of an Electrolyte Layer The inside of the seal part of the micro-porous membrane separator, formed with the heat fusion resin-based seal part at the outer circumference part, was impregnated into a pre-gel solution, and subjected to thermal polymerization at 90° C. for 1 hour under inert gas atmosphere, so as to form a gel electrolyte part at the vicinity of the center part of the separator, and thus formed the electrolyte layer (see code 4c in FIGS. 9(C) and 9(D)). Thickness of the member of resultant electrolyte layer, which retained a polymer gel electrolyte, was 20 µm, the same as that of the micro-porous membrane separator.

Note that, as the above pre-gel solution, one composed of a polymer [5% by mass], an electrolyte solution+a lithium salt [95% by mass], and a polymerization initiator [0.1% by mass relative to the polymer], was used. Here, as the above polymer, one composed of a copolymer of polyethylene oxide and polypropylene oxide (a copolymerization ratio of 5:1, and a weight average molecular weight of 8000) was used. As the above electrolyte solution, EC+DMC(EC:DMC(volume ratio)=1:3) was used. As the above lithium salt, 0.1 M $Li(C_2F_5SO_2)2N$ was used. In addition, the amount of the lithium salt was set to be 1.0 M relative to the electrolyte solution. As the polymerization initiator, AIBN was used.
D. Formation of a Bipolar Battery The above bipolar electrode, and the electrolyte layer, where a polymer gel electrolyte was retained in the micro-porous membrane separator, and the above heat fusion seal resin was formed and arranged at the outer circumference part of the gel electrolyte part of the separator, were laminated so that the positive electrode and the negative electrode of the electrode sandwiched the electrolyte layer (see FIG. 10(A)).

After lamination of 5 layers (equivalent to 5 sets of unit battery layers), a battery-layered product was encapsulated in a laminated package (one made of aluminum laminated with a polypropylene film; a battery jacket material) to form a bipolar battery.

Example 3

An Example of a Non-woven Fabric Separator+a Rubber-based Seal Part

A. Formation of an Electrode
1. A Positive Electrode

The following materials are mixed in predetermined ratios to prepare slurry for the positive electrode.

Firstly, materials composed of spinel, $LiMn_2O_4$ [85% by mass] having an average particle diameter of 2 μm, as a positive electrode active material, acetylene black [5% by mass] as a conductivity promoter, PVDF [10% by mass] as a binder, and NMP as a solvent for slurry viscosity adjustment were mixed in the above ratios to prepare the slurry for the positive electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the one surface of a SUS foil (a thickness of 20 μm), as the collector, the slurry for the positive electrode was applied, and subjected to drying in a vacuum oven at 120° C. for 10 minutes to form the positive electrode having a thickness after drying of 50 μm.

2. A Negative Electrode

The following materials are mixed in predetermined ratios to prepare slurry for the negative electrode.

Firstly, materials composed of $Li_4Ti_5O_{12}$ [85% by mass], as a negative electrode active material, acetylene black [5% by mass] as a conductivity promoter, PVDF [10% by mass] as a binder, and NMP as a solvent for slurry viscosity adjustment were mixed in the above ratios to prepare the slurry for the negative electrode. Note that $Li_4Ti_5O_{12}$ used as the negative electrode active material had an average secondary particle diameter of 10 μm, and a structure having a certain degree of necking of primary particles having a size of 0.2 to 0.5 μm. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the opposite surface of a SUS foil, formed with the positive electrode, the slurry for the negative electrode was applied, and subjected to drying in a vacuum oven at 120° C. for 10 minutes to form the negative electrode having a thickness after drying of 50 μm.

By formation of each of the positive electrode and the negative electrode on each of the both sides of the SUS foil, that is the collector, a bipolar electrode was formed (see FIG. 1).

B. Formation of a Seal Part

A non-woven fabric separator with a thickness of 20 μm was prepared (see FIG. 6(A)). Then, at the four sides of the outer circumference part of the separator, at the position of 4.5 mm from the outer side (=center position of the seal. In addition, distance from the seal center to the separator end was set to 6 mm, and width of the seal member was set to 3 mm), silicone-based rubber (rubber-based seal resin) with a height of 60 μm was formed and arranged at the both surfaces of the separator so as to pass through the separator, to form a seal part (see the seal parts $4b_1$ and $4b_2$ in FIGS. 6(E) and 6(G)). Namely, in formation of the seal part, the rubber-based seal part was formed also at the inside of the separator, by impregnation of the silicone-based rubber (rubber-based seal resin) also into the separator, so that the silicone-based rubber (rubber-based seal resin) penetrated through the separator (see the seal part $4b_2$ in FIG. 6(G)).

Note that the sealing step of the seal parts (see reference codes $4b_1$ and $4b_2$ in FIG. 6(G)) will be explained at the formation step of a bipolar battery, because it was carried out after formation of a battery, in the formation step of a bipolar battery to be described later.

C. Formation of an Electrolyte Layer

The inside of the seal part of the non-woven fabric separator, formed with the rubber-based seal part at the outer circumference part, was impregnated into a pre-gel solution, and subjected to thermal polymerization at 90° C. for 1 hour under inert gas atmosphere, so as to form a gel electrolyte part at the vicinity of the center part of the separator, and thus completed the electrolyte layer (see code $4c$ in FIGS. 6(F) and 6(G)). Thickness of the member of the resultant electrolyte layer, which retained the polymer gel electrolyte, was 20 μm, the same as that of the non-woven fabric separator.

Note that, as the above pre-gel solution, one composed of a polymer [5% by mass], an electrolyte solution+a lithium salt [95% by mass], and a polymerization initiator [0.1% by mass relative to the polymer], was used. Here, as the polymer, one composed of a copolymer of polyethylene oxide and polypropylene oxide (a copolymerization ratio of 5:1, and a weight average molecular weight of 8000) was used. As the above electrolyte solution, EC+DMC(EC:DMC(volume ratio)=1:3) was used. As the above lithium salt, 0.1 M $Li(C_2F_5SO_2)_2N$ was used. In addition, the amount of the lithium salt was set to be 1.0 M relative to the electrolyte solution. As the polymerization initiator, AIBN was used.

D. Formation of a Bipolar Battery

The bipolar electrode and the electrolyte layer, where a polymer gel electrolyte was retained in the non-woven fabric separator, and the rubber-based seal resin was formed and arranged at the outer circumference part of the gel electrolyte part of the separator were laminated so that the positive electrode and the negative electrode of the electrode sandwiched the electrolyte layer.

After lamination of 5 layers (equivalent to 5 sets of unit battery layers), a battery-layered product was encapsulated in a laminated package (one made of aluminum laminated with a polypropylene film; a battery jacket material) to form a bipolar battery.

Subsequently, sealing of the rubber-based seal part (see codes $4b_1$ and $4b2$ in FIG. 6(G)) was carried out by arranging an iron plate with a thickness of 3 mm on the upper and lower surfaces of the bipolar battery, and by fixing the iron plate by bolts and nuts mounted at the four corners so as to adhering the seal part to the collector by deformation under a pressure of 1 kg/cm² on the whole battery surface. By carrying out such sealing, the bipolar battery was completed (see FIG. 8(A)).

Example 4

An Example of a Non-woven Fabric Separator+a Heat Fusion Resin-based Seal Part

A. Formation of an Electrode
1. A Positive Electrode

The following materials are mixed in predetermined ratios to prepare slurry for the positive electrode.

Firstly, materials composed of spinel, $LiMn_2O_4$ [85% by mass] having an average particle diameter of 2 μm, as a positive electrode active material, acetylene black [5% by mass] as a conductivity promoter, PVDF [10% by mass] as a binder, and NMP as a solvent for slurry viscosity adjustment were mixed in the above ratios to prepare the slurry for the positive electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the one surface of a SUS foil (a thickness of 20 μm), as the collector, the slurry for the positive electrode was applied, and subjected to drying in a vacuum oven at 120° C. for 10 minutes to form the positive electrode having a thickness after drying of 50 μm.

2. A Negative Electrode

The following materials are mixed in predetermined ratios to prepare slurry for the negative electrode.

Firstly, materials composed of $Li_4Ti_5O_{12}$ [85% by mass], as a negative electrode active material, acetylene black [5% by mass] as a conductivity promoter, PVDF [10% by mass] as a binder, and NMP as a solvent for slurry viscosity adjustment were mixed in the above ratios to prepare the slurry for the negative electrode. Note that $Li_4Ti_5O_{12}$ used as the negative electrode active material had an average secondary particle diameter of 10 μm, and a structure having a certain degree of necking of primary particles having a size of 0.2 to 0.5 μm. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the opposite surface of a SUS foil, formed with the positive electrode, the slurry for the negative electrode was applied, and subjected to drying in a vacuum oven at 120° C. for 10 minutes to form the negative electrode having a thickness after drying of 50 μm.

By formation of each of the positive electrode and the negative electrode on each of the both sides of the SUS foil, that is the collector, a bipolar electrode was formed (see FIG. 1).

B. Formation of a Seal Part

A non-woven fabric separator with a thickness of 20 μm was prepared (see FIG. 9(A)). Then, at the four sides of the outer circumference part of the separator, a heat fusion seal resin with a height of 60 μm was formed and arranged at the both surfaces of the separator (see the seal part $4b_1$ in FIG. 9(D)) in a width of 10 mm from the outer side, and at the side surface of the separator outward from the outer side (see the seal part $4b_3$ in FIG. 9(D)) in a width of about 0.3 cm (=about 3 mm), so as to form a heat fusion resin-based seal part. Note that polypropylene was used as the above heat fusion seal resin.

Note that the sealing step hereafter will be explained in this step for convenience, although it was carried out after formation of a battery-layered product in the formation step of a bipolar battery, to be described later.

After formation of a battery-layered product in the formation step of a bipolar battery, to be described later, by heating and pressurization of the heat fusion resin-based seal part of the separator at 200° C. from upper and lower sides of the battery-layered product, so as to heat fuse and adhere (seal) onto the collector, sealing of the seal part was carried out (see the arrow mark and code 4b in FIGS. 10(A) and 10(B)).

C. Formation of an Electrolyte Layer

The inside of the seal part of the non-woven fabric separator, formed with the heat fusion resin-based seal part at the outer circumference part, was impregnated into a pre-gel solution, and subjected to thermal polymerization at 90° C. for 1 hour under inert gas atmosphere, so as to form a gel electrolyte part at the vicinity of the center part of the separator, and thus completed the electrolyte layer (see code 4c in FIGS. 9(C) and 9(D)). Thickness of the member of the resultant electrolyte layer, which retained the polymer gel electrolyte, was 20 μm, the same as that of the non-woven fabric separator.

Note that, as the above pre-gel solution, one composed of a polymer [5% by mass], an electrolyte solution+a lithium salt [95% by mass], and a polymerization initiator [0.1% by mass relative to the polymer], was used. Here, as the polymer, one composed of a copolymer of polyethylene oxide and polypropylene oxide (a copolymerization ratio of 5:1, and a weight average molecular weight of 8000) was used. As the above electrolyte solution, EC+DMC(EC:DMC(volume ratio)=1:3) was used. As the above lithium salt, 0.1 M $Li(C_2F_5SO_2)_2N$ was used. In addition, the amount of the lithium salt was set to be 1.0 M relative to the electrolyte solution. As the polymerization initiator, AIBN was used.

D. Formation of a Bipolar Battery

The above bipolar electrode and the electrolyte layer, where a polymer gel electrolyte was retained in the non-woven fabric separator, and the above heat fusion seal resin was formed and arranged at the outer circumference part of the gel electrolyte part of the separator, were laminated so that the positive electrode and the negative electrode of the electrode sandwiched the electrolyte layer (see FIG. 10(A)).

After lamination of 5 layers (equivalent to 5 sets of unit battery layers), a battery-layered product was encapsulated in a laminated package (one made of aluminum laminated with a polypropylene film; a battery jacket material) to form a bipolar battery.

Example 5

An Example of a Micro-porous Membrane Separator Made of Polyethylene+a Thermosetting Resin-based Seal Part A. Formation of an Electrode 1. A Positive Electrode The following materials are mixed in predetermined ratios to prepare slurry for the positive electrode.

Firstly, materials composed of spinel, $LiMn_2O_4$ [85% by mass] having an average particle diameter of 2 μm, as a positive electrode active material, acetylene black [5% by mass] as a conductivity promoter, PVDF [10% by mass] as a binder, and NMP as a solvent for slurry viscosity adjustment were mixed in the above ratios to prepare the slurry for the positive electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the one surface of a SUS foil (a thickness of 20 μm), as the collector, the slurry for the positive electrode was applied, and subjected to drying in a vacuum oven at 120° C. for 10 minutes to form the positive electrode having a thickness after drying of 30 μm.

2. A Negative Electrode

The following materials are mixed in predetermined ratios to prepare slurry for the negative electrode.

Firstly, materials composed of hard carbon [90% by mass], as a negative electrode active material, PVDF [10% by mass] as a binder, and NMP as a solvent for slurry viscosity adjustment were mixed in the above ratios to prepare the slurry for the negative electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the opposite surface of a SUS foil, formed with the positive electrode, the slurry for the negative electrode was applied, and subjected to drying in a vacuum oven at 120° C. for 10 minutes to form the negative electrode having a thickness after drying of 30 μm.

By formation of each of the positive electrode and the negative electrode on each of the both sides of the SUS foil, that is the collector, a bipolar electrode was formed (see FIG. 1).

B. Formation of a Seal Part

Figure 19:
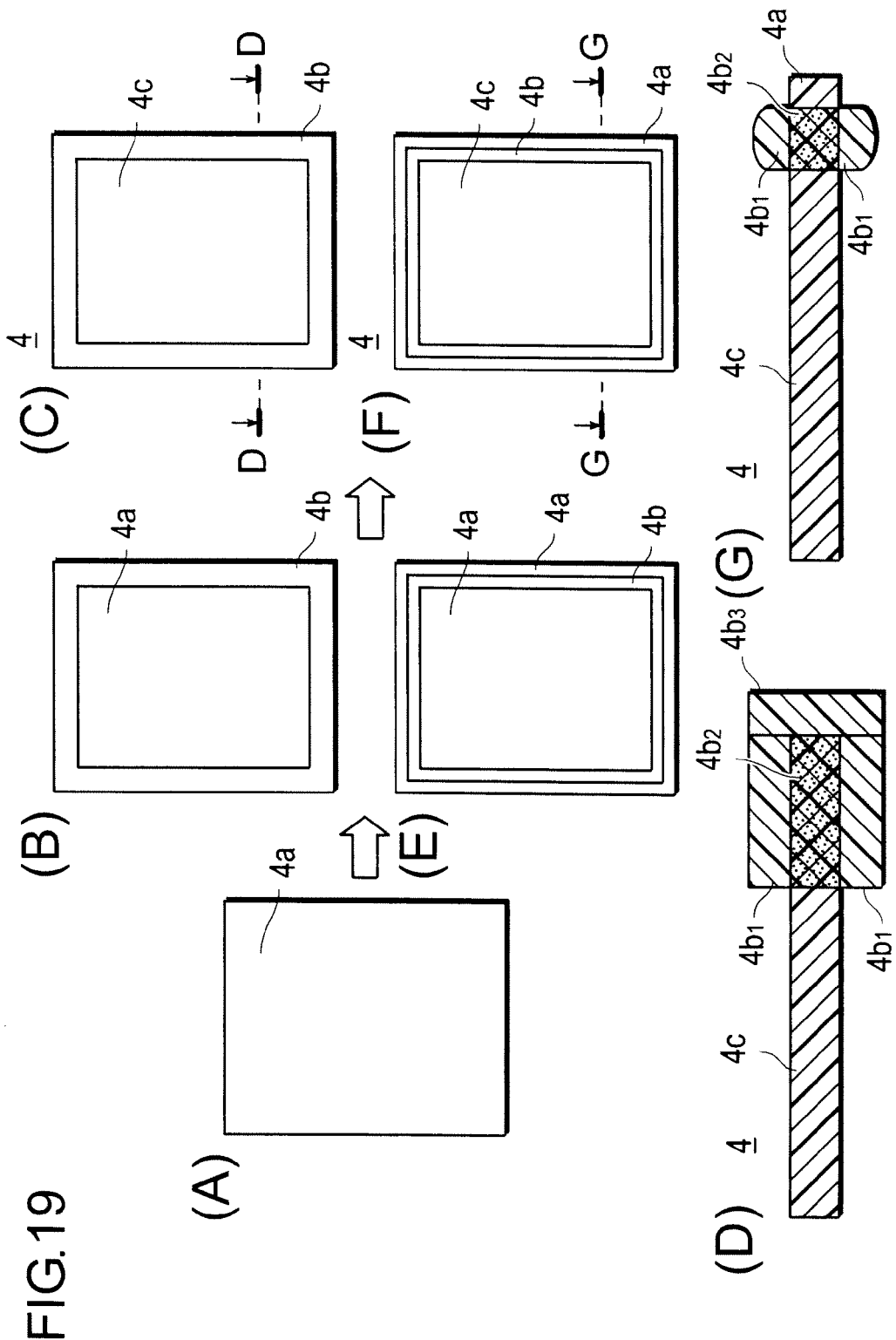
FIG. 19 is an outline plan view and an outline cross-sectional view stepwise showing production process appearances of an electrolyte layer arranged with a thermosetting resin-based seal member at a separator, used in a bipolar battery of the present invention.

A micro-porous membrane separator made of polyethylene, with a thickness of 12 μm, was prepared (see FIG. 19(A)).

Then, at the four sides of the outer circumference part of the separator, at the position of 4.5 mm from the outer side (=center position of the seal. In addition, distance from the seal center to the separator end was set to 6 mm, and width of the seal member was set to 3 mm), thermosettable seal resin with a height of 60 μm was formed and arranged at the one surface (see FIG. 19(E)) of the separator to form the thermosetting resin-based seal part. Note that a liquid type uncured epoxy resin was used as the thermosetting seal resin.

Figure 20:
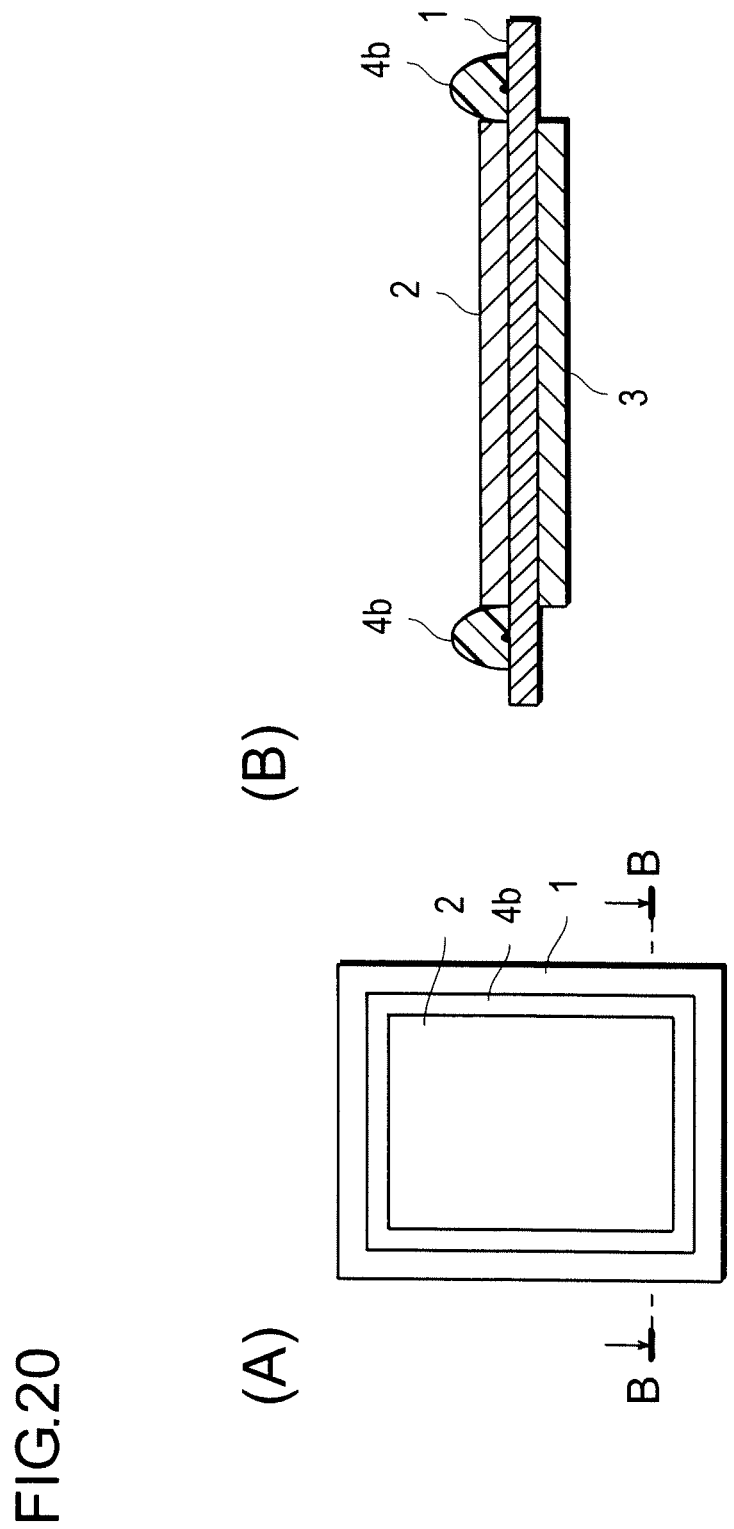
FIG. 20 is an outline plan view and an outline cross-sectional view showing production process appearances in arranging a thermosetting resin-based seal part at an electrolyte layer, used in a bipolar battery of the present invention.

Further, at the four sides of the outer circumference part of the aforementioned bipolar electrode, at the position of 4.5 mm from the outer side (=center position of the seal. In addition, distance from the seal center to the separator end was set to 6 mm, and width of the seal member was set to 3 mm), thermosettable seal resin with a height of 60 μm was formed and arranged at the one surface (see FIG. 20) of the electrode to form the thermosetting resin-based seal part. Note that a liquid type uncured epoxy resin was used as the thermosetting seal resin.

Note that the sealing step hereafter will be explained in this step for convenience, although it was carried out after formation of a battery-layered product in the formation step of a bipolar battery, to be described later.

After formation of a battery-layered product in the formation step of a bipolar battery, to be described later, by heating and pressurization of the thermosetting resin-based seal part of the separator, at 80° C. under a surface pressure of 1 kg/cm² for 1 hour, using a hot press machine, from upper and lower sides of the battery-layered product, so as to thermo-set and adhere (seal) onto the collector, sealing of the seal part was carried out (see the arrow mark and code $4b$ in FIGS. 10(A) and 10(B)).

C. Formation of an Electrolyte Layer

Figure 21:
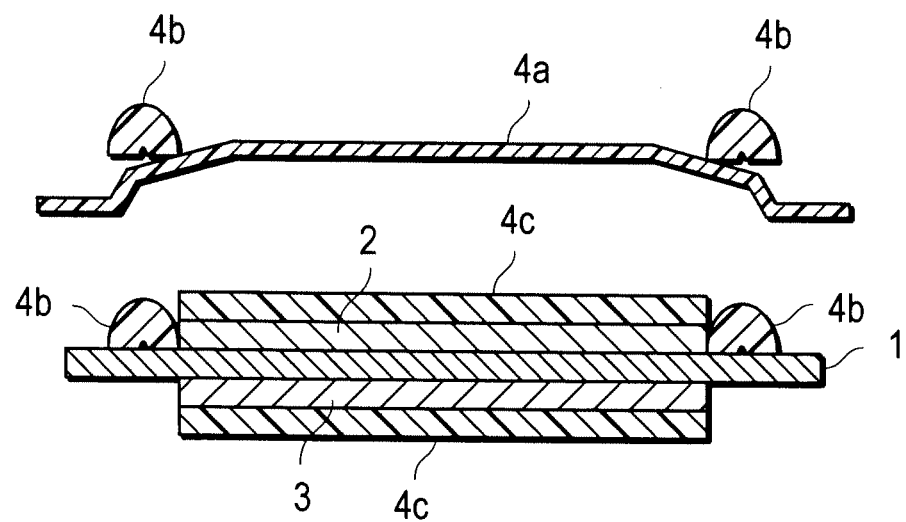
FIG. 21 is an outline plan view and an outline cross-sectional view schematically showing appearances in arrangement of a thermosettable seal resin, at the four sides of the outer circumference part of the positive electrode side or the negative electrode side of a bipolar electrode, which is made by forming the positive electrode at the vicinity of the center part of one surface of the collector, and the negative electrode at the vicinity of the center part of the other surface, which is used in a bipolar battery of the present invention, as well as in lamination of a separator arranged with a gel electrolyte at the positive electrode side or the negative electrode side of the collector, and a thermosettable seal resin at the four sides of the outer circumference part.

By application of a gel electrolyte onto an electrode member of the positive and negative electrodes of the bipolar electrode, and by drying so as to soak the electrolyte, the electrolyte layer was formed (see code $4c$ in FIG. 21).

Note that, the gel electrolyte was prepared by PVDF-HPF containing 10% by mass of an HPF polymer [10% by mass] as a host polymer, an electrolyte solution, PC-EC 1 M-LiPF$_6$ [90% by mass], and DMC as a solvent for slurry viscosity adjustment, by adding so as to be optimal viscosity.

D. Formation of a Bipolar Battery

The thermosetting resin-based seal part $4b$, the bipolar electrode arranged with the electrolyte layer $4c$, and the separator $4a$ configured by the micro-porous membrane made of polyethylene, arranged with the thermosetting resin-based seal part $4b$ were laminated, so that the positive electrode and the negative electrode of the bipolar electrode sandwiched the electrolyte layer $4c$ and the separator $4a$ (see FIGS. 21 and 10(B)).

By the lamination, the electrolyte on the bipolar electrode soaked into the separator $4a$ to form the electrolyte layer at the separator $4a$, and as well forms the seal part by the thermosetting resin-based seal part $4b$ on the separator $4a$, and the thermosetting resin-based seal part on the bipolar electrode.

After lamination of 5 layers (equivalent to 5 sets of unit battery layers), a battery-layered product was encapsulated in a laminated package (one made of aluminum laminated with a polypropylene film; a battery jacket material) to form a bipolar battery.

Example 6

An Example of a Micro-porous Membrane Separator Made of Polyethylene+a Thermosetting Resin-based Seal Part+Silica Particles A. Formation of an Electrode
1. A Positive Electrode The following materials are mixed in predetermined ratios to prepare slurry for the positive electrode.

Firstly, materials composed of spinel, LiMn$_2$O$_4$ [85% by mass] having an average particle diameter of 2 μm, as a positive electrode active material, acetylene black [5% by mass] as a conductivity promoter, PVDF [10% by mass] as a binder, and NMP as a solvent for slurry viscosity adjustment were mixed in the above ratios to prepare the slurry for the positive electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the one surface of a SUS foil (a thickness of 20 μm), as the collector, the slurry for the positive electrode was applied, and subjected to drying in a vacuum oven at 120° C. for 10 minutes to form the positive electrode having a thickness after drying of 30 μm.

2. A Negative Electrode

The following materials are mixed in predetermined ratios to prepare slurry for the negative electrode.

Firstly, materials composed of hard carbon [90% by mass], as a negative electrode active material, PVDF [10% by mass] as a binder, and NMP as a solvent for slurry viscosity adjustment were mixed in the above ratios to prepare the slurry for the negative electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the opposite surface of a SUS foil, formed with the positive electrode, the slurry for the negative electrode was applied, and subjected to drying in a vacuum oven at 120° C. for 10 minutes to form the negative electrode having a thickness after drying of 30 μm.

By formation of each of the positive electrode and the negative electrode on each of the both sides of the SUS foil, that is the collector, a bipolar electrode was formed (see FIG. 1).

B. Formation of a Seal Part

A micro-porous membrane separator made of polyethylene, with a thickness of 12 μm, was prepared (see FIG. 19(A)).

Then, at the four sides of the outer circumference part of the separator, at the position of 4.5 mm from the outer side (=center position of the seal. In addition, distance from the seal center to the separator end was set to 6 mm, and width of the seal member was set to 3 mm), thermosettable seal resin with a height of 60 µm was formed and arranged at the one surface (see FIG. 19(E)) of the separator to form the thermosetting resin-based seal part. Note that a liquid type uncured epoxy resin was used as the thermosetting seal resin. Here, to the epoxy resin, silica particles (10% by mass) were dispersed.

Further, at the four sides of the outer circumference part of the bipolar electrode, at the position of 4.5 mm from the outer side (=center position of the seal. In addition, distance from the seal center to the separator end was set to 6 mm, and width of the seal member was set to 3 mm), thermosettable seal resin with a height of 60 µm was formed and arranged at the one surface (see FIG. 20) of the electrode to form the thermosetting seal resin-based seal part. Note that a liquid type uncured epoxy resin was used as the above thermosetting seal resin. Here, to the epoxy resin, silica particles (10% by mass) were dispersed.

Note that the sealing step hereafter will be explained in this step for convenience, although it was carried out after formation of a battery-layered product in the formation step of a bipolar battery, to be described later.

After formation of a battery-layered product in the formation step of a bipolar battery, to be described later, by heating and pressurization of the thermosetting resin-based seal part of the separator, at 80° C. under a surface pressure of 1 kg/cm$^2$ for 1 hour, using a hot press machine, from upper and lower sides of the battery-layered product, so as to heat fuse and adhere (seal) onto the collector, sealing of the seal part was carried out (see the arrow mark and code $4b$ in FIGS. 10(A) and 10(B)).

C. Formation of an Electrolyte Layer

By application of a gel electrolyte onto an electrode member of the positive and negative electrodes of the bipolar electrode, and by drying so as to soak the electrolyte, the electrolyte layer was formed (see code $4c$ in FIG. 21).

Note that, the above gel electrolyte was prepared by PVDF-HPF containing 10% by mass of an HPF polymer [10% by mass] as a host polymer, an electrolyte solution, PC-EC 1 M-LiPF$_6$ [90% by mass], and DMC as a solvent for slurry viscosity adjustment, by adding so as to be optimal viscosity.

D. Formation of a Bipolar Battery

The bipolar electrode arranged with the above thermosetting resin-based seal part $4b$ and the electrolyte layer $4c$, and the separator $4a$ configured by the micro-porous membrane separator made of polyethylene, arranged with the above thermosetting resin-based seal part $4b$ were laminated, so that the positive electrode and the negative electrode of the bipolar electrode sandwiched the electrolyte layer $4c$ and the separator $4a$ (see FIGS. 21 and 10(B)).

By the lamination, the electrolyte on the bipolar electrode soaked into the separator $4a$ to form the electrolyte layer at the separator $4a$, and as well forms the seal part by the thermosetting resin-based seal part $4b$ on the separator $4a$, and the thermosetting resin-based seal part on the bipolar electrode.

After lamination of 5 layers (equivalent to 5 sets of unit battery layers), a battery-layered product was encapsulated in a laminated package (one made of aluminum laminated with a polypropylene film; a battery jacket material) to form a bipolar battery.

Example 7

An Example of a Non-woven Fabric Separator+a Thermosetting Resin-based Seal Part A. Formation of an Electrode
1. A Positive Electrode
The following materials are mixed in predetermined ratios to prepare slurry for the positive electrode.

Firstly, materials composed of spinel, LiMn$_2$O$_4$ [85% by mass] having an average particle diameter of 2 µm, as a positive electrode active material, acetylene black [5% by mass] as a conductivity promoter, PVDF [10% by mass] as a binder, and NMP as a solvent for slurry viscosity adjustment were mixed in the above ratios to prepare the slurry for the positive electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the one surface of a SUS foil (a thickness of 20 µm), as the collector, the slurry for the positive electrode was applied, and subjected to drying in a vacuum oven at 120° C. for 10 minutes to form the positive electrode having a thickness after drying of 30 µm.

2. A Negative Electrode
The following materials are mixed in predetermined ratios to prepare slurry for the negative electrode.

Firstly, materials composed of hard carbon [90% by mass], as a negative electrode active material, PVDF [10% by mass] as a binder, and NMP as a solvent for slurry viscosity adjustment were mixed in the above ratios to prepare the slurry for the negative electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the opposite surface of a SUS foil, formed with the positive electrode, the slurry for the negative electrode was applied, and subjected to drying in a vacuum oven at 120° C. for 10 minutes to form the negative electrode having a thickness after drying of 30 µm.

By formation of each of the positive electrode and the negative electrode on each of the both sides of the SUS foil, that is the collector, a bipolar electrode was formed (see FIG. 1).

B. Formation of a Seal Part

A non-woven fabric separator, made of aramid fiber with a thickness of 12 µm, was prepared (see FIG. 19(A)).

Then, at the four sides of the outer circumference part of the separator, at the position of 4.5 mm from the outer side (=center position of the seal. In addition, distance from the seal center to the separator end was set to 6 mm, and width of the seal member was set to 3 mm), thermosettable seal resin with a height of 60 µm was formed and arranged at the one surface (see FIG. 19(E)) of the separator to form the thermosetting seal resin-based seal part. Note that a liquid type uncured epoxy resin was used as the above thermosetting seal resin. In addition, the liquid type uncured epoxy resin, as the above thermosetting seal resin, was penetrated deep inside the separator.

Further, at the four sides of the outer circumference part of the bipolar electrode, at the position of 4.5 mm from the outer side (=center position of the seal. In addition, distance from the seal center to the separator end was set to 6 mm, and width of the seal member was set to 3 mm), thermosettable seal resin with a height of 60 µm was formed and arranged at the one surface (see FIG. 20) of the electrode to form the thermosetting resin-based seal part. Note that a liquid type uncured epoxy resin was used as the thermosetting seal resin.

Note that the sealing step hereafter will be explained in this step for convenience, although it was carried out after formation of a battery-layered product in the formation step of a bipolar battery, to be described later.

After formation of a battery-layered product in the formation step of a bipolar battery, to be described later, by heating and pressurization of the thermosetting resin-based seal part of the separator, at 80° C. under a surface pressure of 1 kg/cm² for 1 hour, using a hot press machine, from upper and lower sides of the battery-layered product, so as to heat fuse and adhere (seal) onto the collector, sealing of the seal part was carried out (see the arrow mark and code 4b in FIGS. 10(A) and 10(B)).

C. Formation of an Electrolyte Layer

By application of a gel electrolyte onto an electrode member of the positive and negative electrodes of the aforementioned bipolar electrode, and by drying so as to soak the electrolyte, the electrolyte layer was formed (see code 4c in FIG. 21).

Note that, the above gel electrolyte was prepared by PVDF-HPF containing 10% by mass of an HPF polymer [10% by mass] as a host polymer, an electrolyte solution, PC-EC 1 M-LiPF$_6$ [90% by mass], and DMC as a solvent for slurry viscosity adjustment, by adding so as to be optimal viscosity.

D. Formation of a Bipolar Battery

The bipolar electrode arranged with the above thermosetting resin-based seal part 4b and the electrolyte layer 4c, and the separator 4a configured by the micro-porous membrane separator made of polyethylene, arranged with the above thermosetting resin-based seal part 4b were laminated, so that the positive electrode and the negative electrode of the bipolar electrode sandwiched the electrolyte layer 4c and the separator 4a (see FIGS. 21 and 10(B)).

By the lamination, the electrolyte on the bipolar electrode soaked into the separator 4a to form the electrolyte layer at the separator 4a, and as well forms the seal part by the thermosetting resin-based seal part 4b on the separator 4a, and the thermosetting resin-based seal part on the bipolar electrode.

After lamination of 5 layers (equivalent to 5 sets of unit battery layers), a battery-layered product was encapsulated in a laminated package (one made of aluminum laminated with a polypropylene film; a battery jacket material) to form a bipolar battery.

Example 8

An Example of a Micro-porous Membrane Separator Made of Polyethylene+a Thermosetting Resin-based Seal Part A. Formation of an Electrode
1. A Positive Electrode The following materials are mixed in predetermined ratios to prepare slurry for the positive electrode.

Firstly, materials composed of spinel, LiMn$_2$O$_4$ [85% by mass] having an average particle diameter of 2 μm, as a positive electrode active material, acetylene black [5% by mass] as a conductivity promoter, PVDF [10% by mass] as a binder, and NMP as a solvent for slurry viscosity adjustment were mixed in the above ratios to prepare the slurry for the positive electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the one surface of a SUS foil (a thickness of 20 μm), as the collector, the slurry for the positive electrode was applied, and subjected to drying in a vacuum oven at 120° C. for 10 minutes to form the positive electrode having a thickness after drying of 30 μm.

2. A Negative Electrode

The following materials are mixed in predetermined ratios to prepare slurry for the negative electrode.

Firstly, materials composed of hard carbon [90% by mass], as a negative electrode active material, PVDF [10% by mass] as a binder, and NMP as a solvent for slurry viscosity adjustment were mixed in the above ratios to prepare the slurry for the negative electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the opposite surface of a SUS foil, formed with the positive electrode, the slurry for the negative electrode was applied, and subjected to drying in a vacuum oven at 120° C. for 10 minutes to form the negative electrode having a thickness after drying of 30 μm.

By formation of each of the positive electrode and the negative electrode on each of the both sides of the SUS foil, that is the collector, a bipolar electrode was formed (see FIG. 1).

B. Formation of a Seal Part

A micro-porous membrane separator made of polyethylene, with a thickness of 12 μm, was prepared (see FIG. 19(A)).

Then, at the four sides of the outer circumference part of the separator, at the position of 10 mm from the outer side, thermosettable seal resin with a height of 60 μm was formed and arranged at the one surface (see FIG. 19(C)) of the separator to form the thermosetting resin-based seal part. Note that a liquid type uncured epoxy resin was used as the above thermosetting seal resin.

Figure 22:
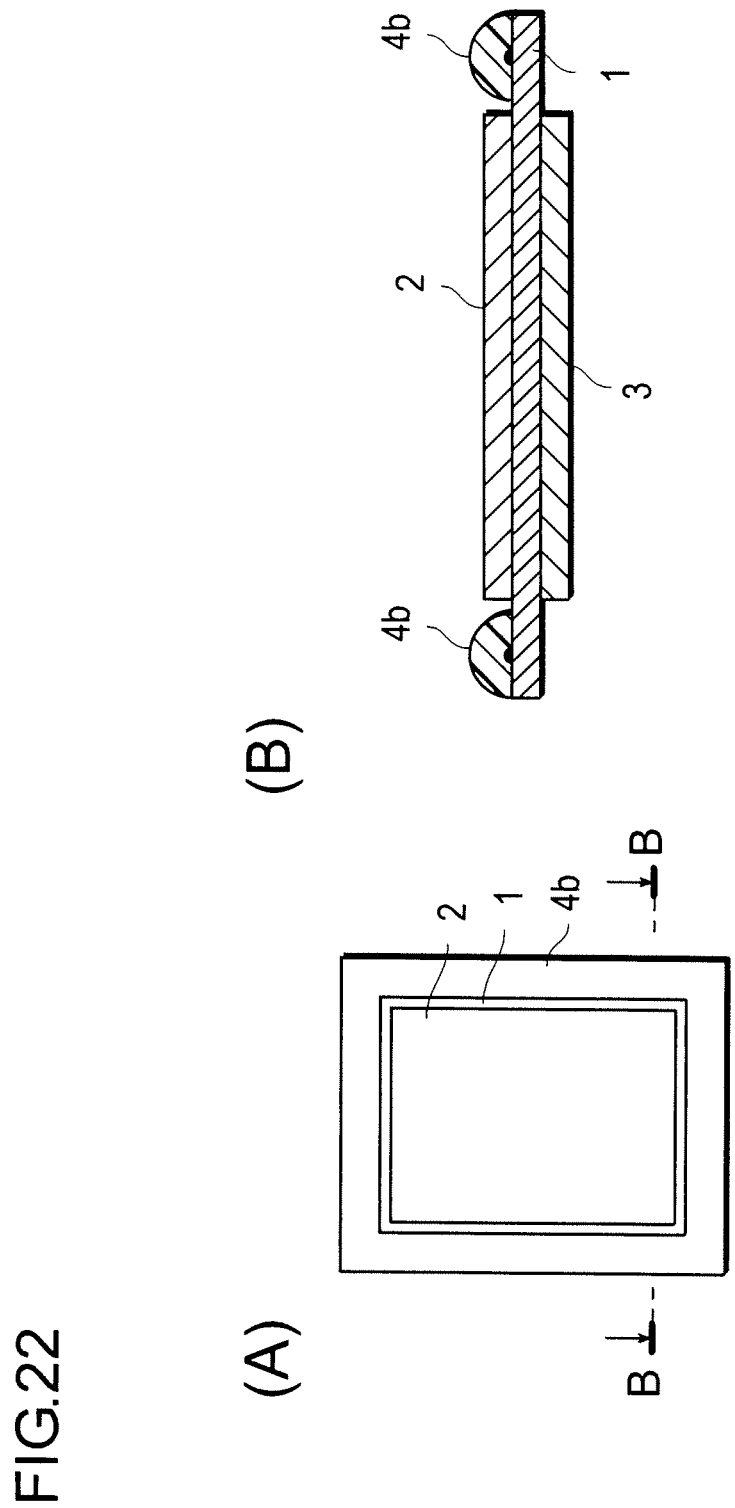
FIG. 22 is an outline plan view and an outline cross-sectional view showing production process appearances in arranging of a thermosetting resin-based seal part at an electrolyte layer, used in a bipolar battery of the present invention.

Further, at the four sides of the outer circumference part of the bipolar electrode, at the position of 10 mm from the outer side, thermosettable seal resin with a height of 60 μm was formed and arranged at the one surface (see FIG. 22) of the electrode to form the thermosetting resin-based seal part. Note that a liquid type uncured epoxy resin was used as the thermosetting seal resin.

Note that the sealing step hereafter will be explained in this step for convenience, although it was carried out after formation of a battery-layered product in the formation step of a bipolar battery, to be described later.

After formation of a battery-layered product in the formation step of a bipolar battery, to be described later, by heating and pressurization of the heat fusion resin-based seal part of the separator, at 80° C. under a surface pressure of 1 kg/cm² for 1 hour, using a hot press machine, from upper and lower sides of the battery-layered product, so as to thermo set and adhere (seal) onto the collector, sealing of the seal part was carried out (see the arrow mark and code 4b in FIGS. 10(A) and 10(B)).

C. Formation of an Electrolyte Layer

By application of a gel electrolyte onto an electrode member of the positive and negative electrodes of the aforementioned bipolar electrode, and by drying so as to soak the electrolyte, the electrolyte layer was formed (see code 4c in FIG. 21).

Note that, the above gel electrolyte was prepared by PVDF-HPF containing 10% by mass of an HPF polymer [10% by mass] as a host polymer, an electrolyte solution, PC-EC 1 M-LiPF$_6$ [90% by mass], and DMC as a solvent for slurry viscosity adjustment, by adding so as to be optimal viscosity.

D. Formation of a Bipolar Battery

The bipolar electrode arranged with the above thermosetting resin-based seal part 4b and the electrolyte layer 4c, and the separator 4a configured by the micro-porous membrane separator made of polyethylene, arranged with the above thermosetting resin-based seal part 4b were laminated, so that the positive electrode and the negative electrode of the bipolar electrode sandwiched the electrolyte layer 4c and the separator 4a (see FIGS. 21 and 10(B)).

By the lamination, the electrolyte on the bipolar electrode soaked into the separator 4a to form the electrolyte layer at the separator 4a, and as well forms the seal part by the thermosetting resin-based seal part 4b on the separator 4a, and the thermosetting resin-based seal part on the bipolar electrode.

After lamination of 5 layers (equivalent to 5 sets of unit battery layers), a battery-layered product was encapsulated in a laminated package (one made of aluminum laminated with a polypropylene film; a battery jacket material) to form a bipolar battery Example 9

An Example of a Micro-porous Membrane Separator Made of polypropylene+a heat fusion resin-based seal part, where the Separator is Larger than the Collector Formed with the Positive Electrode and the Negative Electrode, and at the Part of the Separator Larger than the Collector, is Adhered with Other Adjacent Separator in the Lamination Direction A. Formation of an Electrode
1. Formation of a Positive Electrode The following materials are mixed in predetermined ratios to prepare slurry for the positive electrode.

Firstly, materials composed of spinel, $LiMn_2O_4$ [85% by mass] having an average particle diameter of 2 μm, as a positive electrode active material, acetylene black [5% by mass] as a conductivity promoter, PVDF [10% by mass] as a binder, and NMP as a solvent for slurry viscosity adjustment were mixed in the above ratios to prepare the slurry for the positive electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the one surface of a SUS foil (a thickness of 20 μm), as the collector, the slurry for the positive electrode was applied, and subjected to drying in a vacuum oven at 120° C. for 10 minutes to form the positive electrode having a thickness after drying of 50 μm.

2. Formation of a Negative Electrode

The following materials are mixed in predetermined ratios to prepare slurry for the negative electrode.

Firstly, materials composed of $Li_4Ti_5O_{12}$ [85% by mass], as a negative electrode active material, acetylene black [5% by mass] as a conductivity promoter, PVDF [10% by mass] as a binder, and NMP as a solvent for slurry viscosity adjustment were mixed in the above ratios to prepare the slurry for the negative electrode. Note that $Li_4Ti_5O_{12}$ used as the negative electrode active material had an average secondary particle diameter of 10 μm, and a structure having a certain degree of necking of primary particles having a size of 0.2 to 0.5 μm. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the opposite surface of a SUS foil, formed with the positive electrode, the slurry for the negative electrode was applied, and subjected to drying in a vacuum oven at 120° C. for 10 minutes, so as to form the negative electrode area wider compared with that of the positive electrode, and the negative electrode having a thickness after drying of 50 μm was formed.

By formation of each of the positive electrode and the negative electrode on each of the both sides of the SUS foil, that is the collector, a bipolar electrode was formed (see FIGS. 1 and 16(A)).

B. Formation of a Seal Part

A micro-porous membrane separator made of polypropylene with a thickness of 20 μm was prepared, as the separator larger than the collector formed with the positive electrode and the negative electrode (see FIG. 9(A)). Then, at the four sides of the outer circumference part of the separator, a heat fusion seal resin was soaked (to thickness nearly the same thickness of the separator) to form and arrange so as to fill the micro holes of the separator and furnish adhesiveness, to form the heat fusion resin-based seal part. Note that polypropylene was used as the heat fusion seal resin.

C. Formation of an Electrolyte Layer

The inside of the seal part of the micro-porous membrane separator, formed with the heat fusion resin-based seal part at the outer circumference part in the above step B, was impregnated into a pre-gel solution, and subjected to thermal polymerization at 90° C. for 1 hour under inert gas atmosphere, so as to form a gel electrolyte part at the vicinity of the center part of the separator, and thus formed the electrolyte layer (see code 4c in FIGS. 9(C), 9(D) and 15). Thickness of the member of resultant electrolyte layer, which held a polymer gel electrolyte, was 20 μm, the same as that of the micro-porous membrane separator.

Note that, as the above pre-gel solution, one composed of a polymer [5% by mass], an electrolyte solution+a lithium salt [95% by mass], and a polymerization initiator [0.1% by mass relative to the polymer], was used. Here, as the above polymer, one composed of a copolymer of polyethylene oxide and polypropylene oxide (a copolymerization ratio of 5:1, and a weight average molecular weight of 8000) was used. As the above electrolyte solution, EC+DMC(EC:DMC(volume ratio)=1:3) was used. As the above lithium salt, 0.1 M $Li(C_2F_5SO_2)_2N$ was used. In addition, the amount of the lithium salt was set to be 1.0 M relative to the electrolyte solution. As the polymerization initiator, AIBN was used.

D. Formation Of an Electrode-Electrolyte Layer Seal Member (a Former Stage of the Sealing Step)

The sealing step of the present example was carried out by dividing into the step for forming first the electrode-electrolyte layer seal member (see FIGS. 16(A) to 16(C)), before forming a battery-layered product in the formation step of a bipolar battery to be described later, and the step for the sealing by heating finally seal members themselves at the most outer circumference part, after forming the battery-layered product by lamination of a plurality of the electrode-electrolyte layer seal members.

In these steps, in the formation step for the electrode-electrolyte layer seal member, the electrolyte layer formed in the step (C) was laminated at the positive electrode side of the bipolar electrode formed in the step (A), so that a part of the electrolyte layer, which retained a polymer gel electrolyte, was joined to the member formed with the positive electrode of the bipolar electrode. After the lamination, (a part of) the seal part was subjected to heat fusion by heating and pressurization of the part of the collector not formed with the positive electrode (the part to seal the collector), from upper and lower sides thereof, so as to adhere (seal) onto the collector, and thus sealing of the seal part was carried out (see the x mark in FIG. 16(A)). In this way, the electrode-electrolyte layer seal part was formed by separately adhering (sealing), layer by layer, the seal part formed and arranged at the outer circumference part of the separator, to the collector member at the circumference border part of the positive electrode of the bipolar electrode (see FIG. 16(A)). Note that also an electrode used at the most outer layer of the electrode-laminated member was designed to have a structure, as shown in FIGS. 16(B) and 16(C), where an electrode (a positive electrode or a negative electrode) was formed at only one surface necessary to the collector, and similarly as the above, the electrode-electrolyte layer seal part for the most outer layer was formed.

E. Formation of a Bipolar Battery (Including a Later Stage of the Sealing Step)

1. Formation of a Battery-Layered Product

The electrode-electrolyte layer seal member (including the electrode-electrolyte layer seal member for the most outer layer) was laminated in 5 layers so that the positive electrode and the negative electrode of the electrode sandwiched the electrolyte layer to form a battery-layered product (see FIG. 15).

2. A Later Stage of the Sealing Step

Then, after formation of the battery-layered product, by heating and pressurization of the seal members themselves at the most outer circumference of the seal part, from upper and lower sides, so as to make heat fusion at the most outer circumference of the heat fusion resin-based sealing member, and adhere (seal) all of the seal members themselves, sealing of the seal part was carried out (see seal part (• mark) in FIG. 15).

3. Formation of a Bipolar Battery

After completion of the sealing between the above seal parts themselves (the later stage of the sealing step), the battery-layered product was encapsulated in a laminated package (one made of aluminum laminated with a polypropylene film; a battery jacket material) to form a bipolar battery.

Example 10

An Example of, in Battery Configuration in Example 9, Further Forming and Arranging a Heat Fusion Seal Resin, so that Area of a Part of a Separator, which Retains a Polymer Gel Electrolyte, is Smaller than that for the Positive Electrode Formation A. Formation of an Electrode 1. A Positive Electrode The following materials are mixed in predetermined ratios to prepare slurry for the positive electrode.

Firstly, materials composed of spinel, $LiMn_2O_4$ [85% by mass] having an average particle diameter of 2 μm, as a positive electrode active material, acetylene black [5% by mass] as a conductivity promoter, PVDF [10% by mass] as a binder, and NMP as a solvent for slurry viscosity adjustment were mixed in the above ratios to prepare the slurry for the positive electrode. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the one surface of a SUS foil (a thickness of 20 μm), as the collector, the slurry for the positive electrode was applied, and subjected to drying in a vacuum oven at 120° C. for 10 minutes to form the positive electrode having a thickness after drying of 50 μm.

2. A Negative Electrode

The following materials are mixed in predetermined ratios to prepare slurry for the negative electrode.

Firstly, materials composed of $Li_4Ti_5O_{12}$ [85% by mass], as a negative electrode active material, acetylene black [5% by mass] as a conductivity promoter, PVDF [10% by mass] as a binder, and NMP as a solvent for slurry viscosity adjustment were mixed in the above ratios to prepare the slurry for the negative electrode. Note that $Li_4Ti_5O_{12}$ used as the negative electrode active material had an average secondary particle diameter of 10 μm, and a structure having a certain degree of necking of primary particles having a size of 0.2 to 0.5 μm. The above NMP is removed as a whole by vaporization in drying the electrode, and not a configuration material of the electrode, therefore the suitable amount was added so as to provide suitable slurry viscosity. In addition, the above ratios represent those converted by components excluding the solvent for slurry viscosity adjustment.

On the opposite surface of a SUS foil, formed with the positive electrode, the slurry for the negative electrode was applied, so that area of a negative electrode is wider than that of a positive electrode, and subjected to drying in a vacuum oven at 120° C. for 10 minutes to form the negative electrode having a thickness after drying of 50 μm.

By formation of each of the positive electrode and the negative electrode on each of the both sides of the SUS foil, that is the collector, a bipolar electrode was formed (see FIGS. 1 and 17).

B. Formation of a Seal Part

A micro-porous membrane separator made of polypropylene with a thickness of 20 μm was prepared, as the separator larger than the collector formed with the positive electrode and the negative electrode. (see FIG. 9(A)). Then, at the four sides of the outer circumference part of the separator, a heat fusion seal resin was soaked (to thickness nearly the same thickness of the separator) to form and arrange so as to fill the micro holes of the separator and furnish adhesiveness, to form a heat fusion resin-based seal part. Note that polypropylene was used as the above heat fusion seal resin.

C. Formation of an Electrolyte Layer

The inside of the seal part of the micro-porous membrane separator, formed with the heat fusion resin-based seal part at the outer circumference part, was impregnated into a pre-gel solution, and subjected to thermal polymerization at 90° C. for 1 hour under inert gas atmosphere, so as to form a gel electrolyte part at the vicinity of the center part of the separator, and thus formed the electrolyte layer (see code 4c in FIGS. 9(C), 9(D) and 17 or the like). Thickness of the member of resultant electrolyte layer, which held a polymer gel electrolyte, was 20 μm, the same as that of the micro-porous membrane separator.

Note that, as the above pre-gel solution, one composed of a polymer [5% by mass], an electrolyte solution+a lithium salt [95% by mass], and a polymerization initiator [0.1% by mass relative to the polymer], was used. Here, as the above polymer, one composed of a copolymer of polyethylene oxide and polypropylene oxide (a copolymerization ratio of 5:1, and a weight average molecular weight of 8000) was used. As the above electrolyte solution, EC+DMC(EC:DMC(volume ratio)=1:3) was used. As the above lithium salt, 0.1 M $Li(C_2F_5SO_2)_2N$ was used. In addition, the amount of the lithium salt was set to be 1.0 M relative to the electrolyte solution. As the polymerization initiator, AIBN was used.

D. Formation of an Electrode-Electrolyte Layer Seal Member (a Former Stage of the Sealing Step)

The sealing step of the present example was also carried out by dividing into the step for forming first the electrode-electrolyte layer seal member (see FIGS. 16(A) to 16(C)), before forming a battery-layered product in the formation step of a bipolar battery to be described later, and the step for the sealing by heating finally seal members themselves at the most outside circumference part, after forming the battery-layered product by lamination of a plurality of the electrode-electrolyte layer seal members.

In these steps, in the formation step for electrode-electrolyte layer seal member, the electrolyte layer formed in the step (C) was laminated on the positive electrode side of the bipolar electrode formed in the step (A), so that a part of the electrolyte layer, which retained a polymer gel electrolyte, and a part of the seal part formed at the outer circumference part thereof, were joined to the member formed with the positive electrode of the bipolar electrode. After the lamination, (a part of) the seal part was subjected to heat fusion by heating and pressurization of the member of the collector not formed with the positive electrode (the member to seal the collector), from upper and lower sides thereof, so as to adhere (seal) onto the collector, and thus sealing of the seal part was carried out (see the x mark in FIGS. 16(A) and 17). In this way, the electrode-electrolyte layer seal member was formed by separately adhering (sealing), layer by layer, the seal part formed and arranged at the outer circumference part of the separator, to the collector member at the circumference border part of the positive electrode of the bipolar electrode (see FIG. 16(A)). Note that also an electrode used at the most outer layer of the electrode-laminated member was designed to have a structure, as shown in FIGS. 16(B) and 16(C), where an electrode (a positive electrode or a negative electrode) was formed at only one surface necessary to the collector, and similarly as the above, the electrode-electrolyte layer seal member for the most outer layer was formed.

E. Formation of a Bipolar Battery (Including a Later Stage of the sealing step)

1. Formation of a Battery-Layered Product

The above electrode-electrolyte layer seal member (including the electrode-electrolyte layer seal member for the most outer layer) was laminated in 5 layers so that the positive electrode and the negative electrode of the electrode sandwiched the electrolyte layer (see FIG. 17).

2. A Later Stage of the Sealing Step

Then, after formation of the battery-layered product, by heating and pressurization of the seal members themselves at the most outer circumference of the seal part, from upper and lower sides, so as to make heat fusion at the most outer circumference of the heat fusion resin-based sealing member, and adhere (seal) all of the seal members, sealing of the seal part was carried out (see seal part (• mark) in FIG. 17).

3. Formation of a Bipolar Battery

After completion of the sealing between the above seal parts themselves (the later stage of the sealing step), the battery-layered product was encapsulated in a laminated package (one made of aluminum laminated with a polypropylene film; a battery jacket material) to form a bipolar battery.

Comparative Example 1

An Example not Having a Seal Part

As Comparative Example 1, a bipolar battery was formed by encapsulation of a battery-layered product using a battery jacket material, after lamination of 5 layers (equivalent to 5 sets of unit battery layers), similarly as in Example 1, except that an electrolyte layer not formed with a seal resin at the outer circumference part of the gel electrolyte part of the micro-porous membrane separator (see FIG. 14).

Evaluation of a Battery

Each of bipolar batteries obtained in the above Examples to 10 and Comparative Example 1 was subjected to a charge-discharge cycle test. As for the cycle condition of the charge-discharge cycle test, the following sequence was used as one cycle: charging up to 4.2 V under 1 C constant current, 10 minutes of intermission, discharging down to 2.5 V under 1 C constant current, and 10 minutes of intermission. Temperature was not controlled during the test, and the test was carried out at room temperature (about 25° C.) environment.

In a bipolar battery obtained in Comparative Example 1, where a seal resin was not formed and arranged, presence of a unit battery layer which generated voltage drop was confirmed, during the first charging stage, therefore teardown analysis (cutting off a side of a heat fusion member of the laminated package of the battery jacket material) was carried out. As a result, attachment of the electrolyte solution to the laminated package of the battery jacket material was confirmed; the electrolyte solution was leaked outside the unit battery layer, which generated contact with an electrolyte layer of other unit battery layer and thus liquid junction.

Other bipolar batteries obtained in Examples 1 to 10, having a seal part, were confirmed to maintain voltage of each of unit battery layers, even over 50 cycles, and no generation of liquid junction. As a result of teardown analysis (cutting off a side of a heat fusion member of the laminated package of the battery jacket material), attachment of the electrolyte solution to the laminated package, and leak out of the electrolyte solution were not confirmed.

The above Examples are for more specifically explaining the present invention, and therefore the present invention should not be limited to these Examples.

The invention claimed is:

1. A method for producing a bipolar battery laminated, in series, with a plurality of bipolar electrodes, with a bipolar electrode being formed with a positive electrode on one surface of a collector and a negative electrode on another surface of the collector, so as to sandwich an electrolyte layer, which comprises the steps of:
   providing a separator, wherein the separator retains an electrolyte of said electrolyte layer;
   providing a seal resin on a top surface of an outer circumferential part of said separator and on a bottom surface of the outer circumferential part of said separator; and
   laminating said bipolar electrode and said separator retaining said electrolyte, the laminating resulting in said seal resin being provided within the outer circumferential part of said separator and said seal resin also being provided between a surface of the outer circumferential part of said separator and a surface of the circumferential part of said collector.

2. The method according to claim 1, wherein said seal resin is melted upon heat-treatment and impregnated into the outer circumferential part of said separator in the laminating step.

3. The method according to claim 1, wherein said seal resin is further provided at a side surface of the outer circumferential part of said separator in the laminating step, the side surface being perpendicular to the top surface and the bottom surface and extending from the top surface to the bottom surface.

4. The method according to claim 1, wherein said separator and said collector are parallel and said seal resin extends from the surface of the outer circumferential part of said separator to the surface of the circumferential part of said collector such that said seal resin is perpendicular to said separator and said collector.

5. The method according to claim 1, wherein said seal resin is provided between the top surface of the outer circumferential part of said separator and a surface of the circumferential part of said collector.

6. The method according to claim 1, wherein said seal resin is provided between the bottom surface of the outer circumferential part of said separator and a surface of the circumferential part of said collector.

* * * * *